United States Patent [19]

Sato et al.

[11] Patent Number: 5,499,111
[45] Date of Patent: Mar. 12, 1996

[54] IMAGE SIGNAL PROCESSING APPARATUS

[75] Inventors: Shinichi Sato, Yokohama; Kazuto Kobayashi, Tokyo; Takenobu Ikeuchi, Kawasaki, all of Japan

[73] Assignee: Matsushita Graphic Communication Systems, Inc., Tokyo, Japan

[21] Appl. No.: 924,705

[22] Filed: Aug. 4, 1992

[30]     Foreign Application Priority Data

| Aug. 6, 1991 | [JP] | Japan | 3-196435 |
| Aug. 28, 1991 | [JP] | Japan | 3-217494 |
| Feb. 14, 1992 | [JP] | Japan | 4-027688 |
| Feb. 14, 1992 | [JP] | Japan | 4-027691 |
| Feb. 19, 1992 | [JP] | Japan | 4-031708 |

[51] Int. Cl.$^6$ .................................................. H04N 1/40
[52] U.S. Cl. ........................ 358/455; 358/453; 358/448
[58] Field of Search ............................. 358/455, 80, 284, 358/283, 443, 456, 282, 75, 80, 456, 448, 462, 465, 466, 427, 456, 458, 459; 382/50–54, 22

[56]              References Cited

U.S. PATENT DOCUMENTS

| 4,742,400 | 5/1988 | Tsuji | 358/284 |
| 4,878,125 | 10/1989 | Katayama et al. | 358/443 |
| 4,924,509 | 5/1990 | Yokomizo . | |
| 4,953,013 | 8/1990 | Tsuji et al. | 358/75 |
| 5,086,484 | 2/1992 | Katayama et al. | 382/50 |
| 5,153,925 | 10/1992 | Tanioka et al. | 382/52 |
| 5,166,535 | 11/1992 | Takahashi | 250/563 |
| 5,187,521 | 2/1993 | Shimizu et al. | 358/80 |
| 5,231,677 | 7/1993 | Mita et al. | 382/22 |
| 5,253,936 | 10/1993 | Ishida | 358/427 |
| 5,274,470 | 12/1993 | Karita et al. | 358/448 |
| 5,287,419 | 2/1994 | Sato et al. | 382/50 |
| 5,296,939 | 3/1994 | Suzuki | 358/453 |
| 5,311,328 | 5/1994 | Murata | 358/447 |
| 5,311,490 | 5/1994 | Matoba et al. | 369/44.28 |
| 5,317,411 | 5/1994 | Yoshida | 358/261.2 |
| 5,351,312 | 9/1994 | Sato et al. | 382/50 |
| 5,363,219 | 11/1994 | Yoshida | 358/539 |

FOREIGN PATENT DOCUMENTS

| 62-139472 | 6/1987 | Japan . |
| 1238373 | 9/1989 | Japan . |
| 1302960 | 12/1989 | Japan . |
| 1303869 | 12/1989 | Japan . |

*Primary Examiner*—Paul Ip
*Attorney, Agent, or Firm*—Lowe, Price, LeBlanc & Becker

[57]              ABSTRACT

A correcting device corrects a multi-level image signal of a pixel of interest in accordance with corrective data. A binarizing device binarizes an output signal of the correcting device. A logic device receives an output signal of the binarizing device. A feedback device feeds an output signal of the logic device, which corresponds to at least two feedback pixels immediately preceding the pixel of interest in a scanning direction, back to an input side of the logic device. A calculating device derives a difference between an output signal of the logic device and the output signal of the correcting device, and generates the corrective data on the basis of the derived difference. An output signal of the logic device is a pseudo halftone image signal. The logic device operates as follows. A black-level signal is outputted as a signal of the pixel of interest when the output signal of the logic device which corresponds to the feedback pixel closest to the pixel of interest is black and the output signal of the logic device which corresponds to the other feedback pixel is white. A signal equal to the output signal of the binarizing device is outputted as a signal of the pixel of interest in other cases. A white-level signal is outputted as a signal of the pixel of interest when the output signal of the logic device which corresponds to the feedback pixel closest to the pixel of interest is white and the output signal of the logic device which corresponds to the other feedback pixel is black. A signal equal to the output signal of the binarizing device is outputted as a signal of the pixel of interest in other cases.

29 Claims, 36 Drawing Sheets

FIG. 8
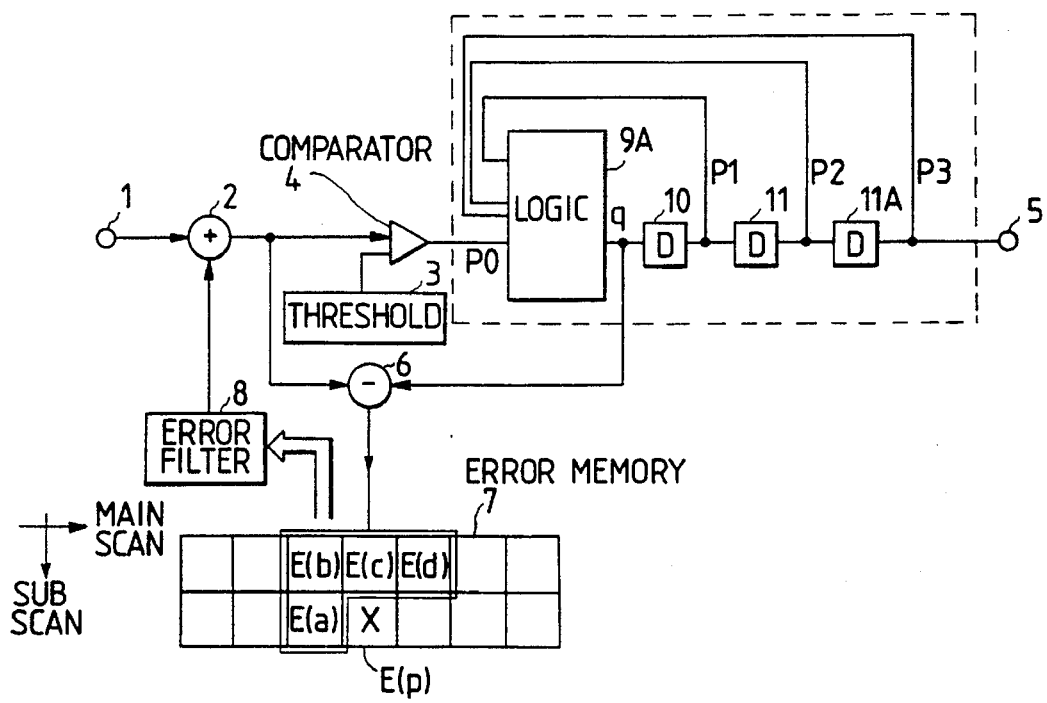
FIG. 9
PRIOR ART
FIG. 10
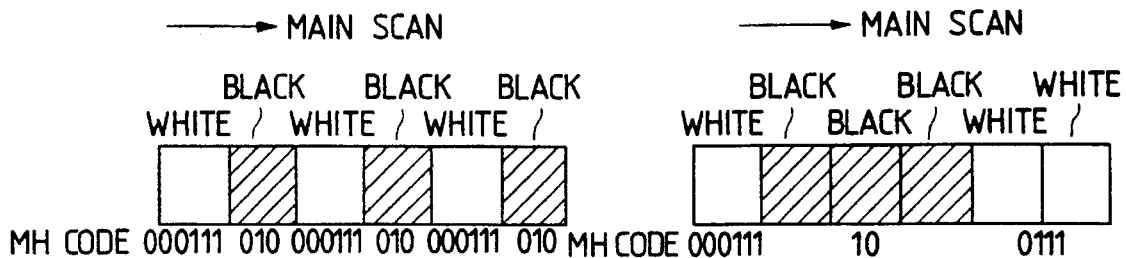

FIG. 25

| PIXEL OF INTEREST | ADJOINING PIXELS | | | | CORRECTIVE QUANTITY |
|---|---|---|---|---|---|
| P | a | b | c | d | C |
| 0 | 0 | 0 | 0 | 0 | 0 |
| 0 | 0 | 0 | 0 | 1 | 0 |
| 0 | 0 | 0 | 1 | 0 | $W \times (k - 2k^2)$ |
| 0 | 0 | 0 | 1 | 1 | $W \times (k)$ |
| 0 | 0 | 1 | 0 | 0 | 0 |
| 0 | 0 | 1 | 0 | 1 | 0 |
| 0 | 0 | 1 | 1 | 0 | $W \times (k - 2k^2)$ |
| 0 | 0 | 1 | 1 | 1 | $W \times (k)$ |
| 0 | 1 | 0 | 0 | 0 | $W \times (k - k^2)$ |
| 0 | 1 | 0 | 0 | 1 | $W \times (k - k^2)$ |
| 0 | 1 | 0 | 1 | 0 | $W \times (2k - 3k^2)$ |
| 0 | 1 | 0 | 1 | 1 | $W \times (2k - k^2)$ |
| 0 | 1 | 1 | 0 | 0 | $W \times (k - k^2)$ |
| 0 | 1 | 1 | 0 | 1 | $W \times (k - k^2)$ |
| 0 | 1 | 1 | 1 | 0 | $W \times (2k)$ |
| 0 | 1 | 1 | 1 | 1 | $W \times (2k + 2k^2)$ |

FIG. 26

| PIXEL OF INTEREST | ADJOINING PIXELS | | | | CORRECTIVE QUANTITY |
|---|---|---|---|---|---|
| P | a | b | c | d | C |
| 1 | 0 | 0 | 0 | 0 | $W \times (2k - k^2)$ |
| 1 | 0 | 0 | 0 | 1 | $W \times (2k - k^2)$ |
| 1 | 0 | 0 | 1 | 0 | $W \times (k + k^2)$ |
| 1 | 0 | 0 | 1 | 1 | $W \times (k)$ |
| 1 | 0 | 1 | 0 | 0 | $W \times (2k - k^2)$ |
| 1 | 0 | 1 | 0 | 1 | $W \times (2k - k^2)$ |
| 1 | 0 | 1 | 1 | 0 | $W \times (k + k^2)$ |
| 1 | 0 | 1 | 1 | 1 | $W \times (k)$ |
| 1 | 1 | 0 | 0 | 0 | $W \times (k)$ |
| 1 | 1 | 0 | 0 | 1 | $W \times (k)$ |
| 1 | 1 | 0 | 1 | 0 | $W \times (2k^2)$ |
| 1 | 1 | 0 | 1 | 1 | $W \times (k^2)$ |
| 1 | 1 | 1 | 0 | 0 | $W \times (k)$ |
| 1 | 1 | 1 | 0 | 1 | $W \times (k)$ |
| 1 | 1 | 1 | 1 | 0 | $W \times (k^2)$ |
| 1 | 1 | 1 | 1 | 1 | 0 |

| -B<br>(g) | A<br>(h) | -B<br>(i) |
| --- | --- | --- |
| A<br>(d) | 1+4B-4A<br>(e) | A<br>(f) |
| -B<br>(a) | A<br>(b) | -B<br>(c) |

| INPUT | | | OUTPUT bit |
|---|---|---|---|
| SIGN bit | bit 4 | bit 3 | |
| 0 | 1 | 1 | 1 |
| 0 | 1 | 0 | 1 |
| 0 | 0 | 1 | 1 |
| 0 | 0 | 0 | 0 |
| 1 | 1 | 1 | 0 |
| 1 | 1 | 0 | 0 |
| 1 | 0 | 1 | 0 |
| 1 | 0 | 0 | 0 |

IMAGE SIGNAL PROCESSING APPARATUS

BACKGROUND OF THE INVENTION

This invention generally relates to an apparatus for processing an image signal. This invention specifically relates to, for example, an apparatus for processing a true halftone (gray-level) image signal into a pseudo halftone image signal having a sequence of bi-level (two-level) pixel components.

Some of image signal processing apparatus use an error diffusion method in converting a true halftone (gray-level) image signal into a pseudo halftone image signal having a sequence of bi-level pixel components.

Japanese published unexamined patent applications 62-139472, 1-238373, and 1-302960 disclose such image signal processing apparatus.

Japanese published unexamined patent application 1-303869 discloses one type of such image signal processing apparatus. The apparatus of Japanese application 1-303869 has a smoothing matrix by which an input image signal is smoothed. By comparing the resultant (smoothed) image signal with a given value, a decision is made as to whether or not a pixel of interest exists in a white area. Bit correction of the result of an error diffusion process is performed in response to the result of the decision. Thereby, it is possible to remove 1-dot (black dot) noise which might occur in the white area due to the accumulation of errors during the execution of the error diffusion process.

As will be explained later, prior-art image signal processing apparatus have some problems.

SUMMARY OF THE INVENTION

It is an object of this invention to provide an improved image signal processing apparatus.

A first aspect of this invention provides an image signal processing apparatus comprising correcting means for correcting a multi-level image signal of a pixel of interest in accordance with corrective data; binarizing means for binarizing an output signal of the correcting means; logic means receiving an output signal of the binarizing means; feedback means for feeding an output signal of the logic means, which corresponds to at least two feedback pixels immediately preceding the pixel of interest in a scanning direction, back to an input side of the logic means; calculating means for deriving a difference between an output signal of the logic means and the output signal of the correcting means, and generating the corrective data on the basis of the derive difference; and output means for outputting an output signal of the logic means as a pseudo halftone image signal; wherein the logic means comprises means for outputting a black-level signal as a signal of the pixel of interest when the output signal of the logic means which corresponds to the feedback pixel closest to the pixel of interest is black and the output signal of the logic means which corresponds to the other feedback pixel is white, for outputting a signal equal to the output signal of the binarizing means as a signal of the pixel of interest in other cases; and means for outputting a white-level signal as a signal of the pixel of interest when the output signal of the logic means which corresponds to the feedback pixel closest to the pixel of interest is white and the output signal of the logic means which corresponds to the other feedback pixel is black, and for outputting a signal equal to the output signal of the binarizing means as a signal of the pixel of interest in other cases.

A second aspect of this invention provides an image signal processing apparatus comprising binarizing means for binarizing a multi-level pixel signal; and converting means for converting an output signal of the binarizing means, which corresponds to a pixel of interest, into one of a signal of at least two successive black dots and a signal of at least two successive white dots.

A third aspect of this invention provides an image signal processing apparatus comprising binarizing means for binarizing a multi-level input pixel signal; converting means for converting an output signal of the binarizing means, which corresponds to a pixel of interest, into one of a signal of at least two successive black dots and a signal of at least two successive white dots; calculating means for deriving a difference between an output signal of the converting means and the input pixel signal, and for generating corrective data on the basis of the derived difference; and correcting means for correcting the input pixel signal, which corresponds to pixels near a pixel of interest, in accordance with the corrective data.

A fourth aspect of this invention provides an image signal processing apparatus comprising binarizing means for binarizing a multi-level input pixel signal; and converting means for converting an output signal of the binarizing means, which corresponds to a pixel of interest, into one of a signal of at least two successive black dots and a signal of at least two successive white dots in a main scanning direction with reference to states of pixels preceding the pixel of interest by two pixels or more.

A fifth aspect of this invention provides an image signal processing apparatus comprising binarizing means for binarizing a multi-level input pixel signal; and converting means for converting an output signal of the binarizing means, which corresponds to a pixel of interest, into one of a signal of at least two successive black dots and a signal of at least two successive white dots in a sub scanning direction with reference to states of pixels preceding the pixel of interest by two pixels or more.

A sixth aspect of this invention provides an image signal processing apparatus comprising binarizing means for binarizing a multi-level input pixel signal; and converting means for converting an output signal of the binarizing means, which corresponds to a pixel of interest, into one of a signal of at least two successive black dots and a signal of at least two successive white dots in one of a main scanning direction and a sub scanning direction with reference to states of pixels preceding the pixel of interest by two pixels or more.

A seventh aspect of this invention provides an image signal processing apparatus comprising correcting means for correcting a multi-level input pixel signal in accordance with corrective data; binarizing means for binarizing an output signal of the correcting means into a corresponding binary pixel signal; reducing means for thinning out pixels in the binary pixel signal and thereby reducing the binary pixel signal; and calculating means for deriving a difference between the binary pixel signal and the output signal of the correcting means, and for generating the corrective data on the basis of the derived difference; wherein the calculating means comprises means for excluding the pixels, which are thinned out by the reducing means, from generating the corrective data to enable the correcting by the correcting means to be done only on pixels which are not thinned out by the reducing means.

An eighth aspect of this invention provides an image signal processing apparatus comprising correcting means for correcting a multi-level input pixel signal in accordance with corrective data; binarizing means for binarizing an output signal of the correcting means into a corresponding binary pixel signal; reducing means for thinning out pixels in the binary pixel signal and thereby reducing the binary pixel signal; and calculating means for deriving a difference between the binary pixel signal and the output signal of the correcting means to generate error data; processing means for multiplying the error data of pixels near a pixel of interest by predetermined weight coefficients to generate weighted error data respectively, and for generating the corrective data on the basis of the weighted error data; wherein the processing means comprises means for excluding the pixels, which are thinned out by the reducing means, from generating the corrective data to enable the correcting by the correcting means to be done only on pixels which are not thinned out by the reducing means.

A ninth aspect of this invention provides an image signal processing apparatus comprising correcting means for correcting input image data in accordance with first corrective data; binarizing means for binarizing an output signal of the correcting means; subtracting means for calculating a difference between an output signal of the binarizing means and the output signal of the corrective means; memory means for memorizing binary values of already-processed pixels, which are represented by the output signal of the binarizing means, near a currently-processed pixel; first corrective-quantity determining means for determining second corrective data on the basis of the binary values of the already-processed pixels which are memorized by the memory means, the second corrective data depending on a difference between a theoretical dot size and an actual dot size in a recording system; second corrective-quantity determining means for adding an output signal of the first corrective-quantity determining means and an output signal of the subtracting means to generate the first corrective data; receiving means for receiving a signal representing whether or not the input image signal is effective; and feeding means for feeding an output signal of the second corrective-quantity determining means to the correcting means as the first corrective data when the signal received by the receiving means represents that the input image signal is effective.

A tenth aspect of this invention provides an image signal processing apparatus comprising an edge emphasizing filter for multiplying a pixel of interest and pixels adjoining the pixel of interest of an input multi-level image signal by first predetermined coefficients, and for calculating a filter correction value equal to a sum thereof; correcting means for calculating and processing the filter correction value; binarizing means for binarizing an output signal of the correcting means; a subtraction circuit for calculating a subtraction value between an output signal of the binarizing means and the output signal of the correcting means; and correction value calculating means for multiplying subtraction values of pixels adjoining a pixel to be binarized which are already outputted from the subtraction circuit by second predetermined coefficients, and for outputting resultants to the correcting means.

An eleventh aspect of this invention provides an image signal processing apparatus comprising an edge emphasizing filter for multiplying a pixel of interest and pixels adjoining the pixel of interest of an input multi-level image signal by predetermined coefficients, and for calculating a filter correction value equal to a sum thereof; a dither pattern generating circuit for outputting a signal in synchronism with the input image signal; and a binarizing comparator for comparing a dither pattern outputted from the dither pattern generating circuit and the filter correction value to determine a binary level of the pixel of interest.

A twelfth aspect of this invention provides an image signal processing apparatus comprising an edge emphasizing filter for multiplying a pixel of interest and pixels adjoining the pixel of interest of an input multi-level image signal by predetermined coefficients, and for calculating a filter correction value equal to a sum thereof; a dither pattern generating circuit for outputting a signal in synchronism with the input image signal; an adder for adding a dither pattern outputted from the dither pattern generating circuit and the filter correction value; and binarizing means for binarizing an output signal of the adder.

A thirteenth aspect of this invention provides an image signal processing apparatus comprising an edge emphasizing filter for multiplying a pixel of interest and pixels adjoining the pixel of interest of an input multi-level image signal by predetermined coefficients, and for calculating a filter correction value equal to a sum thereof; and a binarizing comparator for comparing an output signal of the edge emphasizing filter with a predetermined threshold value to determine a binary level of the pixel of interest.

A fourteenth aspect of this invention provides an image signal processing apparatus comprising an edge emphasizing filter for multiplying a pixel of interest and pixels adjoining the pixel of interest of an input multi-level image signal by predetermined coefficients, and for calculating a filter correction value equal to a sum thereof; a dither pattern generating circuit for outputting a signal in synchronism with the input image signal; an adder for adding a dither pattern outputted from the dither pattern generating circuit and the filter correction value being an output signal of the edge emphasizing filter; and means for outputting information of whether a carry bit of the adder is present or absent as a binary value.

A fifteenth aspect of this invention provides an image signal processing apparatus comprising an edge emphasizing filter including means for inputting a positive value "A" and a negative value "−B" as filter coefficients to emphasize edges in an image, means for using the input value "A" as filter coefficients of pixels adjoining a pixel of interest in main and sub scanning directions, means for using the input value "−B" as filter coefficients of pixels adjoining the pixel of interest in inclined directions, means for using a value "1+4B−4A" as a filter coefficient of the pixel of interest, means for multiplying the pixel of interest and the pixels adjoining the pixel of interest of an input multi-level image signal by the filter coefficients respectively, and means for outputting a sum thereof as a filter correction value; correcting means for calculating and processing the filter correction value; binarizing means for binarizing an output signal of the correcting means; a subtraction circuit for calculating a subtraction value between an output signal of the binarizing means and the output signal of the correcting means; and correction value calculating means for multiplying subtraction values of pixels adjoining a pixel to be binarized which are already outputted from the subtraction circuit by predetermined coefficients, and for outputting resultants to the correcting means.

A sixteenth aspect of this invention provides an image signal processing apparatus comprising an edge emphasizing filter including means for inputting a positive value "A" and a negative value "−B" as filter coefficients to emphasize edges in an image, means for using the input value "A" as filter coefficients of pixels adjoining a pixel of interest in main and sub scanning directions, means for using the input value "−B" as filter coefficients of pixels adjoining the pixel of interest in inclined directions, means for using a value "1+4B−4A" as a filter coefficient of the pixel of interest, means for multiplying the pixel of interest and the pixels adjoining the pixel of interest of an input multi-level image signal by the filter coefficients respectively, and means for outputting a sum thereof as a filter correction value; a dither pattern generating circuit for outputting a signal in synchronism with the input image signal; and a binarizing comparator for comparing a dither pattern outputted from the dither pattern generating circuit and the filter correction value to determine a binary level of the pixel of interest.

A seventeenth aspect of this invention provides an image signal processing apparatus comprising an edge emphasizing filter including means for inputting a positive value "A" and a negative value "−B" as filter coefficients to emphasize edges in an image, means for using the input value "A" as filter coefficients of pixels adjoining a pixel of interest in main and sub scanning directions, means for using the input value "−B" as filter coefficients of pixels adjoining the pixel of interest in inclined directions, means for using a value "1+4B−4A" as a filter coefficient of the pixel of interest, means for multiplying the pixel of interest and the pixels adjoining the pixel of interest of an input multi-level image signal by the filter coefficients respectively, and means for outputting a sum thereof as a filter correction value; a dither pattern generating circuit for outputting a signal in synchronism with the input image signal; an adder for adding a dither pattern outputted from the dither pattern generating circuit and the filter correction value; and binarizing means for binarizing an output signal of the adder.

An eighteenth aspect of this invention provides an image signal processing apparatus comprising binarizing means for binarizing input multi-level data of a pixel of interest, the binarizing means including a binarizing decoder for calculating a binary level from a sign bit and higher bits of the input data.

A nineteenth aspect of this invention provides an image signal processing apparatus comprising binarizing means for binarizing input multi-level data of a pixel of interest, the binarizing means including a binarizing decoder for outputting information of whether or not a higher bit of the input data is present as a binary value.

A twentieth aspect of this invention provides an image signal processing apparatus comprising correcting means for correcting input image data in accordance with a corrective value; binarizing means for binarizing an output signal of the correcting means; subtracting means for calculating a difference value between an output signal of the binarizing means and the output signal of the correcting means; memory means for memorizing difference values outputted from the subtracting means as error values corresponding to a pixel of interest and pixels adjoining the pixel of interest; and calculating means for reading out the error values corresponding to the pixels adjoining the pixel of interest from the memory means, for multiplying the readout error values by predetermined coefficients respectively, and for calculating a sum thereof and outputting an error collection value to the correcting means, the error collection value being equal to the sum.

A twenty-first aspect of this invention provides an image signal processing apparatus comprising correcting means for correcting input image data in accordance with a corrective value; binarizing means for binarizing an output signal of the correcting means; subtracting means for calculating a difference value between an output signal of the binarizing means and the output signal of the correcting means; error distributing means for making difference values outputted from the subtracting means into correspondence with a pixel of interest and pixels adjoining the pixel of interest, for multiplying the difference values by predetermined coefficients to generate errors respectively, and for outputting the errors for the respective pixels adjoining the pixel of interest; and calculating means for sequentially collecting and adding an output signal of the error distributing means in correspondence with the respective pixels adjoining the pixel of interest to generate an error collection value, and for outputting the error collection value to the correcting means.

BRIEF DESCRIPTION OF THE DRAWINGS

FIG. 8 is a block diagram of an image signal processing apparatus according to a third embodiment of this invention.

FIG. 9 is a diagram showing an example of a run pattern of a pseudo halftone image signal and MH code words in respect of the prior-art image signal processing apparatus of FIG. 1 or FIG. 2.

FIG. 10 is a diagram showing an example of a run pattern of a pseudo halftone image signal and MH code words in respect of the image signal processing apparatus of FIG. 8.

FIGS. 25 and 26 are diagrams showing the relation between a corrective quantity "C" and a combination of the states of a pixel "p" of interest and neighboring pixels "a", "b", "c", and "d".

DESCRIPTION OF THE PRIOR ART

Figure 1:
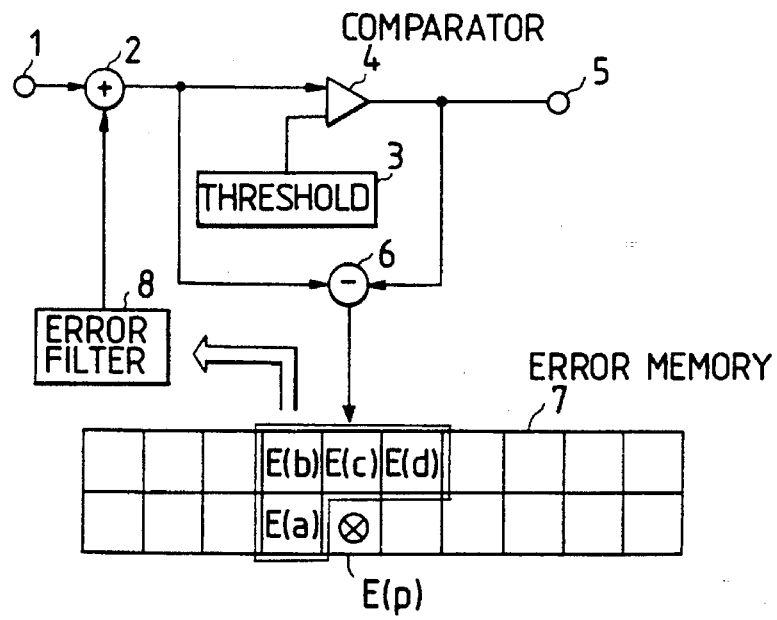
FIG. 1 is a block diagram of a first prior-art image signal processing apparatus.

FIG. 1 shows a first prior-art apparatus for processing a true halftone (gray-level) image signal into a pseudo halftone image signal according to an error diffusion method.

The prior-art apparatus of FIG. 1 includes an input terminal 1 via which a true halftone input image signal is fed to an adder 2. The input image signal is generated by a suitable device such as an image scanner. The input image signal has time segments corresponding to pixels respectively. The input image signal is processed in a pixel-by-pixel manner by the adder 2 and later stages. The adder 2 adds the input image signal and a corrective signal outputted from an error filter 8 described later. A threshold generator 3 produces a signal representative of a predetermined threshold value which is used in binarizing an output signal of the adder 2 into a corresponding binary image signal (a pseudo halftone image signal having a sequence of bi-level pixel components). A comparator 4 compares the output signal of the adder 2 and the threshold value signal, converting the output signal of the adder 2 into a corresponding binary image signal (a pseudo halftone image signal having a sequence of bi-level pixel components). The comparator 4 outputs the binary image signal which is transmitted to an external device (not shown) via an output terminal 5. A subtracter 6 subtracts the output signal of the comparator 4 from the output signal of the adder 2, generating and outputting error data. An error data memory 7 stores the error data outputted from the subtracter 6. An error filter 8 receives the error data from the error data memory 7 and subjects the error data to a filtering process. Specifically, the error filter 8 weights pieces of the error data which correspond to pixels near the pixel of interest. Then, the error filter 8 sums up and combines the weighted error data into corrective data, and outputs the corrective data as a corrective signal.

The prior-art apparatus of FIG. 1 operates as follows. As described previously, the true halftone input image signal is fed to the adder 2 via the input terminal 1. The corrective signal outputted from the error filter 8 is added to the true halftone input image signal by the adder 2. The output signal of the adder 2, that is, the addition-resultant signal, is binarized into the corresponding binary image signal (the pseudo halftone image signal) by the comparator 4. The binary image signal is transmitted from the comparator 4 to an external device (not shown) via the output terminal 5. The subtracter 6 generates error data E(a) of the pixel of interest by subtracting the output signal of the comparator 4 from the output signal of the adder 2. The generated error data E(a) is written into the error data memory 7. Generally, the error data memory 7 stores pieces of the error data which correspond to successive pixels respectively. The error data E(a) of the currently-processed pixel, and the error data E(b), E(c), and E(d) of the pixels near the currently-processed pixel are read out from the error data memory 7 and are then fed to the error filter 8. As described previously, the error filter 8 weights the error data E(a), E(b), E(c), and E(d), and sums up and combines the weighted error data into corrective data for a next pixel of interest (which is denoted by the character "⊗"in the block 7 of FIG. 1). The error filter 8 outputs the corrective data as a corrective signal. During a subsequent stage, when signal binarizing is executed, related error data E(p) is generated and is written into the error data memory 7.

Figure 2:
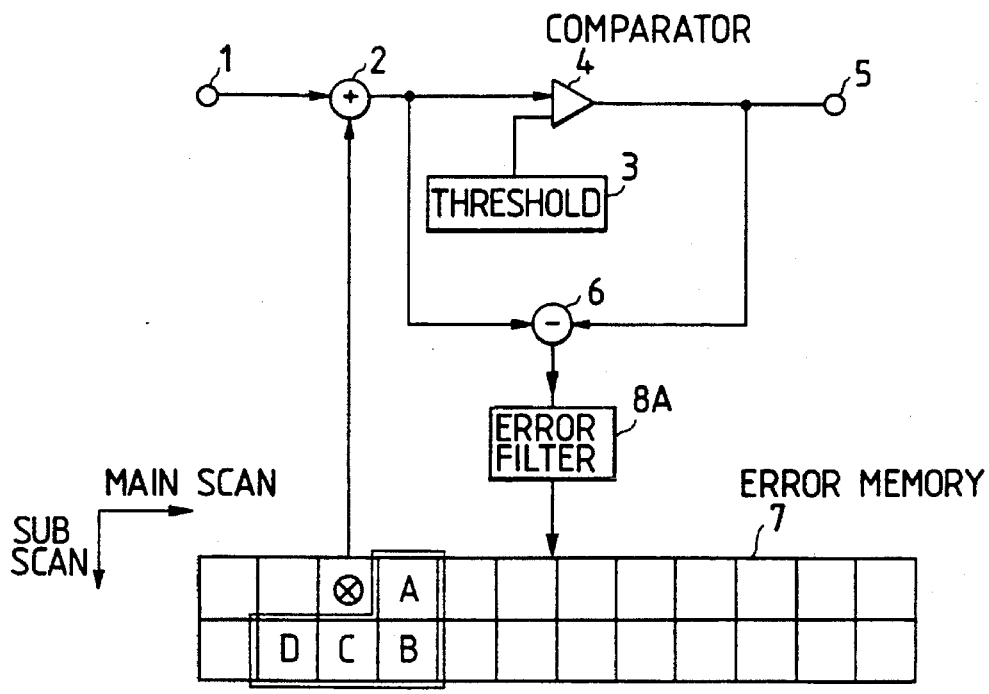
FIG. 2 is a block diagram of a second prior-art image signal processing apparatus.

FIG. 2 shows a second prior-art apparatus for processing a true halftone (gray-level) image signal into a pseudo halftone image signal according to an error diffusion method. The prior-art apparatus of FIG. 2 is similar to the prior-art apparatus of FIG. 1 except for design changes described hereinafter.

The prior-art apparatus of FIG. 2 uses an error filter 8A instead of the error filter 8 of FIG. 1. The error filter 8A is connected to the input side of an error data memory 7. In the prior-art apparatus of FIG. 2, the output side of the error data memory 7 is directly connected to an adder 2. The error filter 8A receives error data from a subtracter 6. The error filter 8A divides the error data into portions and weights the portions before allotting the weighted portions to pixels near the pixel of interest respectively. The error filter 8A writes the weighted error data portions into corresponding storage segments of the error data memory 7. In this way, corrective data corresponding to the output signal of the error filter 8 of FIG. 1 is prepared in the error data memory 7. Corrective data for the pixel of interest, which is denoted by the character "⊗"in the block 7 of FIG. 2, is directly fed from the error data memory 7 to the adder 2. Error data which results from the processing of the pixel of interest is distributed by the error filter 8A to later-processed pixels "A", "B", "C", and "D" near the pixel of interest.

The prior-art apparatus of FIG. 1 and the prior-art apparatus of FIG. 2 have the following problems. In cases where a pseudo halftone image signal generated by the prior-art apparatus is subjected to one-dimensional or two-dimensional redundancy-compression coding such as MH, MR, or MMR coding, the coding efficiency tends to be low and the amount of coding-resultant data is sometimes greater than the amount of original data. This problem arises from the fact that an error diffusion process tends to cause short run lengths and certain patterns of runs which correspond to low coding efficiencies. Furthermore, in cases where an image represented by a pseudo halftone image signal outputted from the prior-art apparatus is visualized by a printer such as a laser beam printer or an ink jet printer which generate recorded dots liable to expand, the halftone reproducibility tends to be low. This problem arises from the fact as follows. An error diffusion process tends to cause black-data runs having a length of 1. During the printing process, segments corresponding to such runs are made greater in recorded tone level (recorded black density) by the previously-mentioned expansion tendency of recorded dots.

DESCRIPTION OF THE FIRST PREFERRED EMBODIMENT

Figure 3:
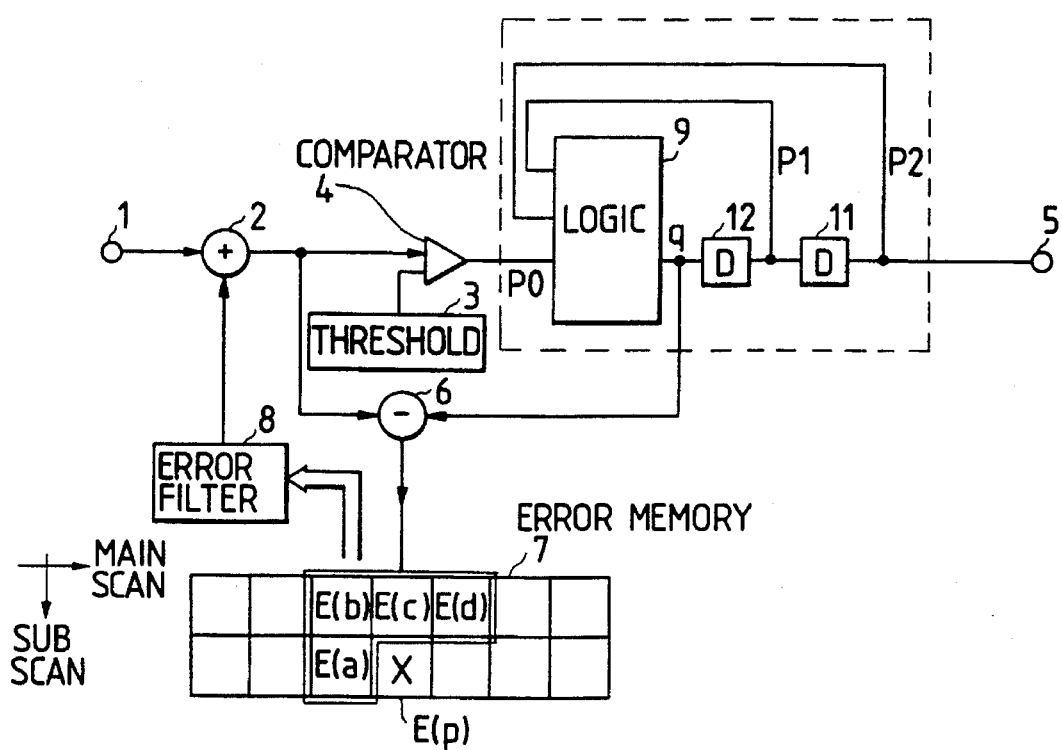
FIG. 3 is a block diagram of an image signal processing apparatus according to a first embodiment of this invention.

With reference to FIG. 3, an image signal processing apparatus includes an input terminal 1 via which a true halftone input image signal is fed to a correcting section 2. The input image signal is generated by a suitable device such as an image scanner. The input image signal has time segments corresponding to pixels respectively. The input image signal is processed in a pixel-by-pixel manner by the correcting section 2 and later stages. The correcting section 2 corrects the input image signal in accordance with a corrective signal outputted from an error filter 8 described later.

The correcting section 2 is composed of an adder or a subtracter in dependence upon the sign characteristics of the corrective signal. In this embodiment, the correcting section 2 uses an adder.

The adder 2 adds the input image signal and the corrective signal outputted from the error filter 8. A threshold generator 3 produces a signal representative of a predetermined threshold value which is used in binarizing an output signal of the adder 2 into a corresponding binary image signal (a pseudo halftone image signal having a sequence of bi-level pixel components). A comparator 4 compares the output signal of the adder 2 and the threshold value signal, converting the output signal of the adder 2 into a corresponding 1-bit binary image signal (a first pseudo halftone image signal having a sequence of bi-level pixel components) P0. The comparator 4 outputs the binary signal P0 to a logic circuit 9.

The logic circuit 9 receives the output 1-bit signal P0 of the comparator 4 which corresponds to the currently-inputted pixel, that is, the pixel of interest. The logic circuit 9 receives output 1-bit signals P1 and P2 from flip-flops 10 and 11 forming delay circuits respectively. The logic circuit 9 is successively followed by the flip-flops 10 and 11. The flip-flop 10 delays the output signal "q" of the logic circuit 9 by a 1-pixel interval. Thus, the output signal P1 of the flip-flop 10 is equal to a 1-pixel delayed output signal of the logic circuit 9. The flip-flop 11 delays the output signal P1 of the flip-flop 10 by a 1-pixel interval. Thus, the output signal P2 of the flip-flop 11 is equal to a 2-pixel delayed output signal of the logic circuit 9. The flip-flops 10 and 11 compose a signal feedback circuit which feeds the signal "q"

back to the logic circuit 9, the fed-back signal corresponding to first and second pixels preceding the pixel of interest in a main scanning direction. The logic circuit 9 executes logic operation among the received signals P0, P1, and P2, and outputs the signal "q" in accordance with the result of the logic operation. The output signal "q" of the logic circuit 9 is a second pseudo halftone image signal (a 1-bit binary image signal) which is transmitted to an external device (not shown) via the flip-flops 10 and 11 and an output terminal 5.

A subtracter 6 subtracts the output signal "q" of the logic circuit 9 from the output signal of the adder 2, generating and outputting error data corresponding to the pixel of interest. An error data memory 7 stores the error data outputted from the subtracter 6. An error filter 8 receives the error data from the error data memory 7 and subjects the error data to a filtering process. Specifically, the error filter 8 weights pieces of the error data which correspond to pixels near the pixel of interest. Then, the error filter 8 sums up and combines the weighted error data into corrective data, and outputs the corrective data as a corrective signal.

The apparatus of FIG. 1 operates as follows. As described previously, the true halftone input image signal is fed to the adder 2 via the input terminal 1. The corrective signal outputted from the error filter 8 is added to the true halftone input image signal by the adder 2. The output signal of the adder 2, that is, the addition-resultant signal, is binarized into the corresponding 1-bit binary image signal (the first pseudo halftone image signal) P0 by the comparator 4. The 1-bit binary signal P0 is outputted from the comparator 4 to the logic circuit 9. The logic circuit 9 also receives the output 1-bit signals P1 and P2 from the flip-flops 10 and 11 which are equal to a 1-pixel delayed output signal of the logic circuit 9 and a 2-pixel delayed output signal of the logic circuit 9 respectively. The logic circuit 9 executes the logic operation among the received signals P0, P1, and P2, and outputs the signal "q" in accordance with the result of the logic operation. The output signal "q" of the logic circuit 9 is the second pseudo halftone image signal (the 1-bit binary image signal) which is transmitted to an external device (not shown) via the flip-flops 10 and 11 and the output terminal 5. The subtracter 6 generates error data E(a) of the pixel of interest by subtracting the output signal "q" of the logic circuit 9 from the output signal of the adder 2. The generated error data E(a) is written into the error data memory 7. Generally, the error data memory 7 stores pieces of the error data which correspond to successive pixels respectively. The error data E(a) of the currently-processed pixel, and the error data E(b), E(c), and E(d) of the pixels near the currently-processed pixel are read out from the error data memory 7 and are then fed to the error filter 8. As described previously, the error filter 8 weights the error data E(a), E(b), E(c), and E(d), and sums up and combines the weighted error data into corrective data for a next pixel of interest (which is denoted by the character "⊗"in the block 7 of FIG. 1). The error filter 8 outputs the corrective data as a corrective signal. During a subsequent stage, when signal binarizing is executed, related error data E(p) is generated and is written into the error data memory 7.

The logic circuit 9 includes a combination of logic gates. Table 1 shows the relation between the logical state of the output signal "q" and the logical states of the input signals P0, P1, and P2 in connection with the logic circuit 9. Presenting such a relation substantially equals disclosing the internal design of the logic circuit for the person skilled in the art.

TABLE 1

| 1st PRECEDING PIXEL P1 | 2nd PRECEDING PIXEL P2 | CURRENT PIXEL P0 | OUTPUT "q" |
|---|---|---|---|
| 0 | 0 | 0 | 0 |
| 0 | 0 | 1 | 1 |
| 0 | 1 | * | 0 |
| 1 | * | 0 | 0 |
| 1 | * | 1 | 1 |

In Table 1, the numerals "1" and "0" denote "white" and "black" respectively, and the character "*" denotes "don't care".

As shown in Table 1, when the second-preceding pixel signal P2 is white ("1") and the first-preceding pixel signal P1 is black ("0"), the logic circuit 9 sets the output signal "q" to black ("0") independent of the state of the current pixel (the pixel of interest) signal P0. In other cases, the state of the output signal "q" is equal to the state of the current pixel signal P0.

The logic circuit 9 serves to replace a black run of a length of 1 with a black run of a length of 2 in a pseudo halftone image signal. In the case of MH coding, a code word representing a black run of a length of 1 is "010", and the code word length per pixel is 3 bits. In addition, a code word representing a black run of a length of 2 is "11", and the code word length per pixel is 1 bit. Accordingly, the logic circuit 9 enables a higher efficiency of MH coding.

Figure 4:
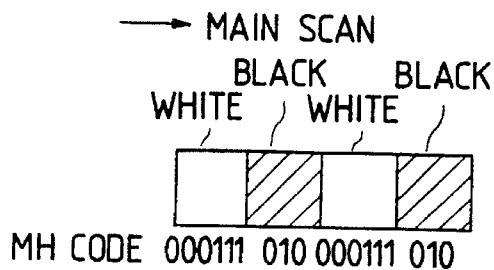
FIG. 4 is a diagram showing an example of a run pattern of a pseudo halftone image signal and MH code words in respect of the prior-art image signal processing apparatus of FIG. 1 or FIG. 2.
Figure 5:
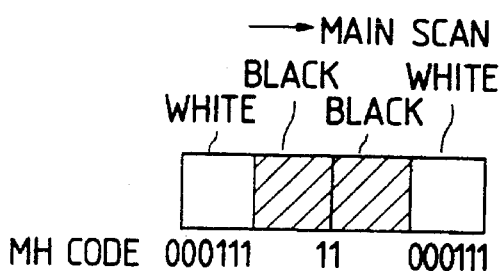
FIG. 5 is a diagram showing an example of a run pattern of a pseudo halftone image signal and MH code words in respect of the image signal processing apparatus of FIG. 3.

A consideration is now given of conditions where a pseudo halftone image signal outputted from the prior-art apparatus of FIG. 1 or FIG. 2 is encoded into an M H code word sequence which has a run pattern of FIG. 4. The sum of the lengths of the code words in FIG. 4 is equal to 18 bits (4.5 bits per pixel). Under similar conditions, an MH code word sequence corresponding to a pseudo halftone image signal outputted from the apparatus of this embodiment has a run pattern of FIG. 5. The sum of the lengths of the code words in FIG. 5 is equal to 14 bits (3.5 bits per pixel). It is understood from the comparison between FIGS. 4 and 5 that the apparatus of this embodiment is advantageous over the prior-art apparatus of FIGS. 1 and 2 in MH coding efficiency.

In the case of MR coding or MMR coding, since a horizontal mode agrees with that of MH coding, the apparatus of this embodiment enables a higher efficiency of coding of a pseudo halftone image signal.

In addition, the apparatus of this embodiment enables a higher halftone reproducibility in cases where an image represented by a pseudo halftone image is visualized by a printer such as a laser beam printer or an ink jet printer which generate recorded dots liable to expand.

Figure 6:
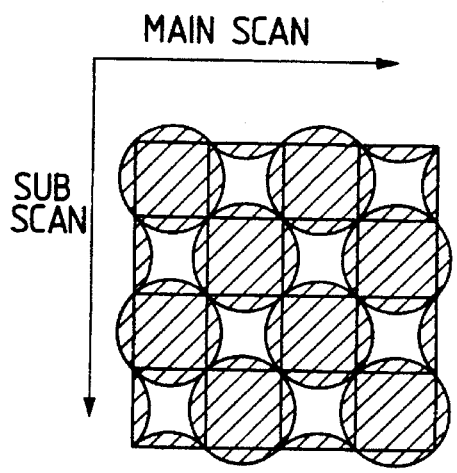
FIG. 6 is a diagram showing a recorded pattern of a pseudo halftone image signal having a density of 50% in respect of the prior-art image signal processing apparatus of FIG. 1 or FIG. 2.
Figure 7:
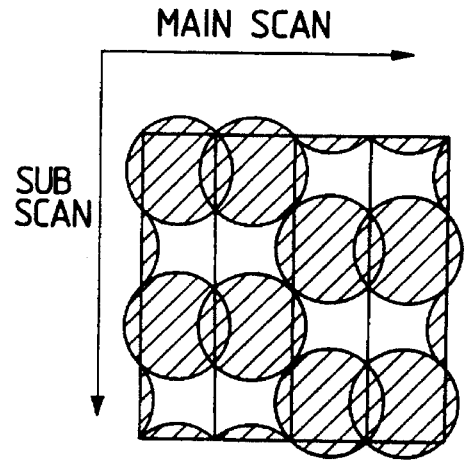
FIG. 7 is a diagram showing a recorded pattern of a pseudo halftone image signal having a density of 50% in respect of the image signal processing apparatus of FIG. 3.

FIG. 6 shows an example of a printed pattern of an image represented by a pseudo halftone image signal outputted from the prior-art apparatus of FIG. 1 or FIG. 2 which corresponds to a theoretical black density (tone level) of 50%. In FIG. 6, the expansion of recorded dots increases the actual black density of the printed pattern to about 80%. FIG. 7 shows an example of a printed pattern of an image represented by a pseudo halftone image signal outputted from the apparatus of this embodiment which corresponds to a theoretical black density (tone level) of 50%. In FIG. 7, the expansion of recorded dots increases the actual black density of the printed pattern to about 70%. It is understood from the comparison between FIGS. 6 and 7 that the apparatus of this embodiment is advantageous over the prior-art apparatus of FIGS. 1 and 2 in halftone reproducibility.

As understood from the previous description, the final output signal is fed back to the apparatus input side, and the image data which occurs after the correction is inputted via the subtraction stage. Thus, good tone characteristics are ensured.

DESCRIPTION OF THE SECOND PREFERRED EMBODIMENT

A second embodiment of this invention is similar to the first embodiment except for the design of a logic circuit 9. In the second embodiment, the logic circuit 9 is designed so as to replace a white run of a length of 1 with a white run of a length of 2 in a pseudo halftone image signal.

The logic circuit 9 includes a combination of logic gates. Table 2 shows the relation between the logical state of the output signal "q" and the logical states of the input signals P0, P1, and P2 in connection with the logic circuit 9. Presenting such a relation substantially equals disclosing the internal design of the logic circuit for the person skilled in the art.

TABLE 2

| 1st PRECEDING PIXEL P1 | 2nd PRECEDING PIXEL P2 | CURRENT PIXEL P0 | OUTPUT "q" |
|---|---|---|---|
| 1 | 1 | 1 | 1 |
| 1 | 1 | 0 | 0 |
| 1 | 0 | * | 1 |
| 0 | * | 1 | 1 |
| 0 | * | 0 | 0 |

In Table 2, the numerals "1" and "0" denote "white" and "black" respectively, and the character "*" denotes "don't care".

DESCRIPTION OF THE THIRD PREFERRED EMBODIMENT

FIG. 8 shows a third embodiment of this invention which is similar to the first embodiment except for design changes described hereinafter.

As shown in FIG. 8, the third embodiment includes a flip-flop 11A connected between a flip-flop 11 and an output terminal 5. The flip-flop 11A serves as a 1-pixel delay circuit. A logic circuit 9A receives output signals P0, P1, P2, and P3 from devices 4, 10, 11, and 11A. The logic circuit 9A generates and outputs a signal "q" in response to the received signals P0, P1, P2, and P3.

The logic circuit 9A includes a combination of logic gates. Table 3 shows the relation between the logical state of the output signal "q" and the logical states of the input signals P0, P1, P2, and P3 in connection with the logic circuit 9A. Presenting such a relation substantially equals disclosing the internal design of the logic circuit 9A for the person skilled in the art.

TABLE 3

| 1st PRECEDING PIXEL P1 | 2nd PRECEDING PIXEL P2 | 3rd PRECEDING PIXEL P3 | CURRENT PIXEL P0 | OUTPUT "q" |
|---|---|---|---|---|
| 0 | 0 | 0 | 0 | 0 |
| 0 | 0 | 0 | 1 | 1 |
| 0 | 0 | 1 | * | 0 |
| 0 | 1 | * | * | 0 |
| 1 | * | * | 0 | 0 |
| 1 | * | * | 1 | 1 |

In Table 3, the numerals "1" and "0" denote "white" and "black" respectively, and the character "*" denotes "don't care".

A consideration is now given of conditions where a pseudo halftone image signal outputted from the prior-art apparatus of FIG. 1 or FIG. 2 is encoded into an MH code word sequence which has a run pattern of FIG. 9. The sum of the lengths of the code words in FIG. 9 is equal to 27 bits (4.5 bits per pixel). Under similar conditions, an MH code word sequence corresponding to a pseudo halftone image signal outputted from the apparatus of this embodiment has a run pattern of FIG. 10. The sum of the lengths of the code words in FIG. 10 is equal to 12 bits (2 bits per pixel). It is understood from the comparison between FIGS. 9 and 10 that the apparatus of this embodiment is advantageous over the prior-art apparatus of FIGS. 1 and 2 in MH coding efficiency.

In addition, the apparatus of this embodiment enables a higher halftone reproducibility in cases where an image represented by a pseudo halftone image is visualized by a printer such as a laser beam printer or an ink jet printer which generate recorded dots liable to expand.

Figure 11:
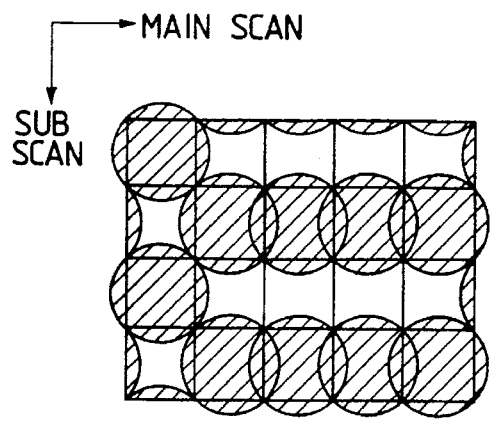
FIG. 11 is a diagram showing a recorded pattern of a pseudo halftone image signal having a density of 50% in respect of the image signal processing apparatus of FIG. 8.

FIG. 11 shows an example of a printed pattern of an image represented by a pseudo halftone image signal outputted from the apparatus of this embodiment which corresponds to a theoretical black density (tone level) of 50%. As understood from FIG. 11, the expansion of recorded dots increases the actual black density of the printed pattern by only a small value. Thus, the apparatus of this embodiment is advantageous in halftone reproducibility.

DESCRIPTION OF THE FOURTH PREFERRED EMBODIMENT

Figure 12:
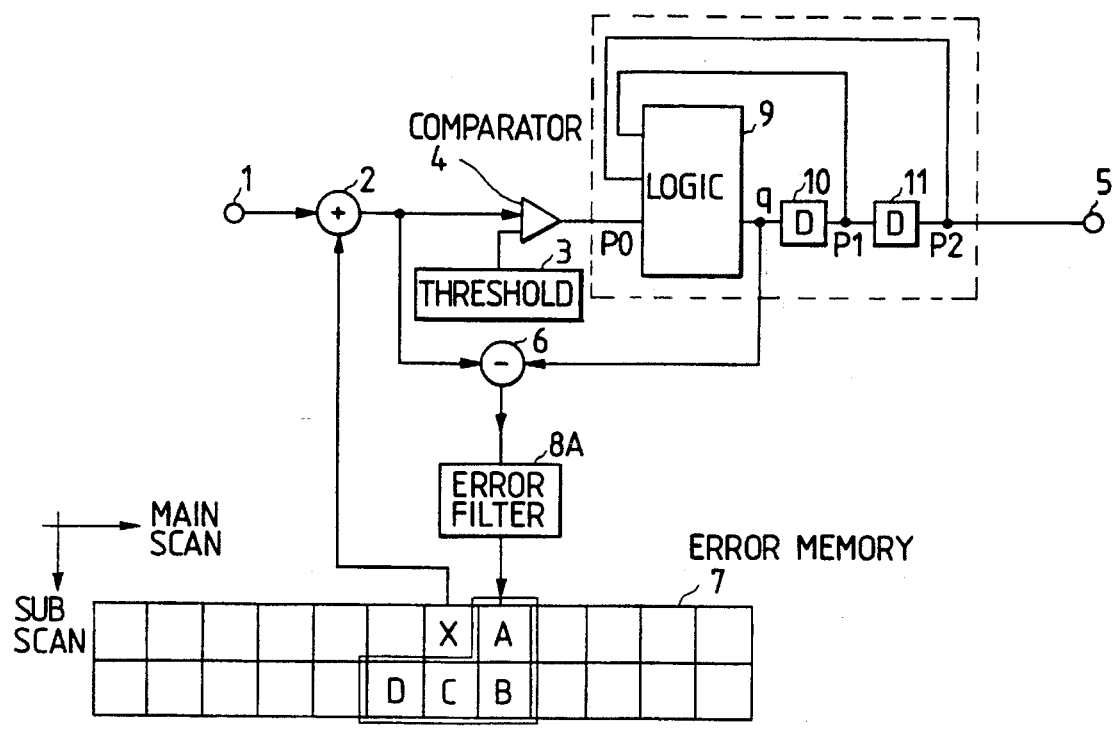
FIG. 12 is a block diagram of an image signal processing apparatus according to a fourth embodiment of this invention.

FIG. 12 shows a fourth embodiment of this invention which is similar to the embodiment of FIG. 3 except for design changes described hereinafter.

As shown in FIG. 12, the fourth embodiment uses an error filter 8A instead of the error filter 8 of FIG. 3. The error filter 8A is connected to the input side of an error data memory 7. In the embodiment of FIG. 12, the output side of the error data memory 7 is directly connected to an adder 2. The error filter 8A receives error data from a subtracter 6. The error filter 8A divides the error data into portions and weights the portions before allotting the weighted portions to pixels near the pixel of interest respectively. The error filter 8A writes the weighted error data portions into corresponding storage segments of the error data memory 7. In this way, corrective data corresponding to the output signal of the error filter 8 of FIG. 3 is prepared in the error data memory 7. Corrective data for the pixel of interest, which is denoted by the character "⊗" in the block 7 of FIG. 12, is directly fed from the error data memory 7 to the adder 2. Error data which results from the processing of the pixel of interest is distributed by the error filter 8A to later-processed pixels "A", "B", "C", and "D" near the pixel of interest.

DESCRIPTION OF THE FIFTH PREFERRED EMBODIMENT

Figure 13:
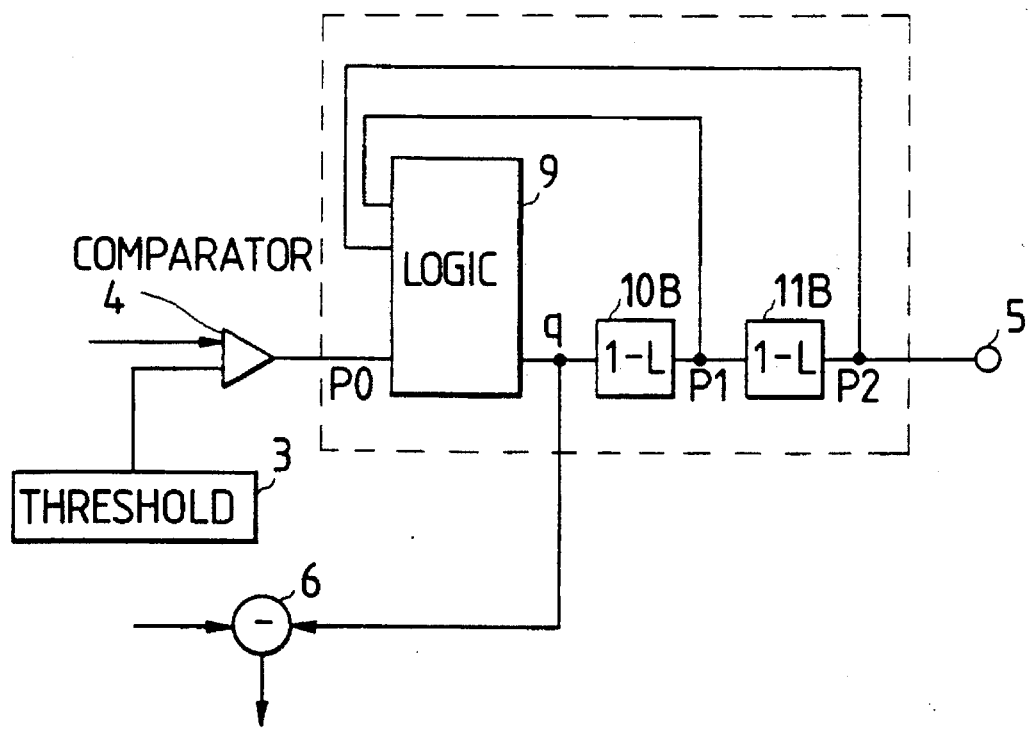
FIG. 13 is a block diagram of an image signal processing apparatus according to a fifth embodiment of this invention.

FIG. 13 shows a fifth embodiment of this invention which is similar to the embodiment of FIG. 3 except for design changes described hereinafter.

The embodiment of FIG. 13 uses 1-line delay circuits 10B and 11B instead of the flip-flops 10 and 11 of FIG. 3 respectively. The delay circuits 10B and 11B provide signal delays corresponding to a 1-line interval. The delay circuit 10B outputs a signal P1 corresponding to a pixel which precedes the pixel of interest by a 1-line interval. The delay circuit 11B outputs a signal P2 corresponding to a pixel which precedes the pixel of interest by a 2-line interval.

A logic circuit 9 receives an output signal P0 from a comparator 4 which corresponds to the pixel of interest. The logic circuit 9 also receives the 1-line preceding pixel signal P1 and the 2-line preceding pixel signal P2 from the delay circuits 10B and 11B respectively. The logic circuit 9 generates and outputs a signal "q" in response to the current pixel signal P0, the 1-line preceding pixel signal P1, and the 2-line preceding pixel signal P2.

As described previously, the signal P0 corresponds to the pixel of interest, that is, the current pixel. The pixels corresponding to the signals P0, P1, and P2 occupy equal positions in three successive lines respectively. In other words, the pixels corresponding to the signals P0, P1, and P2 are aligned along the sub scanning direction.

As understood from Table 1, when the 2-line preceding pixel signal P2 is white ("1") and the 1-line preceding pixel signal P1 is black ("0"), the logic circuit 9 sets the output signal "q" to black ("0") independent of the state of the current pixel (the pixel of interest) signal P0. In other cases, the state of the output signal "q" is equal to the state of the current pixel signal P0. Thus, with respect to the sub scanning direction, the logic circuit 9 serves to replace a black run of a length of 1 with a black run of a length of 2 in a pseudo halftone image signal.

The logic circuit 9 provides successions of black dots along the sub scanning direction. According to MR or MMR coding, a succession of black dots along the sub scanning direction corresponds to a vertical mode "V(0)". The vertical mode V(0)" is represented by a code word having a length of 1 which is shorter than other vertical mode code words. As a result, the coding efficiency is improved.

In addition, the apparatus of this embodiment enables a higher halftone reproducibility in cases where an image represented by a pseudo halftone image is visualized by a printer such as a laser beam printer or an ink jet printer which generate recorded dots liable to expand.

Figure 14:
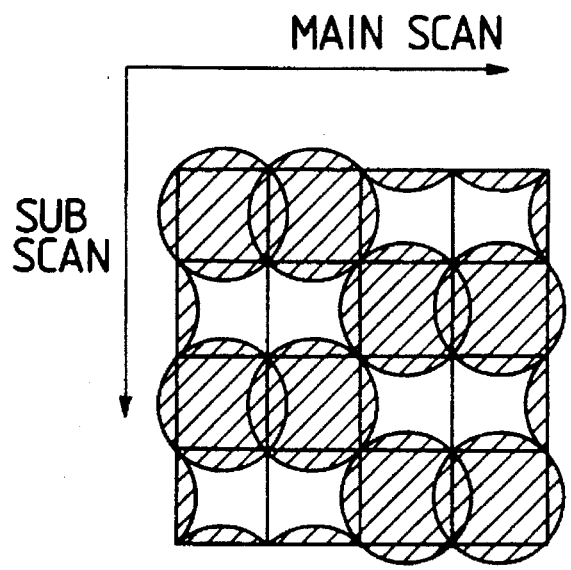
FIG. 14 is a diagram showing a recorded pattern of a pseudo halftone image signal having a density of 50% in respect of the image signal processing apparatus of FIG. 13.

FIG. 14 shows an example of a printed pattern of an image represented by a pseudo halftone image signal outputted from the apparatus of this embodiment which corresponds to a theoretical black density (tone level) of 50%. In FIG. 14, the expansion of recorded dots increases the actual black density of the printed pattern to about 70%. It is understood from the comparison between FIGS. 6 and 14 that the apparatus of this embodiment is advantageous over the prior-art apparatus of FIGS. 1 and 2 in halftone reproducibility.

DESCRIPTION OF THE SIXTH PREFERRED EMBODIMENT

Figure 15:
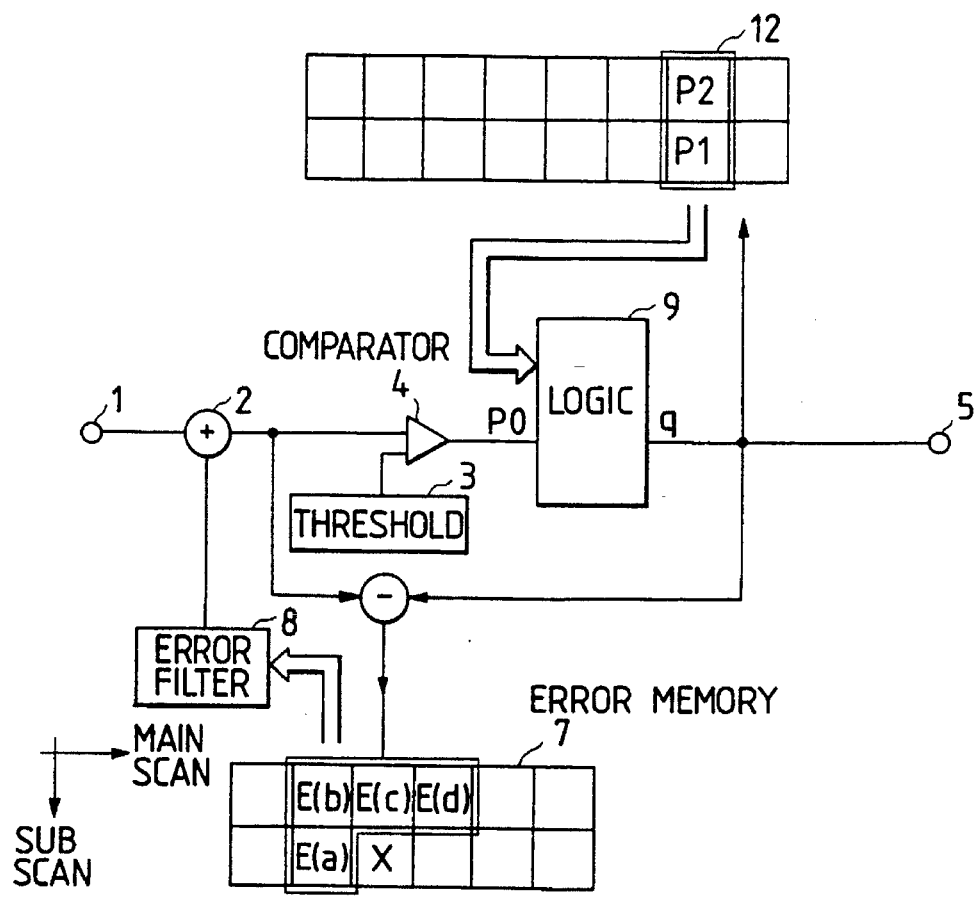
FIG. 15 is a block diagram of an image signal processing apparatus according to a sixth embodiment of this invention.

FIG. 15 shows a sixth embodiment of this invention which is similar to the embodiment of FIG. 13 except for a design change described hereinafter.

The embodiment of FIG. 15 uses a feedback circuit 12 instead of the delay circuits 10B and 11B of FIG. 13. The feedback circuit 12 is connected between the input side and the output side of a logic circuit 9. The feedback circuit 12 includes a 2-line memory. The feedback circuit 12 generates a 1-line preceding pixel signal P1 and a 2-line preceding pixel signal P2 on the basis of an output signal "q" of the logic circuit 9. The signals P1 and P2 are outputted from the feedback circuit 12 to the input side of the logic circuit 9.

DESCRIPTION OF THE SEVENTH PREFERRED EMBODIMENT

A seventh embodiment of this invention is similar to the embodiment of FIG. 13 except for the design of a logic circuit 9. In the seventh embodiment, the logic circuit 9 is designed so as to replace a white run of a length of 1 with a white run of a length of 2 along the sub scanning direction.

The logic circuit 9 includes a combination of logic gates. The relation between the logical state of an output signal "q" and the logical states of input signals P0, P1, and P2 in connection with the logic circuit 9 is similar to that shown in Table 1.

DESCRIPTION OF THE EIGHTH PREFERRED EMBODIMENT

Figure 16:
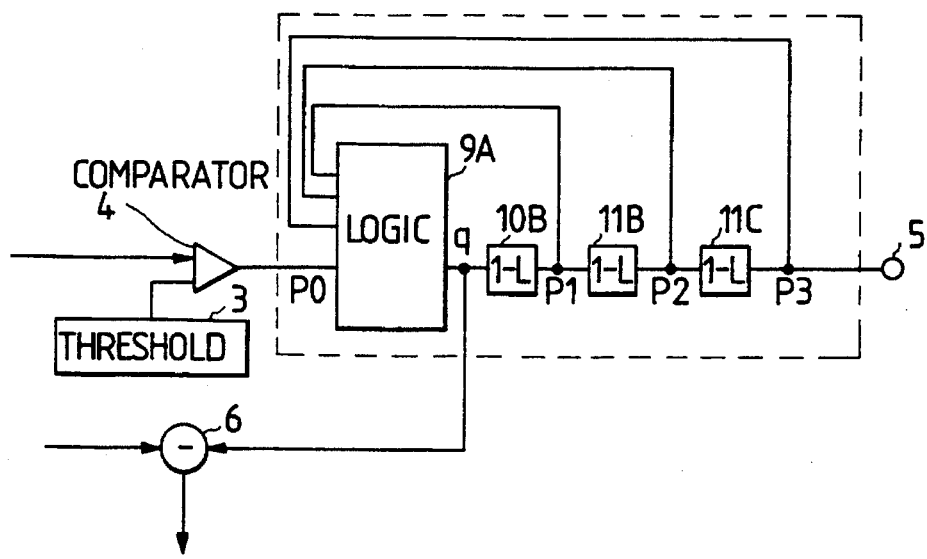
FIG. 16 is a block diagram of an image signal processing apparatus according to an eighth embodiment of this invention.

FIG. 16 shows an eighth embodiment of this invention which is similar to the embodiment of FIG. 13 except for design changes described hereinafter.

As shown in FIG. 16, the eighth embodiment includes a 1-line delay circuit 11C connected between a 1-line delay circuit 11B and an output terminal 5. A logic circuit 9A receives output signals P0, P1, P2, and P3 from devices 4, 10B, 11B, and 11C. The logic circuit 9A generates and outputs a signal "q" in response to the received signals P0, P1, P2, and P3.

The logic circuit 9A includes a combination of logic gates. The relation between the logical state of the output signal "q" and the logical states of the input signals P0, P1, P2, and P3 in connection with the logic circuit 9A is similar to that shown in Table 3.

DESCRIPTION OF THE NINTH PREFERRED EMBODIMENT

Figure 17:
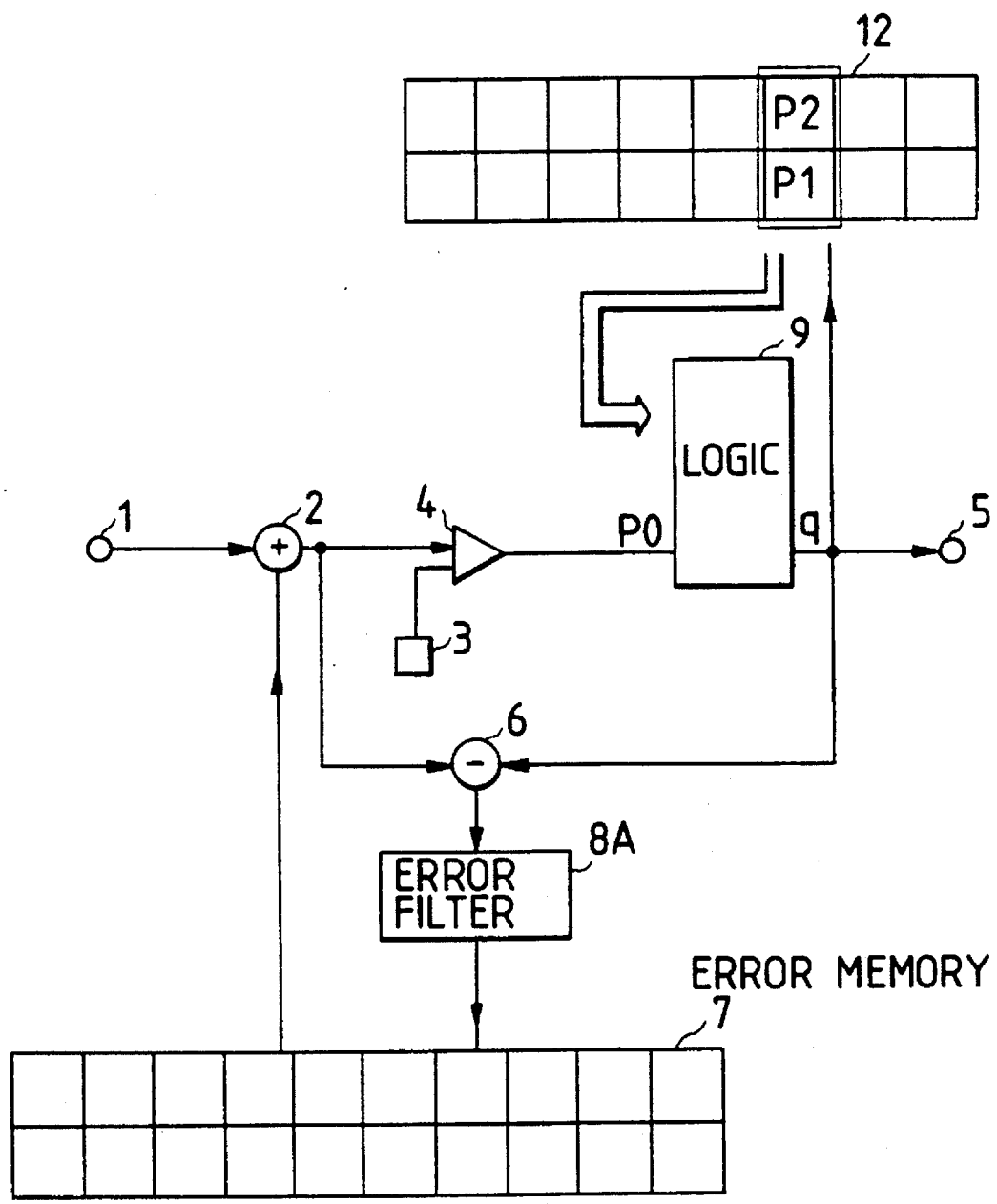
FIG. 17 is a block diagram of an image signal processing apparatus according to a ninth embodiment of this invention.

FIG. 17 shows a ninth embodiment of this invention which is similar to the embodiment of FIG. 15 except for design changes described hereinafter.

As shown in FIG. 17, the ninth embodiment uses an error filter 8A instead of the error filter 8 of FIG. 15. The error filter 8A is connected to the input side of an error data memory 7. In the embodiment of FIG. 17, the output side of the error data memory 7 is directly connected to an adder 2. The error filter 8A receives error data from a subtracter 6. The error filter 8A divides the error data into portions and weights the portions before allotting the weighted portions to pixels near the pixel of interest respectively. The error filter 8A writes the weighted error data portions into corresponding storage segments of the error data memory 7. In this way, corrective data corresponding to the output signal of the error filter 8 of FIG. 15 is prepared in the error data memory 7. Corrective data for the pixel of interest is directly fed from the error data memory 7 to the adder 2. Error data which results from the processing of the pixel of interest is distributed by the error filter 8A to a given number of later-processed pixels near the pixel of interest.

DESCRIPTION OF THE TENTH PREFERRED EMBODIMENT

Figure 18:
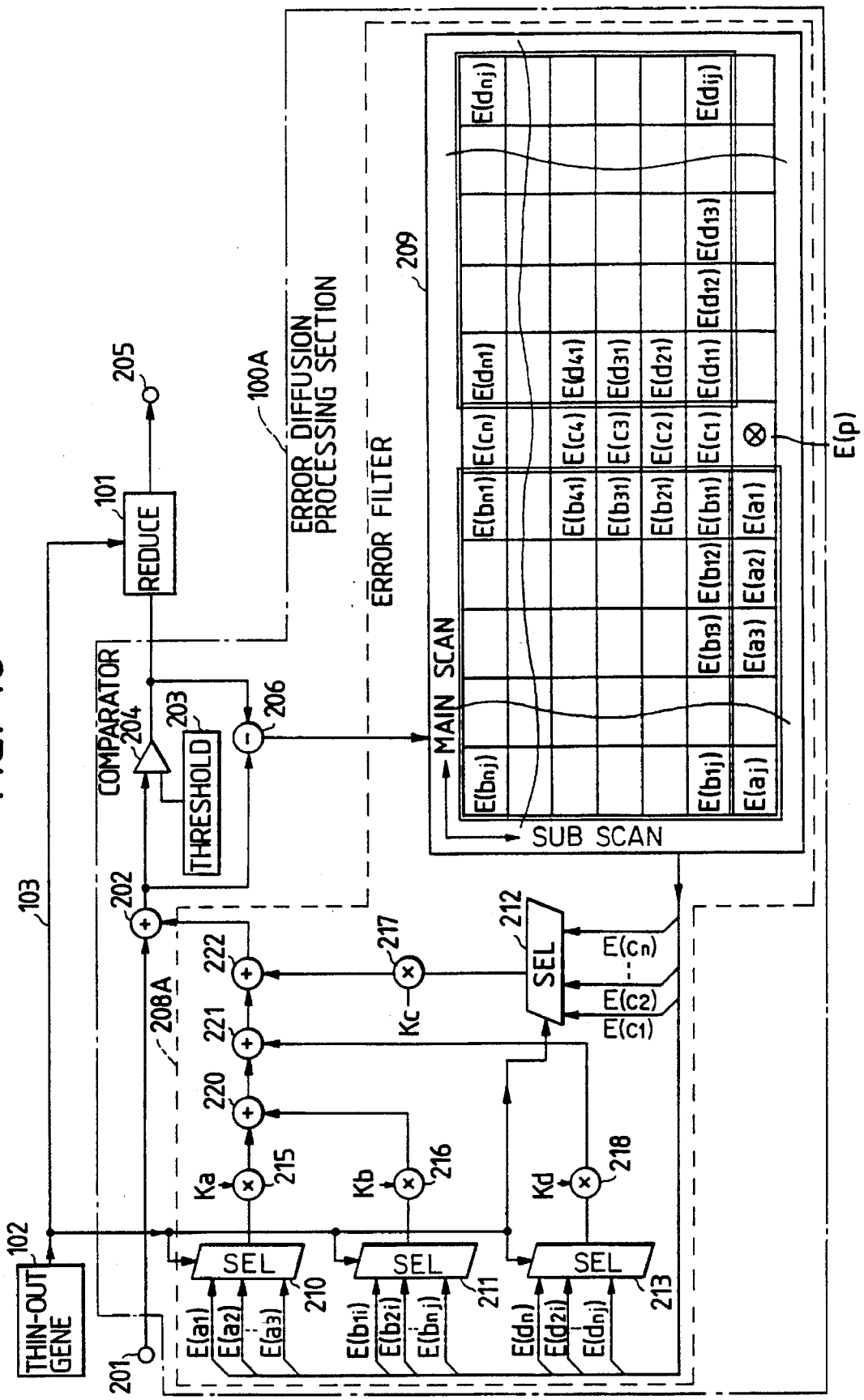
FIG. 18 is a block diagram of an image signal processing apparatus according to a tenth embodiment of this invention.

With reference to FIG. 18, an image signal processing apparatus includes an input terminal 201 via which a true halftone input image signal is fed to an error diffusion processor 100A. The error diffusion processor 100A converts the true halftone input image signal into a corresponding first pseudo halftone image signal according to an error diffusion method. The error diffusion processor 100A outputs the first pseudo halftone image signal to a reducing section 101. The reducing section 101 thins out pixel data of the first pseudo halftone image signal in response to a thinning-out signal 103, thereby compressing the first pseudo halftone image signal into a second pseudo halftone image signal. The reducing section 101 outputs the second pseudo halftone image signal which is transmitted to an external device (not shown) via an output terminal 205. The thinning-out signal 103 is outputted from a signal generator 102. The thinning-out signal 103 determines pixels, the data of which are to be thinned out. The thinning-out signal 103 is also fed to the error diffusion processor 100A.

The error diffusion processor 100A includes a correcting section 202, a threshold generator 203, a comparator 204, a subtracter 206, and an error filter 208A. The true halftone input image signal is processed in a pixel-by-pixel manner by the correcting section 202 and later stages. The correcting section 202 corrects the input image signal in accordance with a corrective signal outputted from the error filter 208A. The correcting section 202 is composed of an adder or a subtracter in dependence upon the sign characteristics of the corrective signal outputted from the error filter 208A. In this embodiment, the correcting section 202 uses an adder.

The adder 202 adds the input image signal and the corrective signal outputted from the error filter 208A. The threshold generator 203 produces a signal representative of a predetermined threshold value which is used in binarizing an output signal of the adder 202 into a corresponding binary image signal (a first pseudo halftone image signal having a sequence of bi-level pixel components). The comparator 204 compares the output signal of the adder 202 and the threshold value signal, converting the output signal of the adder 202 into a corresponding 1-bit binary image signal (a first pseudo halftone image signal having a sequence of bi-level pixel components). The comparator 204 outputs the first pseudo halftone image signal to the reducing section 101.

The subtracter 206 subtracts the output signal of the comparator 204 from the output signal of the adder 202, generating error data corresponding to the pixel of interest. The subtracter 206 outputs the error data to the error filter 208A. The error filter 208A generates the corrective signal for next pixel data in accordance with the error data and the thinning-out signal. The error filter 208A outputs the corrective signal to the adder 202.

The error filter 208A includes an error data memory 209 composed of, for example, a frame memory or a semi-frame memory. In the block 209 of FIG. 18, the character E( . . . ) denotes a piece of error data which corresponds to a pixel, and the character in parentheses following the letter "E" denotes the name of the pixel or the location (address) of the pixel relative to the pixel "p" of interest. Specifically, the characters $a_1$ to $a_j$ denote already-processed pixels (composing an "A" pixel group) in a line which contains the pixel "p" of interest. The characters $c_1$ to $c_n$ denote already-processed pixels (composing a "C" pixel group) which are in lines preceding the line containing the pixel "p" of interest and which are equal to the pixel "p" of interest in position relative to line. The characters $b_1$ to $b_{nj}$ denote already-processed pixels (composing a "B" pixel group) which are in lines preceding the line containing the pixel "p" of interest and which are on the left of the pixel "p" of interest. The characters $d_{11}$ to $d_{nj}$ denote already-processed pixels (composing a "D" pixel group) which are in lines preceding the line containing the pixel "p" of interest and which are on the right of the pixel "p" of interest.

The error filter 208A also includes selectors 210, 211, 212, and 213 which receive the "A" pixel group error data, the "B" pixel group error data, the "C" pixel group error data, and the "D" pixel group error data from the error data memory 209 respectively. The selector 210 selects one error data piece from the "A" pixel group error data in response to the thinning-out signal 103, the selected error data piece corresponding to a pixel which relates to image data unremoved (not removed) by the reducing section 101 and which is closest in position to the pixel "p" of interest. The selector 211 selects one error data piece from the "B" pixel group error data in response to the thinning-out signal 103, the selected error data piece corresponding to a pixel which relates to image data unremoved by the reducing section 101 and which is closest in position to the pixel "p" of interest. The selector 212 selects one error data piece from the "C" pixel group error data in response to the thinning-out signal 103, the selected error data piece corresponding to a pixel which relates to image data unremoved by the reducing section 101 and which is closest in position to the pixel "p" of interest. The selector 213 selects one error data piece from the "D" pixel group error data in response to the thinning-out signal 103, the selected error data piece corresponding to a pixel which relates to image data unremoved by the reducing section 101 and which is closest in position to the pixel "p" of interest.

The error filter 208A further includes multipliers 215, 216, 217, and 218. The multiplier 215 provides the product of the value of the error data selected by the selector 210 and a weight coefficient Ka represented by a weight signal. The multiplier 215 outputs a signal representing the product. The multiplier 216 provides the product of the value of the error data selected by the selector 211 and a weight coefficient Kb represented by a weight signal. The multiplier 216 outputs a signal representing the product. The multiplier 217 provides the product of the value of the error data selected by the selector 212 and a weight coefficient Kc represented by a weight signal. The multiplier 217 outputs a signal representing the product. The multiplier 218 provides the product of the value of the error data selected by the selector 213 and a weight coefficient Kd represented by a weight signal. The multiplier 218 outputs a signal representing the product.

In addition, the error filter 208A includes adders 220, 221, and 222. The output signals of the multipliers 215, 216, 217, and 218 are added and combined into corrective data which is fed to the adder 202 as the corrective signal. The error data pieces selected by the selectors 210, 211, 212, and 213 are now denoted by the characters E(a), E(b), E(c), and E(d). The corrective data "S" is given by the following equation.

$$S = Ka \cdot E(a) + Kb \cdot E(b) + Kc \cdot E(c) + Kd \cdot E(d) \tag{1}$$

Figure 19:
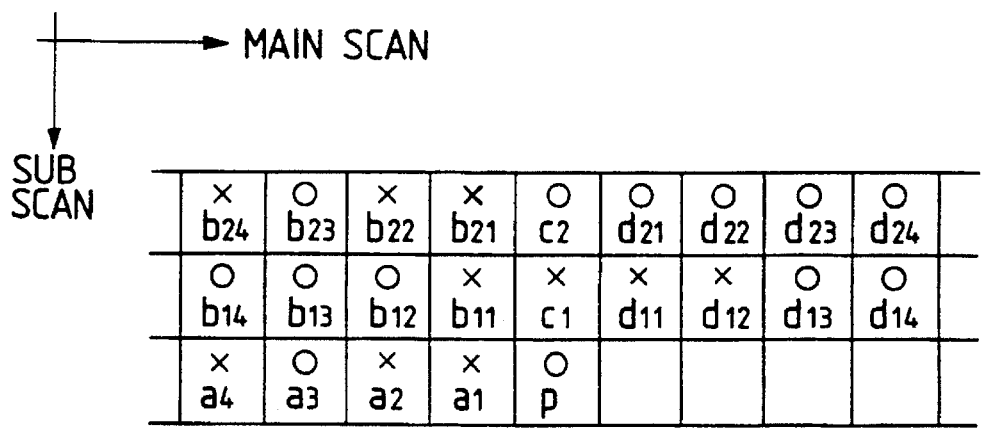
FIG. 19 is a diagram showing an example of conditions where pixels are thinned out.

FIG. 19 shows an example of conditions of pixels preceding the pixel "p" of interest. In FIG. 19, the character "x" denote a pixel related to image data which is removed by the reducing section 101, and the character "603" denotes a pixel related to image data which is not removed (unremoved) by the reducing section 101. Under the conditions of FIG. 19, the error data pieces related to pixels $a_3$, $b_{12}$, $c_2$, and $d_{21}$ are selected by the selectors 210, 211, 212, and 213 in respect of the pixel "p" of interest. The pixels $a_3$, $b_{12}$, $c_2$, and $d_{21}$ correspond to image data which is not removed by the reducing section 101. The error data "S" is generated on the basis of the selected error data pieces related to pixels $a_3$, $b_{12}$, $c_2$, and $d_{21}$ according to the equation (1).

In this way, the corrective data is generated from the error data pieces of pixels which are near the pixel of interest and which correspond to image data unremoved by the reducing section 101. As a result, the error can propagate between the pixels related to image data unremoved by the reducing section 101, and the error will not be lost during the propagation. Thus, the first pseudo halftone image signal inputted into the reducing section 101 and the second pseudo halftone image signal are kept equal in gross black density (net tone level), so that a high halftone reproducibility is realized.

DESCRIPTION OF THE ELEVENTH PREFERRED EMBODIMENT

Figure 20:
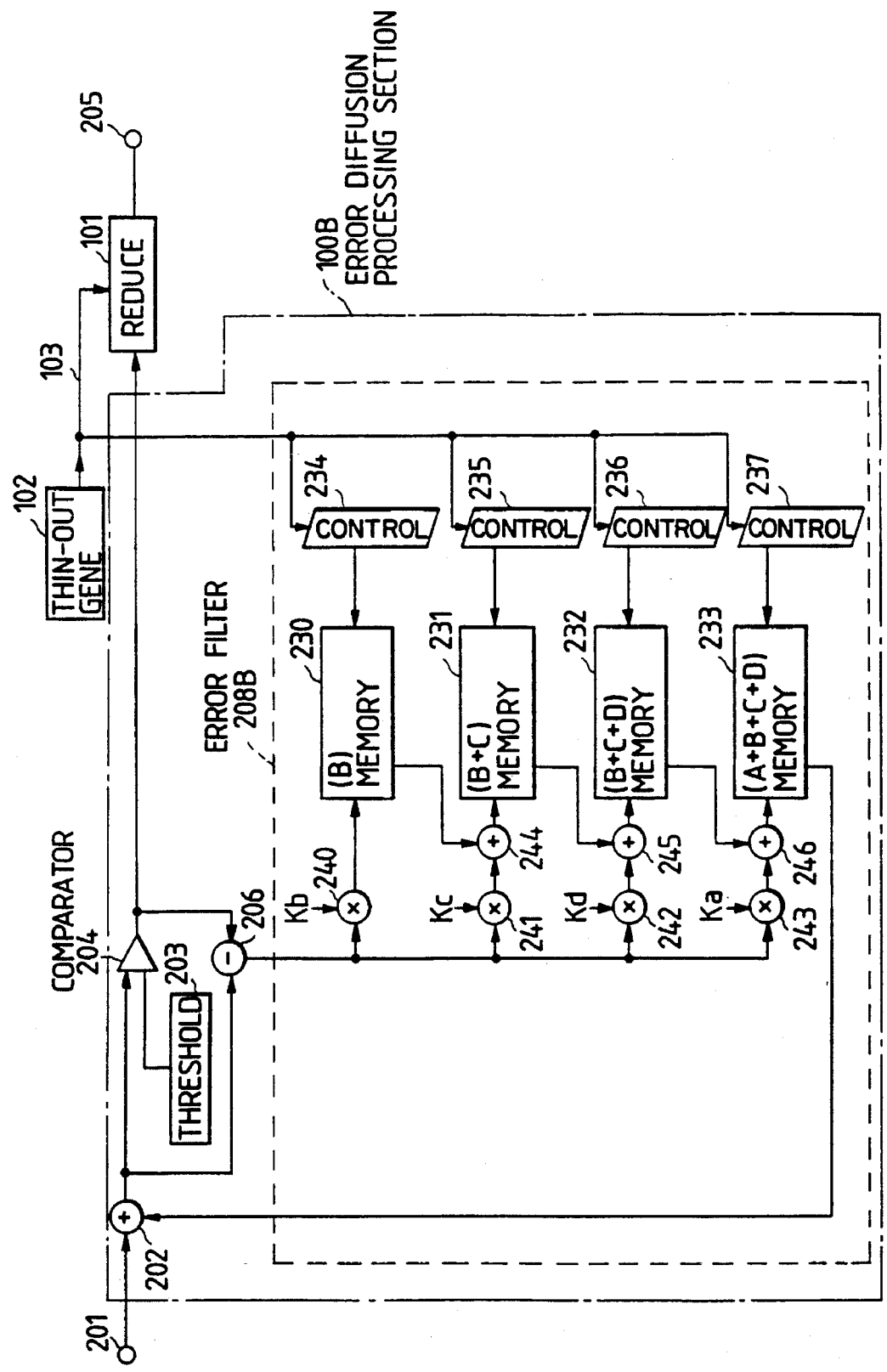
FIG. 20 is a block diagram of an image signal processing apparatus according to an eleventh embodiment of this invention.

FIG. 20 shows an eleventh embodiment of this invention which is similar to the embodiment of FIG. 18 except that an error filter 208B is used instead of the error filter 208A of FIG. 18. The error filter 208B is contained in an error diffusion processor 100B.

As shown in FIG. 20, the error filter 208B includes memories 230, 231, 232, and 233, memory controllers 234, 235, 236, and 237, multipliers 240, 241, 242, and 243, and adders 244, 245, and 246. The memory controllers 234, 235, 236, and 237 receive a thinning-out signal from a signal generator 102, and controls the memories 230, 231, 232, and 233 in response to the thinning-out signal. The thinning-out signal enables the memory controllers 234, 235, 236, and 237 to recognize whether each of pixels relates to image data which is removed or unremoved by a reducing section 101.

Figure 21:
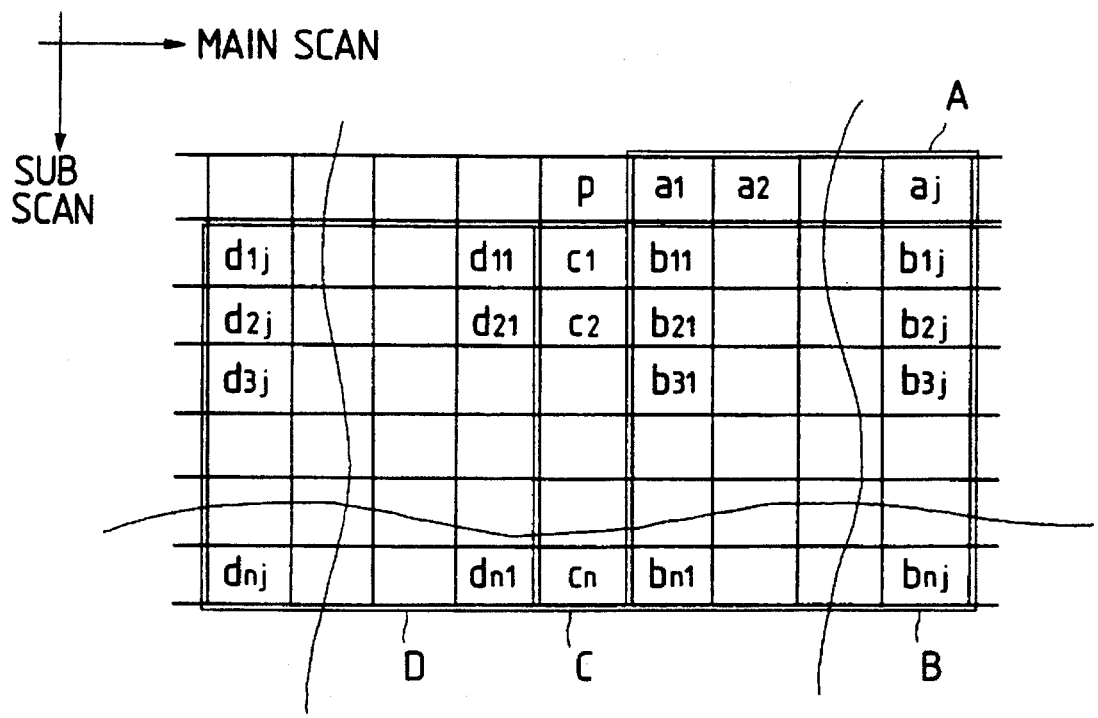
FIG. 21 is a diagram showing an array of pixels and characters denoting the pixels.

FIG. 21 shows an array of the pixel of interest and later pixels (unprocessed pixels) near the pixel of interest. In FIG. 21, the character "p" denotes the pixel of interest. The characters $a_1$ to $a_j$ denote unprocessed pixels (composing an "A" pixel group) in a line which contains the pixel "p" of interest. The characters $b_{11}$ to $b_{nj}$ denote unprocessed pixels (composing a "B" pixel group) which are in lines following the line containing the pixel "p" of interest and which are on the right of the pixel "p" of interest. The characters $c_1$ to $c_n$ denote unprocessed pixels (composing a "C" pixel group) which are in lines following the line containing the pixel "p" of interest and which are equal to the pixel "p" of interest in position relative to line. The characters $d_{11}$ to $d_{nj}$ denote unprocessed pixels (composing a "D" pixel group) which are in lines following the line containing the pixel "p" of interest and which are on the left of the pixel "p" of interest.

When the output signal of an adder 202 which corresponds to the pixel "p" of interest is binarized by a comparator 204 and related error data is outputted from a subtracter 206, the error data enters the multipliers 240, 241, 242, and 243. The multiplier 240 multiplies the error data of the pixel "p" of interest by a weight coefficient Kb, and the output signal of the multiplier 240 which represents the multiplication result is applied to the memory 230. The memory controller 234 writes the output signal of the multiplier 240 into a storage segment of the memory 230 designated by an address corresponding to a pixel in the "B" pixel group which relates to image data unremoved by the reducing section 101 and which is closest in position to the pixel "p" of interest. Then, the memory controller 234 reads out the data from a storage segment of the memory 230 designated by an address corresponding to a pixel in the "C" pixel group which relates to image data unremoved by the reducing section 101 and which is closest in position to the pixel "p" of interest. The read-out data from the memory 230 is fed to the adder 244.

In addition, the multiplier 241 multiplies the error data of the pixel "p" of interest by a weight coefficient Kc, and the output signal of the multiplier 241 which represents the multiplication result is applied to the adder 244. The output signal of the multiplier 241 and the output signal of the memory 230 are added by the adder 244. The output signal of the adder 244 is applied to the memory 231. The memory controller 235 writes the output signal of the adder 244 into a storage segment of the memory 231 designated by an address corresponding to a pixel in the "C" pixel group which relates to image data unremoved by the reducing section 101 and which is closest in position to the pixel "p" of interest. Then, the memory controller 235 reads out the data from a storage segment of the memory 231 designated by an address corresponding to a pixel in the "D" pixel group which relates to image data unremoved by the reducing section 101 and which is closest in position to the pixel "p" of interest. The read-out data from the memory 231 is fed to the adder 245.

Furthermore, the multiplier 242 multiplies the error data of the pixel "p" of interest by a weight coefficient Kd, and the output signal of the multiplier 242 which represents the multiplication result is applied to the adder 245. The output signal of the multiplier 242 and the output signal of the memory 231 are added by the adder 245. The output signal of the adder 245 is applied to the memory 232. The memory controller 236 writes the output signal of the adder 245 into a storage segment of the memory 232 designated by an address corresponding to a pixel in the "D" pixel group which relates to image data unremoved by the reducing section 101 and which is closest in position to the pixel "p" of interest. Then, the memory controller 236 reads out the data from a storage segment of the memory 232 designated by an address corresponding to a pixel in the "A" pixel group which relates to image data unremoved by the reducing section 101 and which is closest in position to the pixel "p" of interest. The read-out data from the memory 232 is fed to the adder 246.

In addition, the multiplier 243 multiplies the error data of the pixel "p" of interest by a weight coefficient Ka, and the output signal of the multiplier 243 which represents the multiplication result is applied to the adder 246. The output signal of the multiplier 243 and the output signal of the memory 232 are added by the adder 246. The output signal of the adder 246 is applied to the memory 233. The memory controller 237 writes the output signal of the adder 246 into a storage segment of the memory 233 designated by an address corresponding to a pixel in the "A" pixel group which relates to image data unremoved by the reducing section 101 and which is closest in position to the pixel "p" of interest. Then, the memory controller 237 reads out the data from a storage segment of the memory 233 designated by an address corresponding to the pixel $a_1$ (see FIG. 21). The read-out data from the memory 233 is fed to the adder 202 as a corrective signal.

In this way, the corrective data is generated from the error data pieces of pixels which are near the pixel of interest and which correspond to image data unremoved by the reducing section 101. As a result, the error can propagate between the pixels related to image data unremoved by the reducing section 101, and the error will not be lost during the propagation. Thus, the first pseudo halftone image signal inputted into the reducing section 101 and the second pseudo halftone image signal are kept equal in gross black density (net tone level), so that a high halftone reproducibility is realized.

DESCRIPTION OF THE TWELFTH PREFERRED EMBODIMENT

Figure 22:
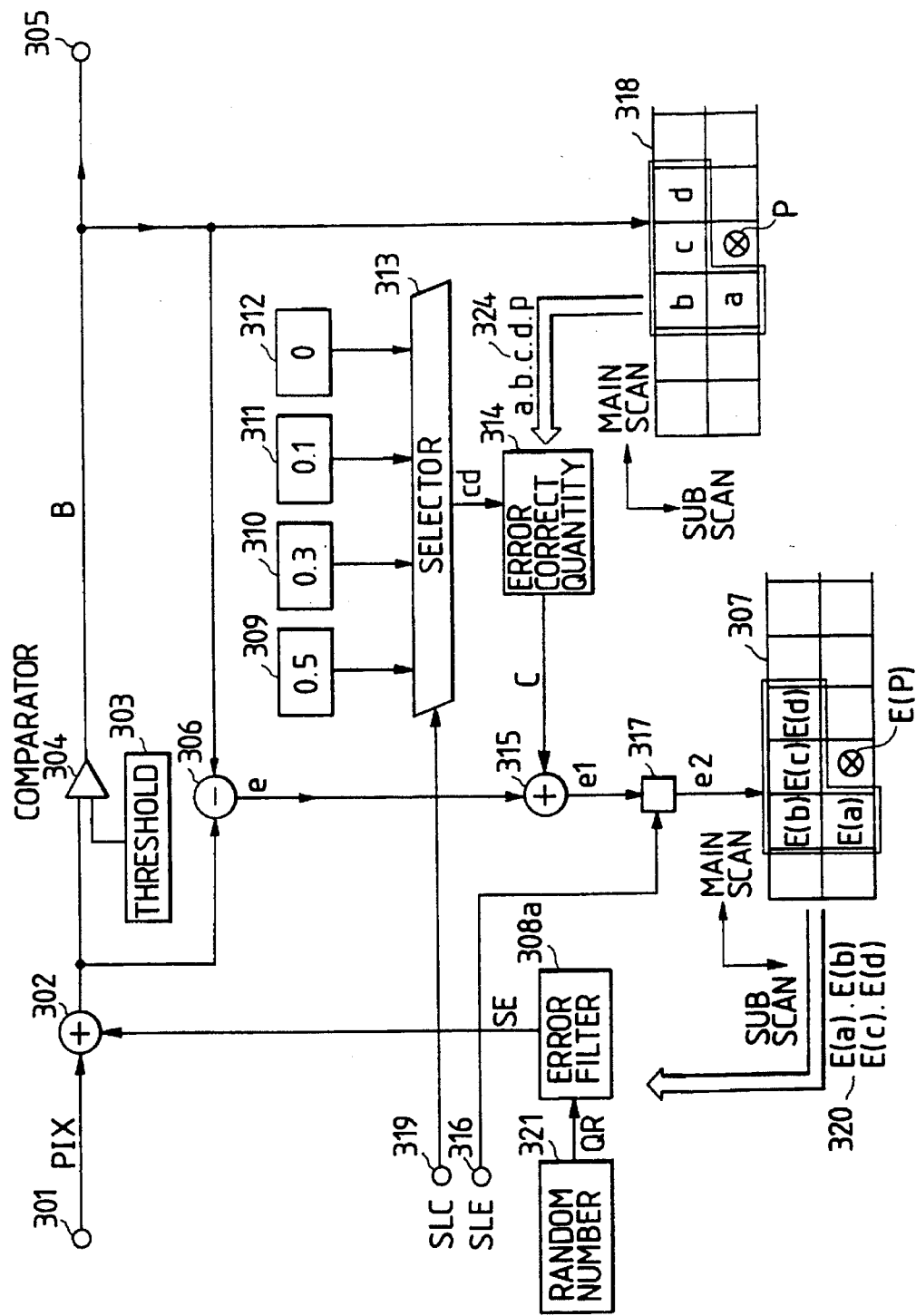
FIG. 22 is a block diagram of an image signal processing apparatus according to a twelfth embodiment of this invention.

With reference to FIG. 22, an image signal processing apparatus includes an input terminal 301 via which a true halftone input image signal is fed to a correcting section 302. The input image signal is generated by a suitable device such as an image scanner. The input image signal has time segments corresponding to pixels respectively. The input image signal is processed in a pixel-by-pixel manner by the correcting section 302 and later stages.

The correcting section 302 corrects the input image signal in accordance with a corrective signal outputted from an error filter 308a described later. The correcting section 302 is composed of an adder or a subtracter in dependence upon the sign characteristics of the corrective signal. In this embodiment, the correcting section 302 uses an adder.

The adder 302 adds the input image signal and the corrective signal outputted from the error filter 308a. A threshold generator 303 produces a signal representative of a predetermined threshold value which is used in binarizing an output signal of the adder 302 into a corresponding binary image signal (a pseudo halftone image signal having a sequence of bi-level pixel components). A comparator 304 compares the output signal of the adder 302 and the threshold value signal, converting the output signal of the adder 302 into a corresponding 1-bit binary image signal (a pseudo halftone image signal having a sequence of bi-level pixel components). The comparator 304 outputs the pseudo halftone image signal which is transmitted to an external device (not shown) via an output terminal 305. The output signal of the comparator 304 is also fed to a subtracter 306.

The subtracter 306 subtracts the output signal of the comparator 304 from the output signal of the adder 302, generating and outputting first error data corresponding to the pixel of interest. An error data memory 307 stores second error data generated on the basis of the first error data outputted from the subtracter 306. The error filter 308a receives the second error data from the error data memory 307, and subjects the error data to a filtering process in response to a random number signal fed from a signal generator 321. Specifically, the error filter 308a weights pieces of the second error data which correspond to pixels near the pixel of interest. During the weighting process, the error filter 308a changes weight coefficients in response to the random number signal. Then, the error filter 308a sums up and combines the weighted error data into corrective data, and outputs the corrective data as a corrective signal.

Memories 309, 310, 311, and 312 store data representing given values of an error corrective quantity which depend on a recorded dot corrective coefficient "k". Specifically, the memory 309 stores corrective quantity data corresponding to "k=0.5". The memory 310 stores corrective quantity data corresponding to "k=0.3". The memory 311 stores corrective quantity data corresponding to "k=0.1". The memory 312 stores corrective quantity data corresponding to "k=0". A selector 313 selects one of the output signals from the memories 309, 310, 311, and 312 in response to a selection signal fed via a terminal 319, and transmits the selected signal to a corrective quantity deciding section 314. The corrective quantity deciding section 314 decides an error corrective quantity in response to the output signal of the selector 313 and the output signal of an output-image memory 318. The output signal of the corrective quantity deciding section 314 which represents the decided error corrective quantity is applied to an adder 315. The first error data is fed to the adder 315 from the subtracter 306. The first error data and the error corrective quantity are added by the adder 315. The output signal of the adder 315 is fed to an error data correcting section 317. An effectiveness signal representing whether or not the input image signal is effective is fed to the error data correcting section 317 via a terminal 316. When the effectiveness signal represents that the input image signal is effective, the error data correcting section 317 transmits the output signal of the adder 315 to the error data memory 307 as second error data. When the effectiveness signal represents that the input image signal is not effective, the error data correcting section 317 forces the error, represented by the output signal of the adder 315, to be zero and then outputs the zero-error data to the error data memory 307 as second error data.

The pseudo halftone image signal outputted from the comparator 304 is stored into the output-image memory 318. A 5-bit signal 324 having five bi-level components "a", "b", "c", "d", and "p" is outputted from the output-image memory 318 to the corrective quantity deciding section 314. The output signal 320 of the error data memory 307 is composed of second error data pieces E(a), E(b), E(c), and E(d) corresponding to pixels near the pixel "p" of interest respectively.

The apparatus of this embodiment operates as follows. The true halftone input image signal PIX corresponding to the pixel "p" of interest is fed to the adder 302 via the input terminal 301. The adder 302 receives the corrective signal SE from the error filter 308a. The adder 302 adds the corrective signal SE to the input image signal PIX. The output signal of the adder 302 is binarized by the comparator 304 with reference to the threshold value generated by the threshold generator 303. The comparator 304 outputs the resultant binary image signal "B", that is, the pseudo halftone image signal, which corresponds to the pixel "p" of interest. The output image signal "B" of the comparator 304 is stored into the output-image memory 318. In addition, the output image signal "B" of the comparator 304 is fed to the subtracter 306. Furthermore, the output image signal "B" of the comparator 304 is transmitted to an external device (not shown) via the output terminal 305. The subtracter 306 subtracts the output signal of the comparator 304 from the output signal of the adder 302, generating and outputting first error data "e" corresponding to the pixel of interest.

The recorded dot corrective coefficient "k" corresponds to the difference between a theoretical dot size and an actual dot size provided by a recording system. The memories 309, 310, 311, and 312 store corrective quantity data corresponding to the recorded dot corrective coefficients "k=0.5", "k=0.3", "k=0.1", and "k=0" respectively. During a preliminary process which is done before the execution of the error diffusion process, the selector 313 selects one of the output signals from the memories 309, 310, 311, and 312 in response to the selection signal SLC fed via the terminal 319, and writes the selected signal "cd" into a RAM table provided in the corrective quantity deciding section 314.

The selection signal SLC is designed so that one of the output signals of the memories 309, 310, 311, and 312 will be selected according to conditions of batters and unwanted expansions of recorded dots at a local copying system or a receiver-side recording system in the case of a facsimile machine. When the type of the recording system is unknown, the selection signal SLC is designed so as to select the recorded dot corrective coefficient "k=0" fed from the memory 312.

The corrective quantity deciding section 314 receives the 5-bit image signal 324 from the output-image memory 318 which corresponds to the pixel "p" of interest and pixels "a", "b", "c", and "d" near the pixel "p" of interest. The corrective quantity deciding section 314 generates the error corrective quantity "C" on the basis of the received 5-bit image signal 324 by referring to the internal RAM table. The corrective quantity deciding section 314 outputs the error corrective quantity "C" to the adder 315. The adder 315 receives the first error data "e" from the subtracter 306. The adder 315 adds the error corrective quantity "C" to the first error data "e", thereby generating the correction-resultant error data "e1".

The error data correcting section 317 receives the error data "e1" from the adder 315. In addition, the error data correcting section 317 receives the effectiveness signal SLE, representing whether or not the input image signal is effective, via the terminal 316. When the effectiveness signal SLE represents that the input image signal is effective, the error data correcting section 317 transmits the output signal "e1" of the adder 315 to the error data memory 307 as second error data "e2". When the effectiveness signal SLE represents that the input image signal is not effective, the error data correcting section 317 forces the error, represented by the output signal of the adder 315, to be zero and then outputs the zero-error data to the error data memory 307 as second error data "e2".

The second error data "e2" outputted from the error data correcting section 317 is stored into the error data memory 307. The error filter 308a receives the output signal 320 from the error data memory 307 which is composed of second error data pieces E(a), E(b), E(c), and E(d) corresponding to the pixels "a", "b", "c", and "d" near the pixel "p" of interest respectively. The error filter 308a subjects the received second error data 320 to a filtering process in response to the 1-bit pseudo random number signal QR fed from the signal generator 321. Specifically, the error filter 308a weights pieces of the second error data which correspond to pixels near the pixel of interest. During the weighting process, the error filter 308a changes weight coefficients in response to the random number signal. Then, the error filter 308a sums up and combines the weighted error data into corrective data, and outputs the corrective data as a corrective signal SE.

Figure 23:
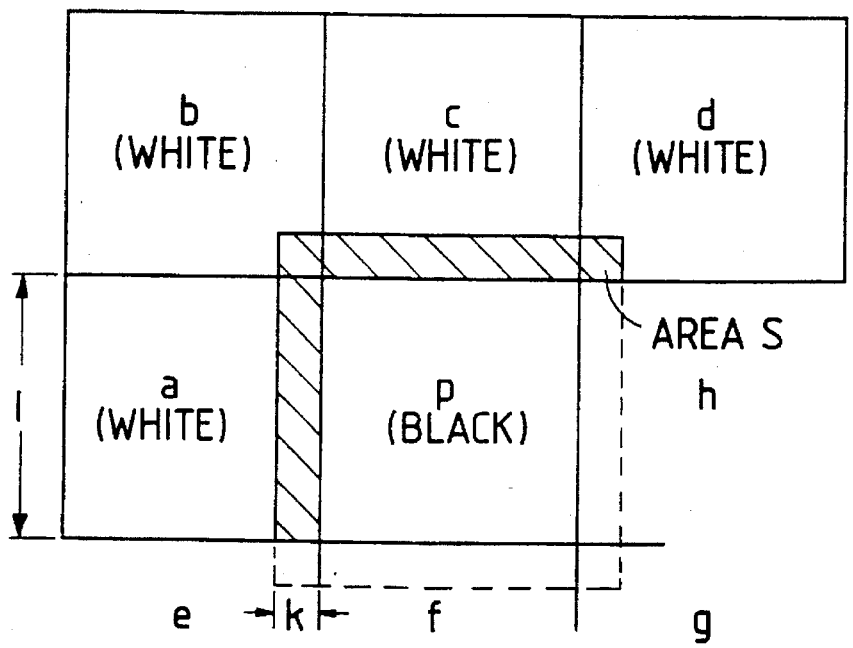
FIG. 23 is a diagram showing an example of conditions where a black dot of a pixel of interest extends into neighboring white pixels.

A consideration will now be given of a first example of conditions shown in FIG. 23. In the example of FIG. 23, the pixel of interest is "black" while the neighboring pixels are "white". In FIG. 23, the letter "p" denotes the pixel of interest, and the letters "a", "b", "c", and "d" denote the neighboring pixels. In FIG. 23, the hatched region denotes portions of the neighboring pixels "a", "b", "c", and "d" into which the black dot extends or overflows. Correction on the hatched region (the overflow region) is executed in connection with the pixel of interest as will be explained later. It should be noted that correction on a similar overflow region defined by the dashed lines is not executed with respect to the pixel of interest but is executed in connection with the neighboring pixels "e", "f", "g", and "h".

In FIG. 23, when the theoretical dot width is defined as being equal to 1, the area "S" of the hatched region (the overflow region) is expressed by the following equation.

$$S=2k+2k^2$$

where the letter "k" denotes the width of the overflow region which corresponds to the corrective coefficient. When the level of the input image signal which corresponds to "white" is represented by "W", the corrective quantity "C" is given as follows.

$$C=(2k+2k^2)\times W$$

With respect to the error data "e", the corrective error data "e1" is given as follows.

$$e1=e+(2k+2k^2)\times W$$

Figure 24:
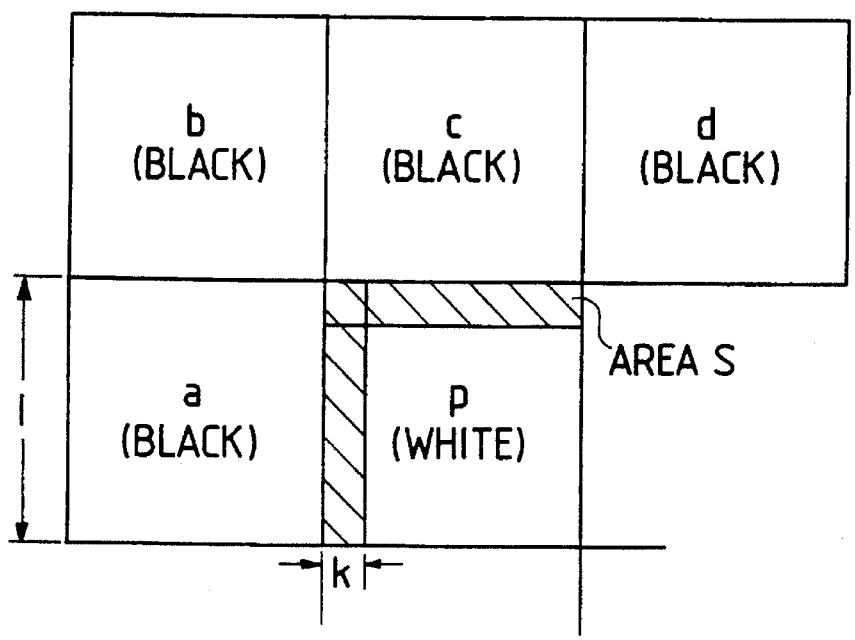
FIG. 24 is a diagram showing an example of conditions where black dots extend into a white pixel of interest.

A consideration will now be given of a second example of conditions shown in FIG. 24. In the example of FIG. 24, the pixel of interest is "white" while the neighboring pixels are "black". In FIG. 24, the letter "p" denotes the pixel of interest, and the letters "a", "b", "c", and "d" denote the neighboring pixels. In FIG. 24, the hatched region denotes a portion of the white pixel "p" into which the black dots extend or overflow. Correction on the hatched region (the overflow region) is executed in connection with the pixel of interest as will be explained later.

In FIG. 24, when the theoretical dot width is defined as being equal to 1, the area "S" of the hatched region (the overflow region) is expressed by the following equation.

$$S=2k-k^2$$

where the letter "k" denotes the width of the overflow region which corresponds to the corrective coefficient. When the level of the input image signal which corresponds to "white" is represented by "W", the corrective quantity "C" is given as follows.

$$C=(2k-k^2)\times W$$

With respect to the error data "e", the corrective error data "e1" is given as follows.

$$e1=e+(2k-k^2)\times W$$

Under conditions where combinations of the states of the pixel "p" of interest and the neighboring pixels "a", "b", "c", and "d" are different from those In the previously-mentioned first and second examples, the corrective quantity "C" is determined similarly and the corrective error data "e1" is given with respect to the determined corrective quantity "C" as follows.

$$e1=e+C$$

Specifically, the relation between the corrective quantity "C" and the combination of the states of the pixel "p" of interest and the neighboring pixels "a", "b", "c", and "d" is shown in FIGS. 25 and 26 where "1" and "0" denote "white" and "black" respectively and "W" denotes the level of the input image signal which corresponds to "white".

The memory 309 stores data representing the corrective quantities "C" which are given for "k=0.5" according to the relations in FIGS. 25 and 26. The memory 310 stores data representing the corrective quantities "C" which are given for "k=0.3" according to the relations in FIGS. 25 and 26. The memory 311 stores data representing the corrective quantities "C" which are given for "k=0.1" according to the relations in FIGS. 25 and 26. The memory 312 stores data representing the corrective quantities "C" which are given for "k=0" according to the relations in FIGS. 25 and 26.

As described previously, the selector 313 selects one of the output signals from the memories 309, 310, 311, and 312 in response to the selection signal SLC fed via the terminal 319, and writes the selected signal "cd" into the RAM table provided in the corrective quantity deciding section 314. The selection signal SLC is designed so that one of the output signals of the memories 309, 310, 311, and 312 will be selected according to conditions of batters and unwanted expansions of recorded dots at a local copying system or a receiver-side recording system in the case of a facsimile machine. Specifically, when the degree of unwanted expansion (overflow) of a black dot is large, the output signal of the memory 309 which relates to "k=0.5" is selected by the selector 313. When the degree of unwanted expansion (overflow) of a black dot is intermediate, the output signal of the memory 310 which relates to "k=0.3" is selected by the selector 313. When the degree of unwanted expansion (overflow) of a black dot is small, the output signal of the memory 311 which relates to "k=0.1" is selected by the selector 313. When the degree of unwanted expansion (overflow) of a black dot is null or unknown, the output signal of the memory 312 which relates to "k=0" is selected by the selector 313.

Figure 27:
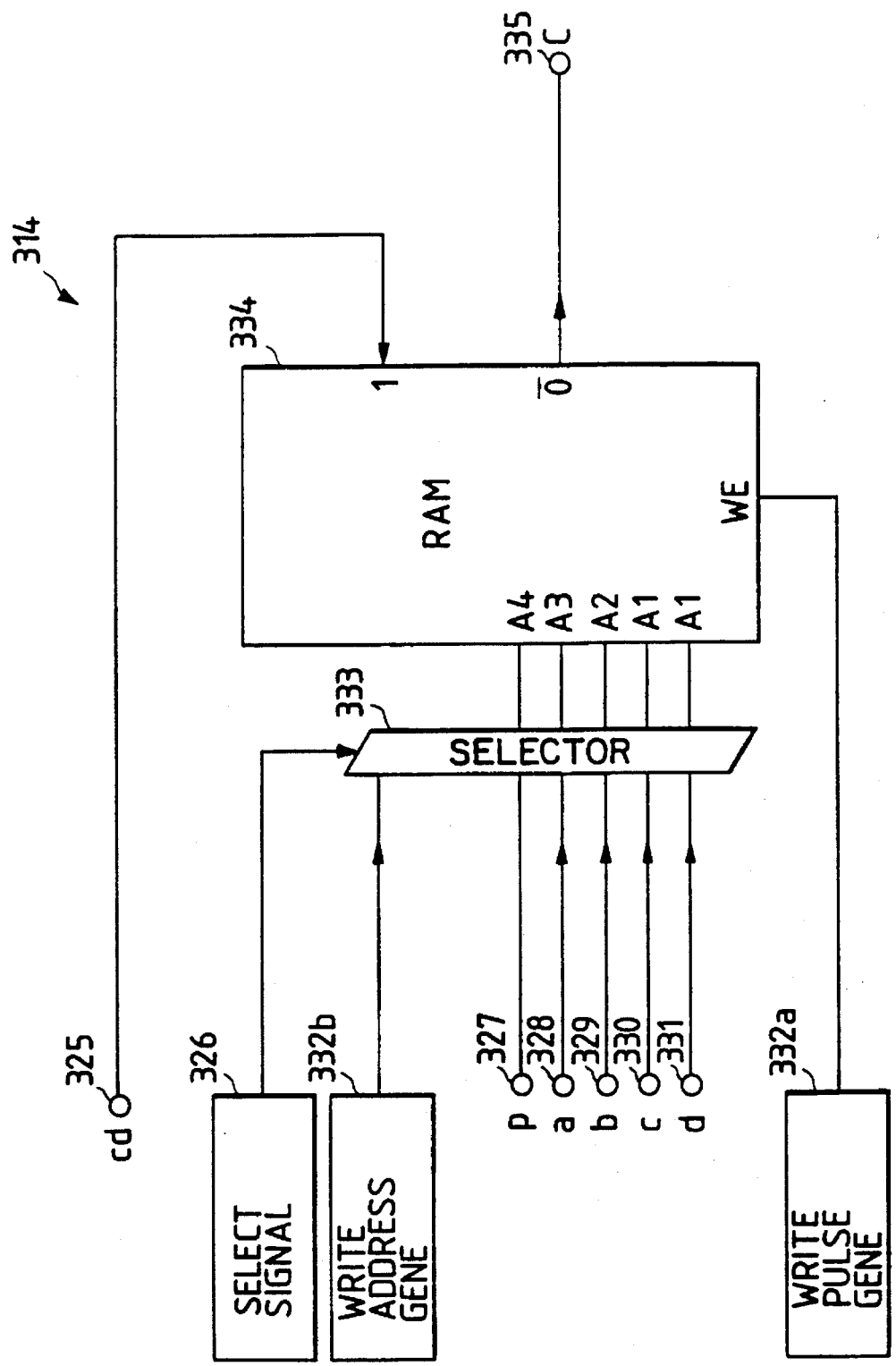
FIG. 27 is a block diagram of the corrective quantity deciding section of FIG. 22.

As shown in FIG. 27, the corrective quantity deciding section 314 includes a selector 333 and a RAM 334. The RAM 334 receives the selected signal "cd" from the selector 313 (see FIG. 22) via a terminal 325. The selector 333 receives a selection control signal from an address selection signal generator 326. In addition, the selector 333 receives a write address signal from an address generator 332b. In addition, the selector 333 receives the bi-level signals "p", "a", "b", "c", and "d" from the output-image memory 318 via terminals 327, 328, 329, 330, and 331 respectively. The RAM 334 receives a 5-bit output signal from the selector 333. The RAM 334 receives a write enable signal from a write pulse generator 332a. The output terminal of the RAM 334 is connected to the adder 315 (see FIG. 22) via a terminal 335.

The corrective quantity deciding section 314 operates as follows. The output signal "cd" of the selector 313 (see FIG. 22) which equals the corrective quantity data is written into the RAM 334 via the terminal 325. During this data writing process, the write enable signal is fed to the RAM 334 from the write pulse generator 332a. In addition, the address generator 332b outputs the write address signal to the selector 333, and the address selection signal generator 326 outputs the selection control signal to the selector 333. The selector 333 selects the write address signal in accordance with the selection control signal, and outputs the selected signal to the RAM 334 as an address signal. The data writing process is executed prior to the execution of normal operation of the corrective quantity deciding section 314.

During normal operation of the corrective quantity deciding section 314, the bi-level signals corresponding to the pixel "p" of interest and the neighboring pixels "a", "b", "c", and "d" are fed from the output-image memory 318 (see FIG. 22) to the selector 333 via the terminals 327, 328, 329, 330, and 331. In addition, the address selection signal generator 326 outputs the selection control signal to the selector 333. The selector 333 selects the bi-level signals in accordance with the selection control signal, and outputs the selected bi-level signals to the RAM 334 as an address signal. The data representing the corrective quantity "C" is read out from a storage segment of the RAM 334 which is designated by the address signal. The read-out data representative of the corrective quantity "C" is fed to the adder 315 (see FIG. 22) via the terminal 335. The adder 315 also receives the error data "e" from the subtracter (see FIG. 22). The adder 315 adds the error corrective quantity "C" to the first error data "e", thereby generating the correction-resultant error data "e1".

A detailed description will now be given of the operation of the error data correcting section 317 in FIG. 22. The error data correcting section 317 receives the error data "e1" from the adder 315. In addition, the error data correcting section 317 receives the effectiveness signal SLE, representing whether or not the input image signal is effective, via the terminal 316. When the effectiveness signal SLE is "0", that is, when the effectiveness signal SLE represents that the input image signal is not effective, the error data correcting section 317 forces the error, represented by the output signal of the adder 315, to be zero independent of the error data "e1" and then outputs the zero-error data to the error data memory 307 as second error data "e2". When the effectiveness signal SLE is "1", that is, when the effectiveness signal SLE represents that the input image signal is effective, the error data correcting section 317 transmits the output signal "e1" of the adder 315 to the error data memory 307 as second error data "e2". It should be noted that e1=e+C where the letters "e" and "C" denote the first error data and the corrective quantity data respectively. The conditions where the input image signal is not effective corresponds to certain cases such as a case where the edges of documents do not reach positions at which information on the documents can be read out by an image sensor, a case where an image sensor outputs a signal corresponding to an ineffective region, or a case where the output signal of an image memory which is applied to the apparatus of this embodiment is not effective.

Figure 28:
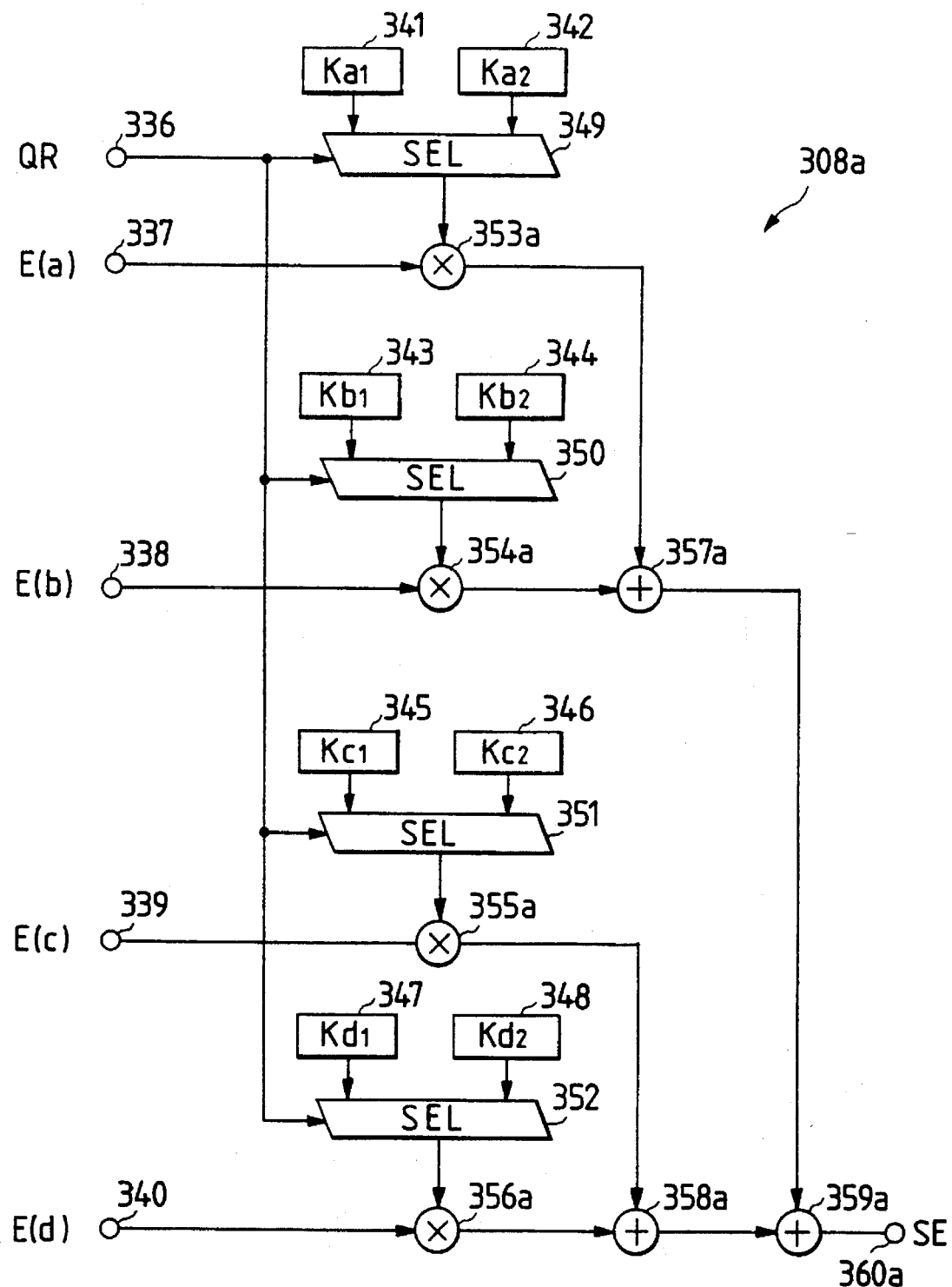
FIG. 28 is a block diagram of the error filter of FIG. 22.

As shown in FIG. 28, the error filter 308a includes coefficient setting sections 341, 342, 343, 344, 345, 346, 347, and 348, selectors 349, 350, 351, and 352, multipliers 353a, 354a, 355a, 356a, and adders 357a, 358a, and 359a. The 1-bit pseudo random number signal QR is fed to the selectors 349, 350, 351, and 352 from the signal generator 321 (see FIG. 22) via a terminal 336. The second error data pieces E(a), E(b), E(c), and E(d) are fed to the multipliers 353a, 354a, 355a, and 356a from the error data memory 307 (see FIG. 22) via terminals 337, 338, 339, and 340 respectively. The coefficient setting sections 341, 342, 343, 344, 345, 346, 347, and 348 include memories which store data representing given error filter weight coefficients ka1, ka2, kb1, kb2, kc1, kc2, kd1, and kd2 respectively.

The selector 349 selects one of the output signals (the coefficients) ka1 and ka2 of the coefficient setting sections 341 and 342 in accordance with the random number signal QR. Specifically, the selector 349 selects the signal ka1 when QR=1, and the selector 349 selects the signal ka2 when QR=0. The selector 350 selects one of the output signals (the coefficients) kb1 and kb2 of the coefficient setting sections 343 and 344 in accordance with the random number signal QR. Specifically, the selector 350 selects the signal kb1 when OR=1, and the selector 350 selects the signal kb2 when QR=0. The selector 351 selects one of the output signals (the coefficients) kc1 and kc2 of the coefficient setting sections 345 and 346 in accordance with the random number signal QR. Specifically, the selector 351 selects the signal kc1 when QR=1, and the selector 351 selects the signal kc2 when QR=0. The selector 352 selects one of the output signals (the coefficients) kd1 and kd2 of the coefficient setting sections 347 and 348 in accordance with the random number signal QR. Specifically, the selector 352 selects the signal kd1 when QR=1, and the selector 352 selects the signal kd2 when QR=0.

The multiplier 353a multiplies the second error data E(a) by the coefficient selected by the selector 349. The multiplier 354a multiplies the second error data E(b) by the coefficient selected by the selector 350. The multiplier 355a multiplies the second error data E(c) by the coefficient selected by the selector 351. The multiplier 356a multiplies the second error data E(d) by the coefficient selected by the selector 352. The adder 357a adds the output signals of the multipliers 353a and 354a. The adder 358a adds the output signals of the multipliers 355a and 356a. The adder 359a adds the output signals of the adders 357a and 358a. The output signal of the adder 359a is fed via a terminal 360a to the adder 302 (see FIG. 22) as the corrective signal SE.

Figure 29:
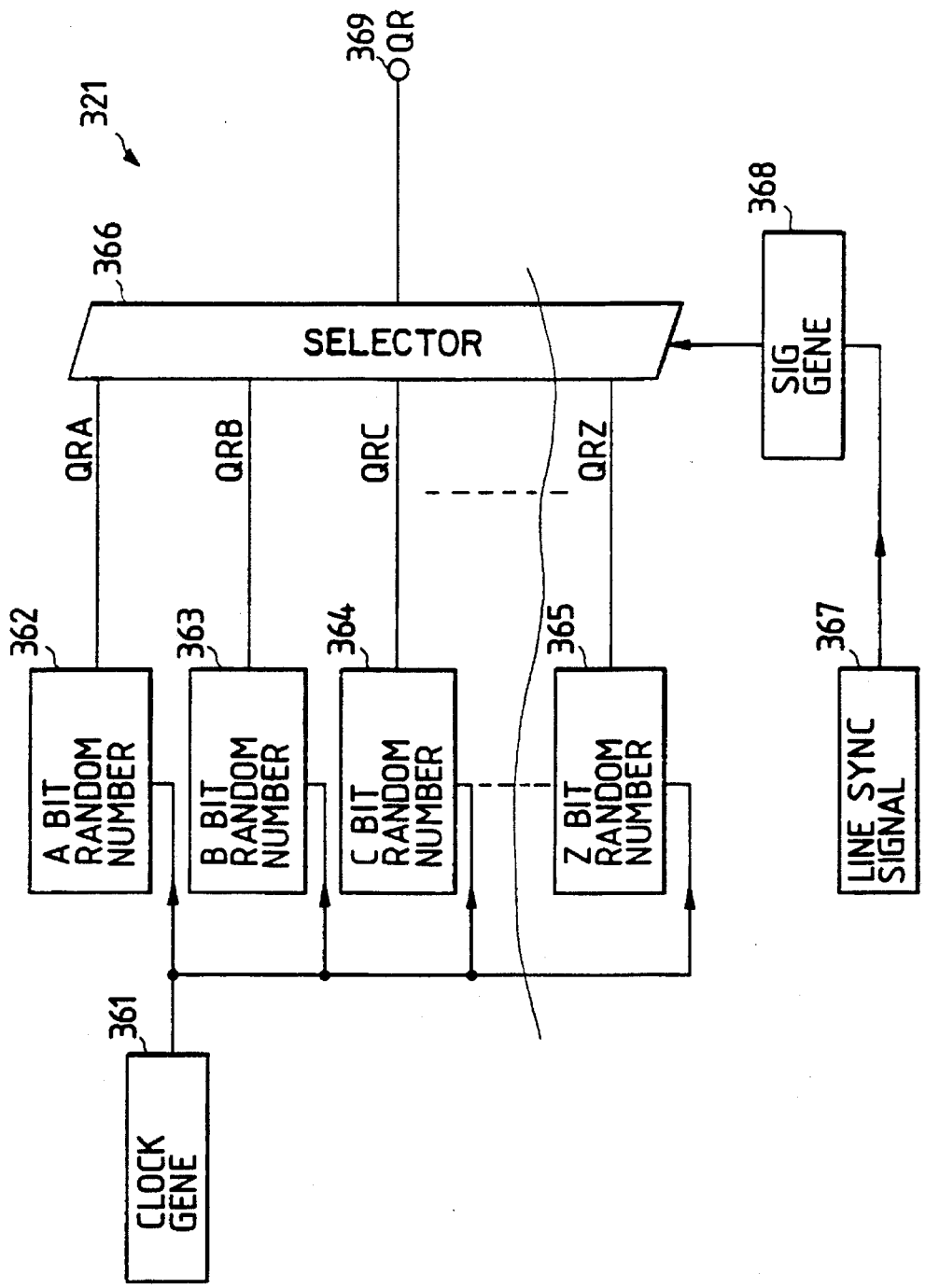
FIG. 29 is a block diagram of the random number signal generator of FIG. 22.

As shown in FIG. 29, the random number signal generator 321 includes an A-bit random number generating section 362, a B-bit random number generating section 363, a C-bit random number generating section 364, . . . , and a Z-bit random number generating section 365. A signal generator 361 outputs a reference clock signal for an image signal. The clock signal is applied to the random number generating sections 362, 363, 364, . . . , and 365. The random number generating sections 362, 363, 364, . . . , and 365 generate data representing pseudo random numbers QRA, QRB, QRC, . . . , and QRZ, which have different periods, in response to the clock signal. A selector 366 receives the output signals of the random number generating sections 362, 363, 364, . . . , and 365. A signal generator 367 outputs a line sync signal to a second signal generator 368. The second signal generator 368 produces a selection control signal in response to the line sync signal. It should be noted that the second signal generator 368 may be composed of a known random number signal generator. The selection control signal is updated every line. The selection control signal is fed to the selector 366. The selector 366 selects one of the output signals of the random number generating sections 362, 363, 364, . . . , and 365 in accordance with the selection control signal. The signal selected by the selector 366 is used as the random number signal QR which is transmitted to the error filter 308a (see FIG. 22) via a terminal 369.

DESCRIPTION OF THE THIRTEENTH PREFERRED EMBODIMENT

Figure 30:
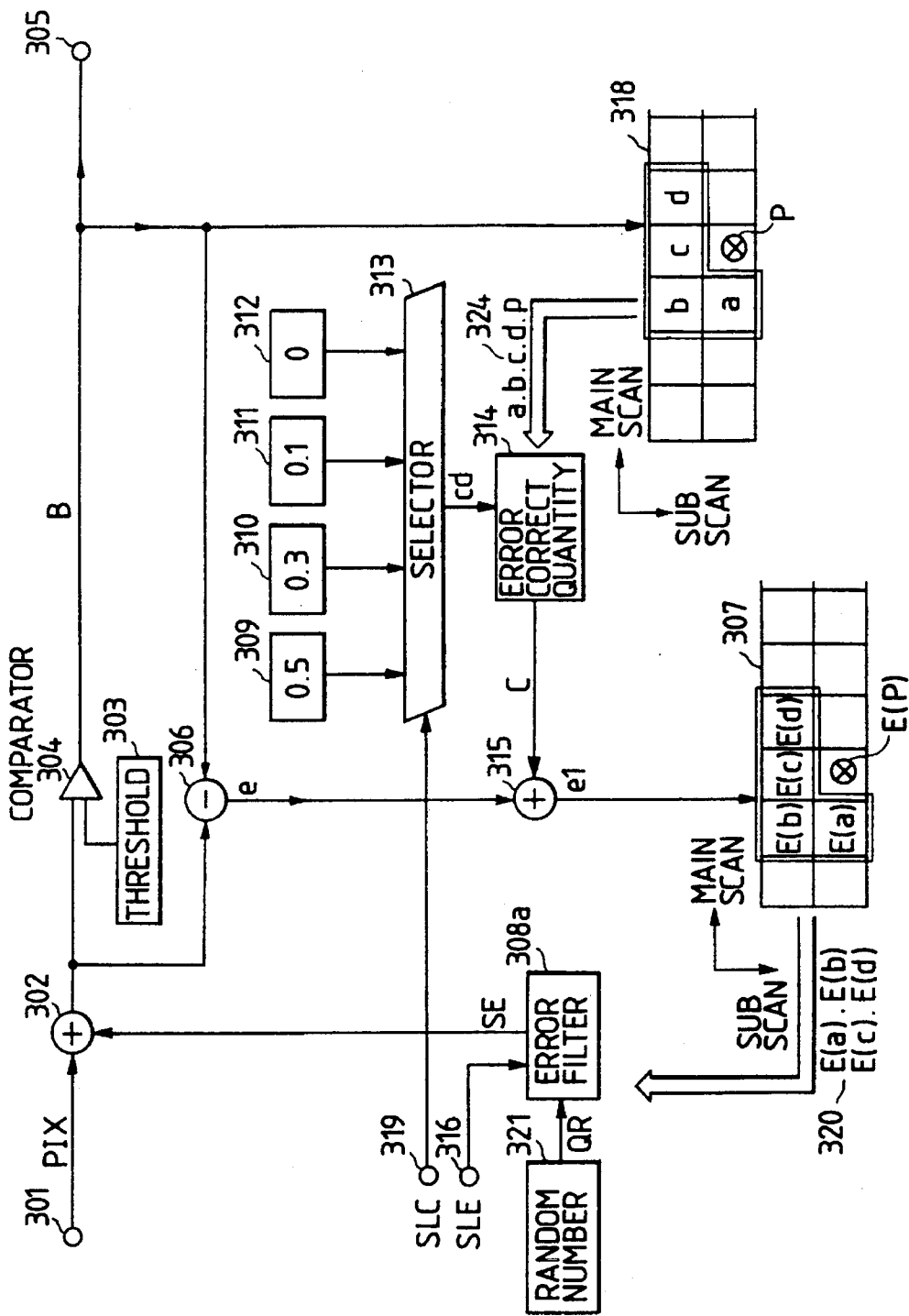
FIG. 30 is a block diagram of an image signal processing apparatus according to a thirteenth embodiment of this invention.

FIG. 30 shows a thirteenth embodiment of this invention which is similar to the embodiment of FIG. 22 except for design changes described hereinafter. In the embodiment of FIG. 30, the error data correcting section 317 (see FIG. 22) is omitted, and the output signal "e1" of an adder 315 is directly applied to an error data memory 307. In addition, the embodiment of FIG. 30 uses an error filter 308b instead of the error filter 308a (see FIG. 22). An effectiveness signal SLE is fed to the error filter 308b via a terminal 316. The error filter 308b corrects error data in response to the effectiveness signal SLE.

The error filter 308b receives the error data 320 from the error data memory 307. In addition, the error filter 308b receives the 1-bit pseudo random number signal QR from a signal generator 321. Furthermore, the error filter 308b receives the effectiveness signal SLE. The error filter 308b subjects the error data to a filtering process in response to the random number signal QR and the effectiveness signal SLE. Specifically, the error filter 308b weights pieces of the second error data which correspond to pixels near the pixel of interest. During the weighting process, the error filter 308b changes weight coefficients in response to the random number signal QR and the effectiveness signal SLE. Then, the error filter 308b sums up and combines the weighted error data into corrective data, and outputs the corrective data as a corrective signal SE.

In cases where the effectiveness signal SLE represents that the input image signal is effective, a coefficient set (ka1, kb1, kc1, kd1) and a coefficient set (ka2, kb2, kc2, kd2) are selected in the error filter 308b when the random number signal QR is "1" and "0" respectively. In cases where the effectiveness signal SLE represents that the input image signal is ineffective, a coefficient set (0, 0, 0, 0) is selected in the error filter 308b independent of the random number signal QR.

Figure 31:
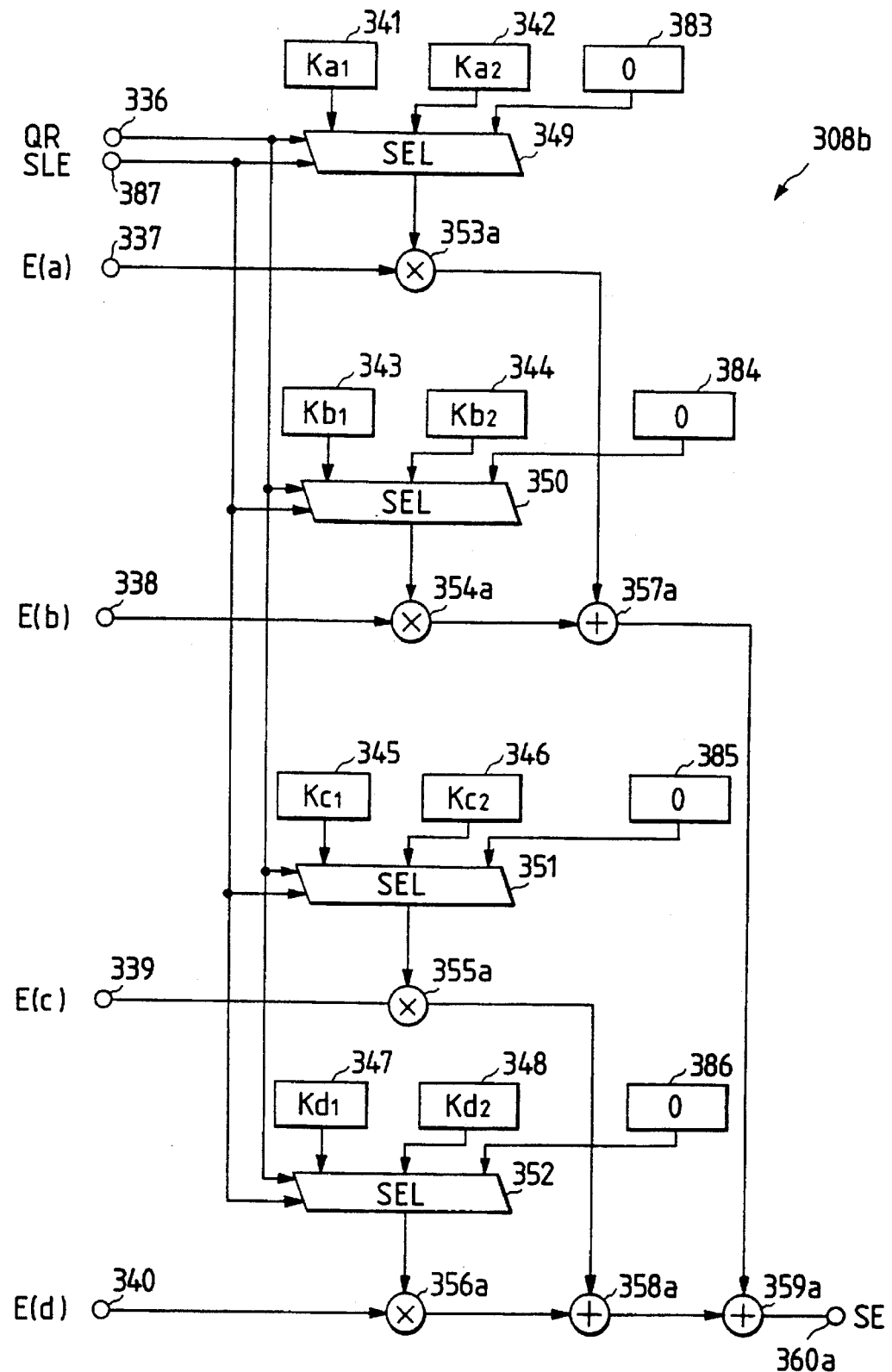
FIG. 31 is a block diagram of the error filter of FIG. 30.

As shown in FIG. 31, the error filter 308b includes coefficient setting sections 341, 342, 343, 344, 345, 346, 347, 348, 383, 384, 385, and 386, selectors 349, 350, 351, and 352, multipliers 353a, 354a, 355a, 356a, and adders 357a, 358a, and 359a. The 1-bit pseudo random number signal QR is fed to the selectors 349, 350, 351, and 352 from the signal generator 321 (see FIG. 22) via a terminal 336. The effectiveness signal SLE is fed to the selectors 349, 350, 351, and 352 via a terminal 387. The error data pieces E(a), E(b), E(c), and E(d) are fed to the multipliers 353a, 354a, 355a, and 356a from the error data memory 307 (see FIG. 22) via terminals 337, 338, 339, and 340 respectively. The coefficient setting sections 341, 342, 343, 344, 345, 346, 347, 348, 383, 384, 385, and 386 include memories which store data representing given error filter weight coefficients ka1, ka2, kb1, kb2, kc1, kc2, kd1, kd2, 0, 0, 0, and 0 respectively.

In cases where the effectiveness signal SLE represents that the input image signal is effective, the selector 349 selects one of the output signals (the coefficients) ka1 and ka2 of the coefficient setting sections 341 and 342 in accordance with the random number signal QR. Specifically, the selector 349 selects the signal ka1 when QR=1, and the selector 349 selects the signal ka2 when QR=0. In cases where the effectiveness signal SLE represents that the input image signal is effective, the selector 350 selects one of the output signals (the coefficients) kb1 and kb2 of the coefficient setting sections 343 and 344 in accordance with the random number signal QR. Specifically, the selector 350 selects the signal kb1 when QR=1, and the selector 349 selects the signal kb2 when QR=0. In cases where the effectiveness signal SLE represents that the input image signal is effective, the selector 351 selects one of the output signals (the coefficients) kc1 and kc2 of the coefficient setting sections 345 and 346 in accordance with the random number signal QR. Specifically, the selector 351 selects the signal kc1 when QR=1, and the selector 351 selects the signal kc2 when QR=0. In cases where the effectiveness signal SLE represents that the input image signal is effective, the selector 352 selects one of the output signals (the coefficients) kd1 and kd2 of the coefficient setting sections 347 and 348 in accordance with the random number signal QR. Specifically, the selector 352 selects the signal kd1 when QR=1, and the selector 352 selects the signal kd2 when QR=0.

In cases where the effectiveness signal SLE represents that the input image signal is ineffective, the selectors 349, 350, 351, and 352 select the output signals (the coefficients "0") of the coefficient setting sections 383, 384, 385, and 386 independent of the random number signal QR.

The multiplier 353a multiplies the second error data E(a) by the coefficient selected by the selector 349. The multiplier 354a multiplies the second error data E(b) by the coefficient selected by the selector 350. The multiplier 355a multiplies the second error data E(c) by the coefficient selected by the selector 351. The multiplier 356a multiplies the second error data E(d) by the coefficient selected by the selector 352. The adder 357a adds the output signals of the multipliers 353a and 354a. The adder 358a adds the output signals of the multipliers 355a and 356a. The adder 359a adds the output signals of the adders 357a and 358a. The output signal of the adder 359a is fed via a terminal 360a to the adder 302 (see FIG. 22) as the corrective signal SE.

DESCRIPTION OF THE FOURTEENTH PREFERRED EMBODIMENT

Figure 32:
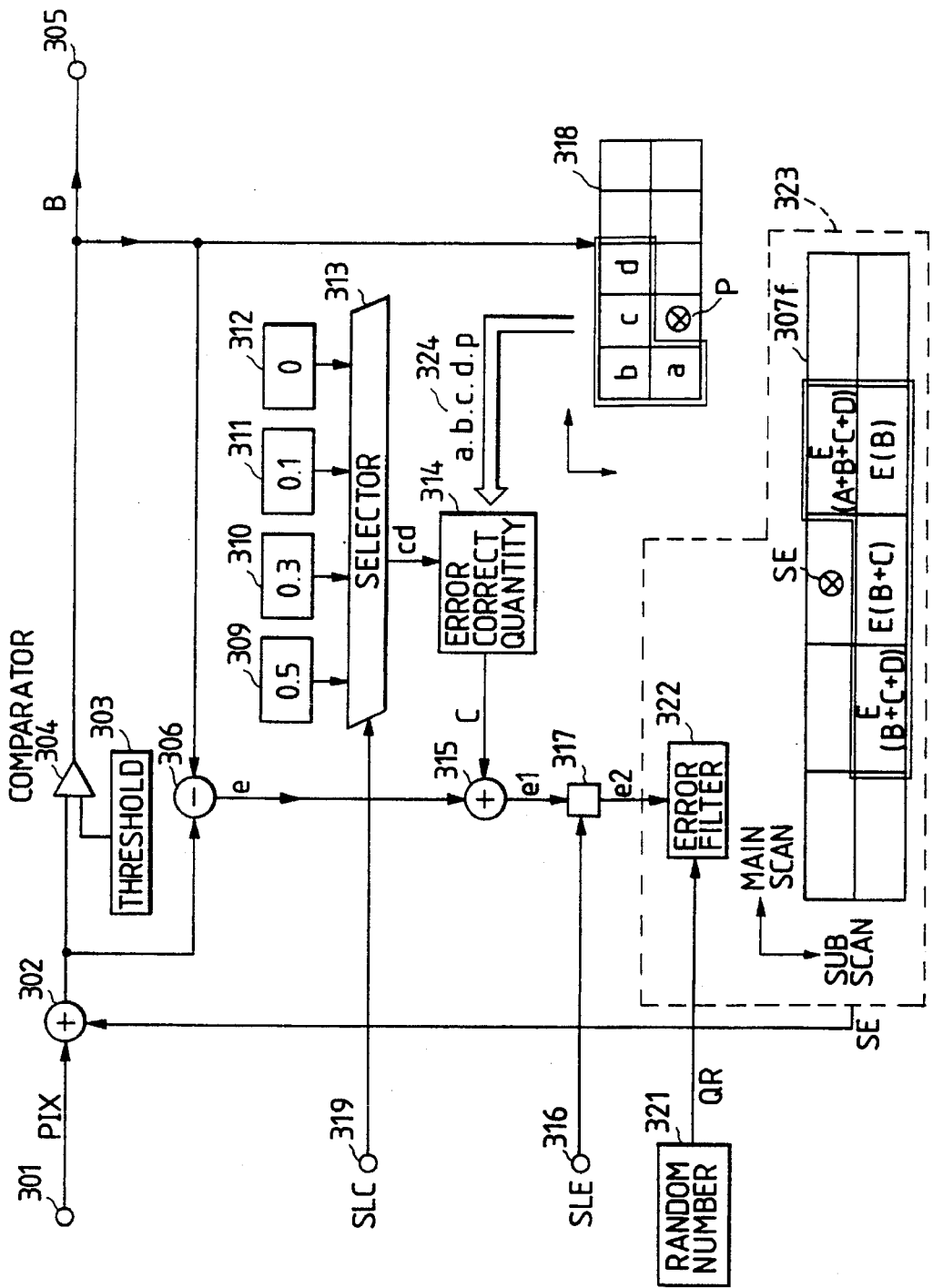
FIG. 32 is a block diagram of an image signal processing apparatus according to a fourteenth embodiment of this invention.

FIG. 32 shows a fourteenth embodiment of this invention which is similar to the embodiment of FIG. 22 except for design changes described hereinafter. The embodiment of FIG. 32 includes a calculator 323 which contains an error data memory 307f and an error filter 322. The calculator 323 generates a corrective signal SE on the basis of the second error data "e2" outputted from an error data correcting section 317 and the random number signal QR outputted from a signal generator 321. The corrective signal SE is fed to an adder 302.

Figure 33:
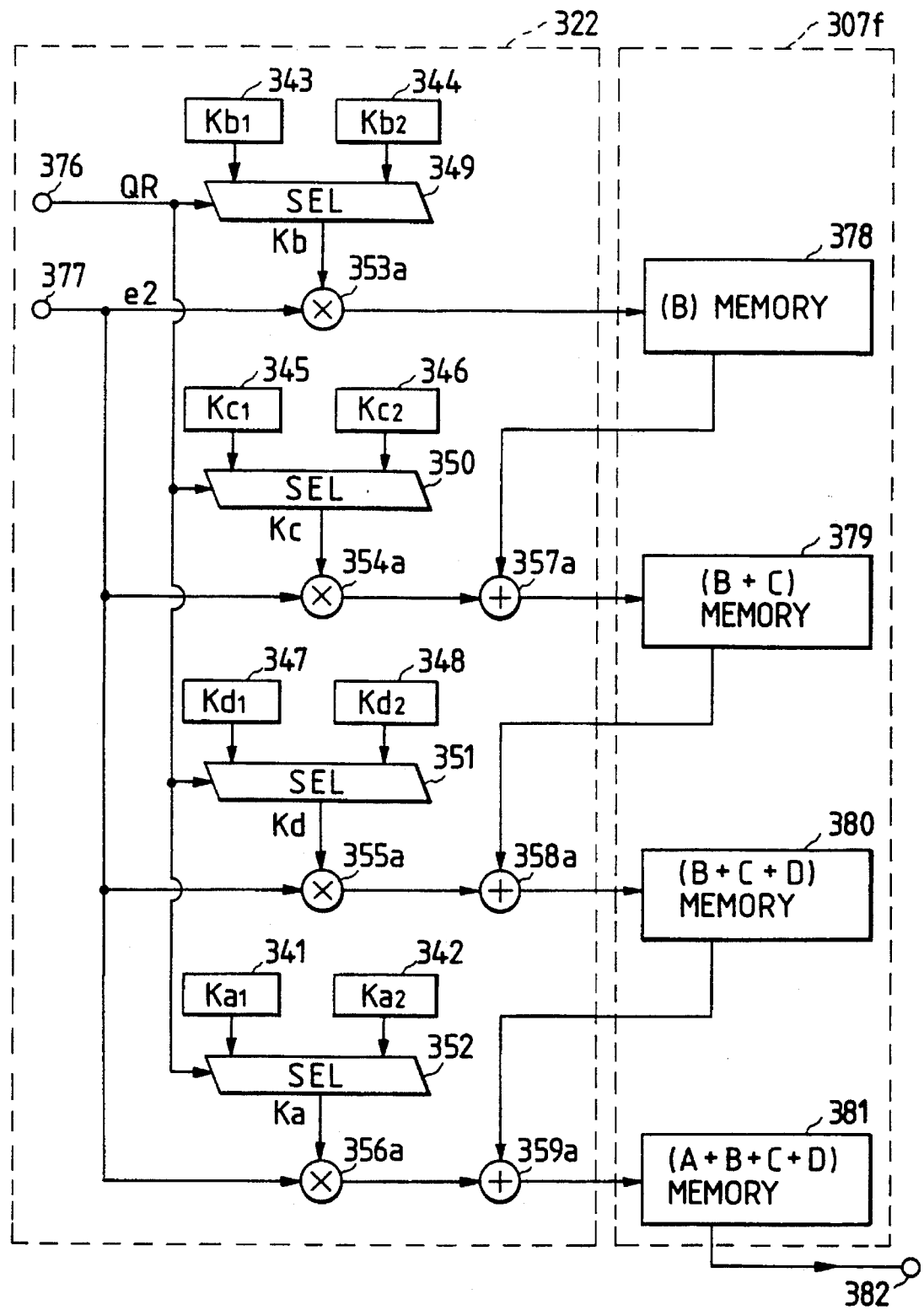
FIG. 33 is a block diagram of the error filter and the error data memory of FIG. 32.

As shown in FIG. 33, the error filter 322 includes coefficient setting sections 341, 342, 343, 344, 345, 346, 347, and 348, selectors 349, 350, 351, and 352, multipliers 353a, 354a, 355a, 356a, and adders 357a, 358a, and 359a. The 1-bit pseudo random number signal QR is fed to the selectors 349, 350, 351, and 352 from the signal generator 321 (see FIG. 32) via a terminal 376. The second error data "e2" is fed to the multipliers 353a, 354a, 355a, and 356a from the error data correcting section 317 (see FIG. 32) via a terminal 377. The coefficient setting sections 341, 342, 343, 344, 345, 346, 347, and 348 include memories which store data representing given error filter weight coefficients ka1, ka2, kb1, kb2, kc1, kc2, kd1, and kd2 respectively.

As shown in FIG. 33, the error data memory 307f includes a "B" memory 378, a "B+C" memory 379, a "B+C+D" memory 380, and an "A+B+C+D" memory 381.

The error filter 322 and the error data memory 307f operate as follows. The selector 349 selects one of the output signals (the coefficients) kb1 and kb2 of the coefficient setting sections 343 and 344 in accordance with the random number signal QR. Specifically, the selector 349 selects the signal kb1 when QR=1, and the selector 349 selects the signal kb2 when QR=0. The selector 350 selects one of the output signals (the coefficients) kc1 and kc2 of the coefficient setting sections 345 and 346 in accordance with the random number signal QR. Specifically, the selector 350 selects the signal kc1 when QR=1, and the selector 350 selects the signal kc2 when QR=0. The selector 351 selects one of the output signals (the coefficients) kd1 and kd2 of the coefficient setting sections 347 and 348 in accordance with the random number signal QR. Specifically, the selector 351 selects the signal kd1 when QR=1, and the selector 351 selects the signal kd2 when QR=0. The selector 352 selects one of the output signals (the coefficients) ka1 and ka2 of the coefficient setting sections 341 and 342 in accordance with the random number signal QR. Specifically, the selector 352 selects the signal ka1 when QR=1, and the selector 352 selects the signal ka2 when QR=0.

The multiplier 353a multiplies the second error data "e2" by the coefficient selected by the selector 349. The output signal of the multiplier 353a is written into a storage segment of the "B" memory 378 which corresponds to an address E(B). The multiplier 354a multiplies the second error data "e2" by the coefficient selected by the selector 350. The output signal of the multiplier 354a is fed to the adder 357a. A signal is read out from a storage segment of the "B" memory 378 which corresponds to an address E(B+C), and the readout signal is fed to the adder 357a. The adder 357a adds the output signals of the multiplier 354a and the "B" memory 378. The output signal of the adder 357a is written into a storage segment of the "B+C" memory 379 which corresponds to an address (B+C). The multiplier 355a multiplies the second error data "e2" by the coefficient selected by the selector 351. The output signal of the multiplier 355a is fed to the adder 358a. A signal is read out from a storage segment of the "B+C" memory 379 which corresponds to an address E(B+C+D), and the readout signal is fed to the adder 358a. The adder 358a adds the output signals of the multiplier 355a and the "B+C" memory 379. The output signal of the adder 358a is written into a storage segment of the "B+C+D" memory 380 which corresponds to an address (B+C+D). The multiplier 356a multiplies the second error data "e2" by the coefficient selected by the selector 352. The output signal of the multiplier 35Ba is fed to the adder 359a. A signal is read out from a storage segment of the "B+C+D" memory 380 which corresponds to an address E(A+B+C+D), and the readout signal is fed to the adder 359a. The adder 359a adds the output signals of the multiplier 356a and the "B+C+D" memory 380. The output signal of the adder 359a is written into a storage segment of the "A+B+C+D" memory 381 which corresponds to an address (A+B+C+D). A signal is read out from the "A+B+C+D" memory 381, and the readout signal is used as the corrective signal SE. The corrective signal SE is transmitted to the adder 302 (see FIG. 32) via a terminal 382.

DESCRIPTION OF THE FIFTEENTH PREFERRED EMBODIMENT

Figure 34:
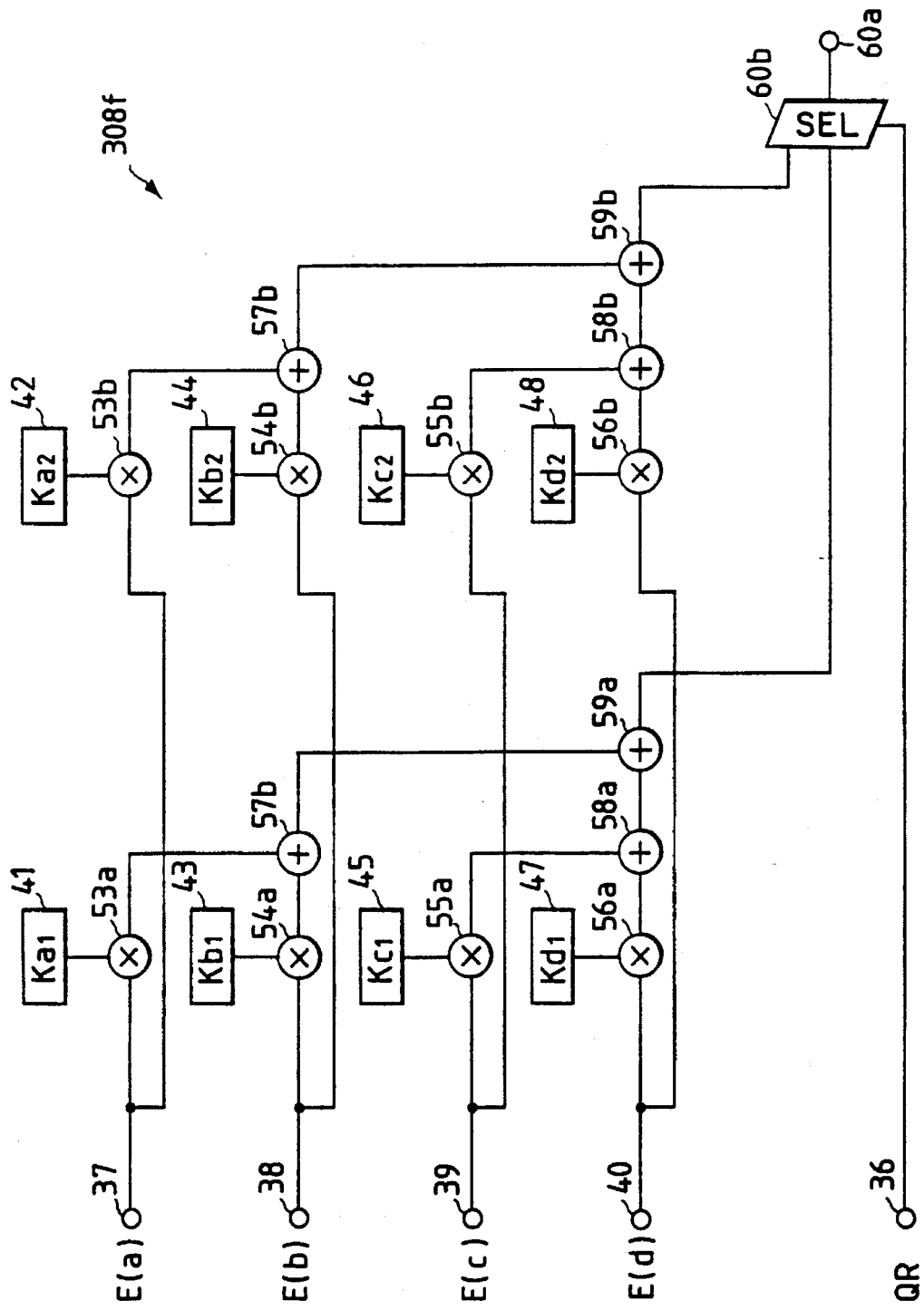
FIG. 34 is a block diagram of an error filter in an image signal processing apparatus according to a fifteenth embodiment of this invention.

FIG. 34 shows a portion of a fifteenth embodiment of this invention which is similar to the embodiment of FIG. 22 except for a design change described hereinafter. The embodiment of FIG. 34 uses an error filter 308f instead of the error filter 308a (see FIGS. 22 and 28).

As shown in FIG. 34, the error filter 308f includes coefficient setting sections 341, 342, 343, 344, 345, 346, 347, and 348, a selector 360b, multipliers 353a, 354a, 355a, 356a, 353b, 354b, 355b, and 356b, and adders 357a, 358a, 359a, 357b, 358b, and 359b. The 1-bit pseudo random number signal QR is fed to the selector 360b from a signal generator 321 (see FIG. 22) via a terminal 336. The second error data pieces E(a), E(b), E(c), and E(d) are fed to the multipliers 353a, 354a, 355a, and 356a from an error data memory 307 (see FIG. 22) via terminals 337, 338, 339, and 340 respectively. In addition, the second error data pieces E(a), E(b), E(c), and E(d) are fed to the multipliers 353b, 354b, 355b, and 356b from the error data memory 307 (see FIG. 22) via the terminals 337, 338, 339, and 340 respectively. The coefficient setting sections 341, 342, 343, 344, 345, 346, 347, and 348 include memories which store data representing given error filter weight coefficients ka1, ka2, kb1, kb2, kc1, kc2, kd1, and kd2 respectively.

The multiplier 353a multiplies the second error data E(a) by the output signal (the coefficient) ka1 of the coefficient setting section 341. The output signal of the multiplier 353a is fed to the adder 357a. The multiplier 354a multiplies the second error data E(b) by the output signal (the coefficient) kb1 of the coefficient setting section 343. The output signal of the multiplier 354a is fed to the adder 357a. The adder 357a adds the output signals of the multipliers 353a and 354a. The output signal of the adder 357a is fed to the adder 359a. The multiplier 355a multiplies the second error data E(c) by the output signal (the coefficient) kc1 of the coefficient setting section 345. The output signal of the multiplier 355a is fed to the adder 358a. The multiplier 356a multiplies the second error data E(d) by the output signal (the coefficient) kd1 of the coefficient setting section 347. The output signal of the multiplier 356a is fed to the adder 358a. The adder 358a adds the output signals of the multipliers 355a and 356a. The output signal of the adder 358a is fed to the adder 359a. The adder 359a adds the output signals of the adders 357a and 358a. The output signal of the adder 359a is fed to the selector 360b.

The multiplier 353b multiplies the second error data E(a) by the output signal (the coefficient) ka2 of the coefficient setting section 342. The output signal of the multiplier 353b is fed to the adder 357b. The multiplier 354b multiplies the second error data E(b) by the output signal (the coefficient) kb2 of the coefficient setting section 344. The output signal of the multiplier 354b is fed to the adder 357b. The adder 357b adds the output signals of the multipliers 353b and 354b. The output signal of the adder 357b is fed to the adder 359b. The multiplier 355b multiplies the second error data E(c) by the output signal (the coefficient) kc2 of the coefficient setting section 346. The output signal of the multiplier 355b is fed to the adder 358b. The multiplier 356b multiplies the second error data E(d) by the output signal (the coefficient) kd2 of the coefficient setting section 348. The output signal of the multiplier 356b is fed to the adder 358b. The adder 358b adds the output signals of the multipliers 355b and 356b. The output signal of the adder 358b is fed to the adder 359b. The adder 359b adds the output signals of the adders 357b and 358b. The output signal of the adder 359b is fed to the selector 360b.

The selector 360b selects one of the output signals of the adders 359a and 359b in accordance with the 1-bit random number signal QR. Specifically, the selector 360b selects the output signal of the adder 359a when QR=1. The selector 360b selects the output signal of the adder 359b when QR=0. The signal selected by the selector 360b is fed via a terminal 360a to an adder 302 (see FIG. 22) as a corrective signal SE.

DESCRIPTION OF THE SIXTEENTH PREFERRED EMBODIMENT

Figures 35, 36:
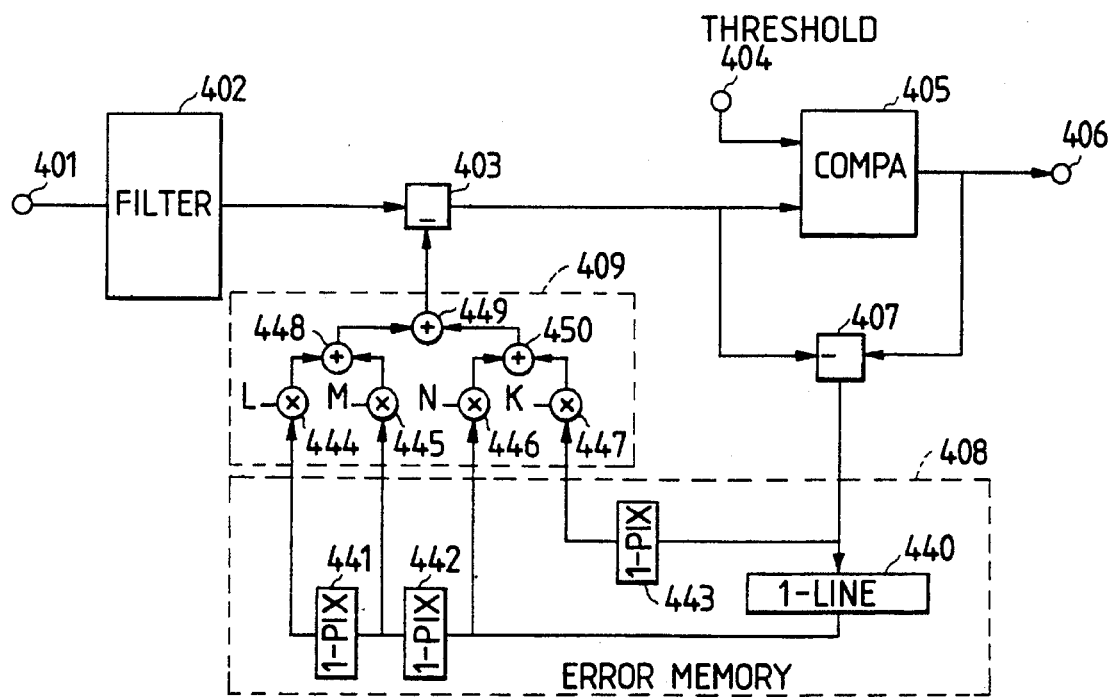
FIG. 35 is a block diagram of an image signal processing apparatus according to a sixteenth embodiment of this invention.
FIG. 36 is a diagram showing coefficients of the edge-emphasizing pre-filter of FIG. 35.

With reference to FIG. 35, an image signal processing apparatus includes an input terminal 401 via which a true halftone input image signal is fed to a pre-filter 402. The input image signal is generated by a suitable device such as an image scanner. The input image signal has time segments corresponding to pixels respectively. The input image signal is processed in a pixel-by-pixel manner by the pre-filter 402 and later stages.

The pre-filter 402 includes an edge-emphasizing filter of the saddle type. The pre-filter 402 processes the true halftone input image signal into a second true halftone image signal. Specifically, the pre-filter 402 attenuates high-frequency components of the input image signal which correspond to inclined directions from the pixel of interest, but amplifies high-frequency components of the input image signal which correspond to a main scanning direction and a sub scanning direction from the pixel of interest.

A correcting section 403 receives the second true halftone image signal from the pre-filter 402. In addition, the correcting section 403 receives a corrective signal from a calculator (an error filter) 409. The correcting section 403 corrects the second true halftone image signal in accordance with the corrective signal. The correcting section 403 is composed of an adder or a subtracter in dependence upon the sign characteristics of the corrective signal. In this embodiment, the correcting section 403 uses a subtracter.

The subtracter 403 subtracts the corrective signal from the second true halftone image signal. A signal 404 representative of a predetermined threshold value (a predetermined slicing level) is fed to a comparator 405. The comparator 405 compares the output signal of the subtracter 403 and the threshold value signal, converting the output signal of the subtracter 403 into a corresponding 1-bit binary image signal (a pseudo halftone image signal having a sequence of bi-level pixel components). The comparator 405 outputs the pseudo halftone image signal which is transmitted to an external device (not shown) via an output terminal 406.

A subtracter 407 subtracts the output signal of the comparator 405 from the output signal of the subtracter 403, generating and outputting error data. An error data memory 408 stores the error data outputted from the subtracter 407. The calculator (the error filter) 409 receives the error data from the error data memory 408 and subjects the error data to a filtering process. Specifically, the calculator 409 weights pieces of the error data which correspond to pixels near the pixel of interest. Then, the calculator 409 sums up and combines the weighted error data into corrective data, and outputs the corrective data as a corrective signal.

FIG. 36 shows a set of 3×3-pixel spatial filter coefficients which are used by the pre-filter 402. As shown in FIG. 36, a positive coefficient "A" is assigned to pixels "b", "d", "f", and "h" which adjoin the pixel "e" of interest in the main scanning direction and the sub scanning direction. In addition, a negative coefficient "−B" is assigned to pixels "a", "c", "g", and T which adjoin the pixel "e" of interest in directions inclined with respect to the main and sub scanning directions. In order to make the sum of the filter coefficients equal to 1, a coefficient "1+4B−4A" is assigned to the pixel "e" of interest.

Figure 37:
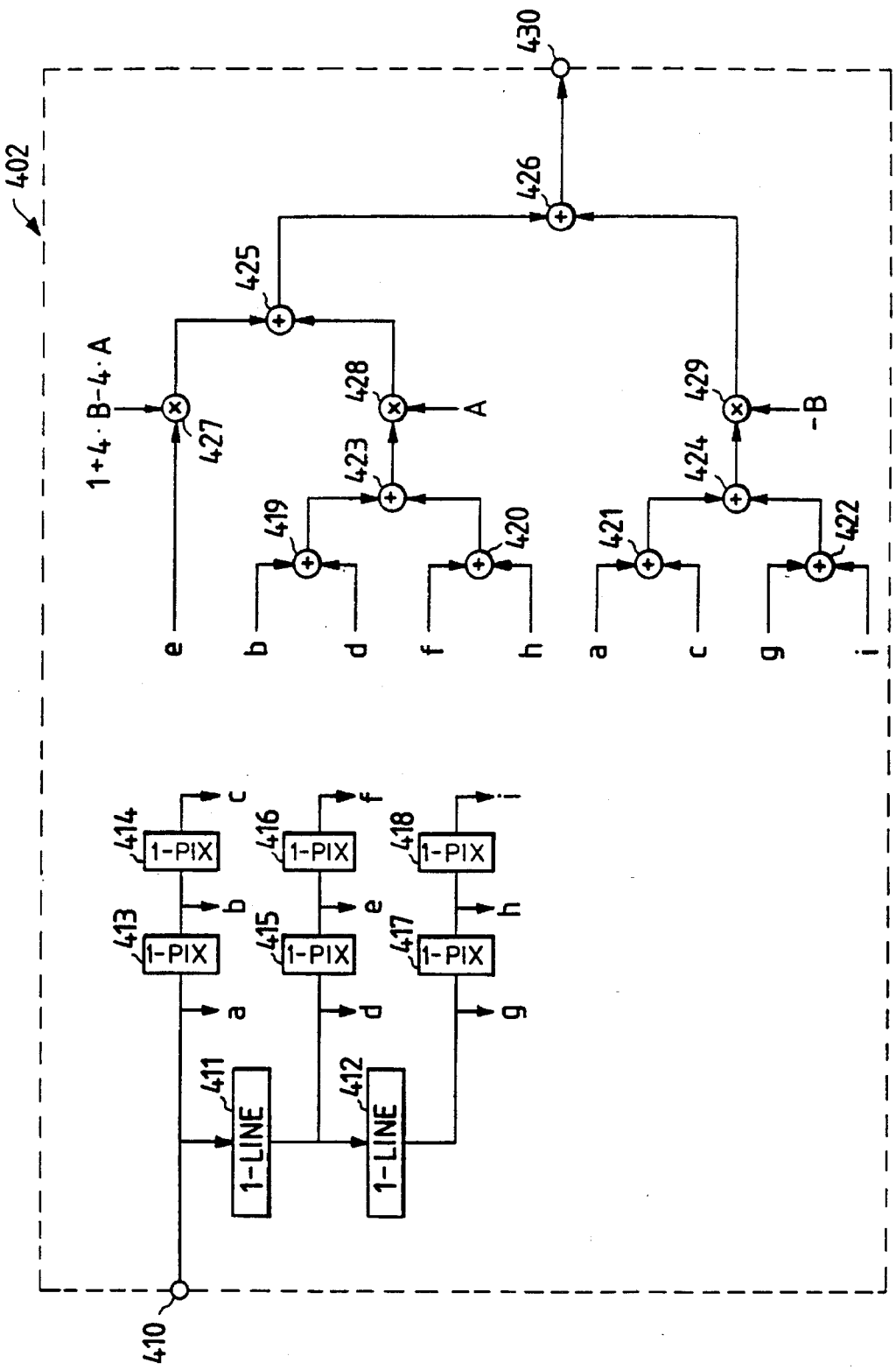
FIG. 37 is a block diagram of the edge-emphasizing pre-filter of FIG. 35.

As shown in FIG. 37, the pre-filter 402 includes 1-line buffer memories 411 and 412, 1-pixel shift registers 413, 414, 415, 416, 417, and 418, adders 419, 420, 421, 422, 423, 424, 425, and 426, and multipliers 427, 428, and 429.

The pre-filter 402 operates as follows. The input image signal is fed to the 1-line buffer memory 411 and the 1-pixel shift register 413 via a terminal 410. The input image signal is used as data corresponding to the pixel "a" of FIG. 36. The 1-pixel shift register 413 delays the input image signal by a time corresponding to one pixel. The output signal of the 1-pixel shift register 413 is used as data corresponding to the pixel "b" of FIG. 36. The output signal of the 1-pixel shift register 413 is applied to the 1-pixel shift register 414. The 1-pixel shift register 414 delays the output signal of the 1-pixel shift register 413 by a time corresponding to one pixel. The output signal of the 1-pixel shift register 414 is used as data corresponding to the pixel "c" of FIG. 36.

A time portion of the input image signal which corresponds to one line in the main scanning direction is stored into the 1-line buffer memory 411. Each time data processing for a line is completed, the 1-line portion of the input image signal is transferred from the 1-line buffer memory 411 to the 1-line buffer memory 412.

The signal is read out from the 1-line buffer memory 411, and the readout signal is fed to the 1-pixel shift register 415. The signal read out from the 1-line buffer memory 411 is used as data corresponding to the pixel "d" of FIG. 36. The 1-pixel shift register 415 delays the output signal of the 1-line buffer memory 411 by a time corresponding to one pixel. The output signal of the 1-pixel shift register 415 is used as data corresponding to the pixel "e" of FIG. 36. The output signal of the 1-pixel shift register 415 is applied to the 1-pixel shift register 416. The 1-pixel shift register 416 delays the output signal of the 1-pixel shift register 415 by a time corresponding to one pixel. The output signal of the 1-pixel shift register 416 is used as data corresponding to the pixel "f" of FIG. 36.

The signal is read out from the 1-line buffer memory 412, and the readout signal is fed to the 1-pixel shift register 417. The signal read out from the 1-line buffer memory 412 is used as data corresponding to the pixel "g" of FIG. 36. The 1-pixel shift register 417 delays the output signal of the 1-line buffer memory 412 by a time corresponding to one pixel. The output signal of the 1-pixel shift register 417 is used as data corresponding to the pixel "h" of FIG. 36. The output signal of the 1-pixel shift register 417 is applied to the 1-pixel shift register 418. The 1-pixel shift register 418 delays the output signal of the 1-pixel shift register 415 by a time corresponding to one pixel. The output signal of the 1-pixel shift register 418 is used as data corresponding to the pixel "i" of FIG. 36.

The multiplier 427 multiplies the data of the pixel "e" by the coefficient "1+4B−4A". The output signal of the multiplier 427 is applied to the adder 425. The adder 419 adds the data of the pixel "b" and the data of the pixel "d". The output signal of the adder 419 is applied to the adder 423. The adder 420 adds the data of the pixel "f" and the data of the pixel "h". The output signal of the adder 420 is applied to the adder 423. The adder 423 adds the output signals of the adders 419 and 420. The output signal of the adder 423 is applied to the multiplier 428. The multiplier 428 multiplies the output signal of the adder 423 by the coefficient "A". The output signal of the multiplier 428 is applied to the adder 425. The adder 425 adds the output signals of the multipliers 427 and 428. The output signal of the adder 425 is applied to the adder 426. The adder 421 adds the data of the pixel "a" and the data of the pixel "c". The output signal of the adder 421 is applied to the adder 424. The adder 422 adds the data of the pixel "g" and the data of the pixel T. The output signal of the adder 422 is applied to the adder 424. The adder 424 adds the output signals of the adders 421 and 422. The output signal of the adder 424 is applied to the multiplier 429. The multiplier 429 multiplies the output signal of the adder 424 by the coefficient "−B". The output signal of the multiplier 429 is applied to the adder 426. The adder 426 adds the output signals of the adders 425 and the multiplier 429. The output signal of the adder 26 is transmitted via a terminal 430 to the subtracter 403 (see FIG. 35).

Figure 38:
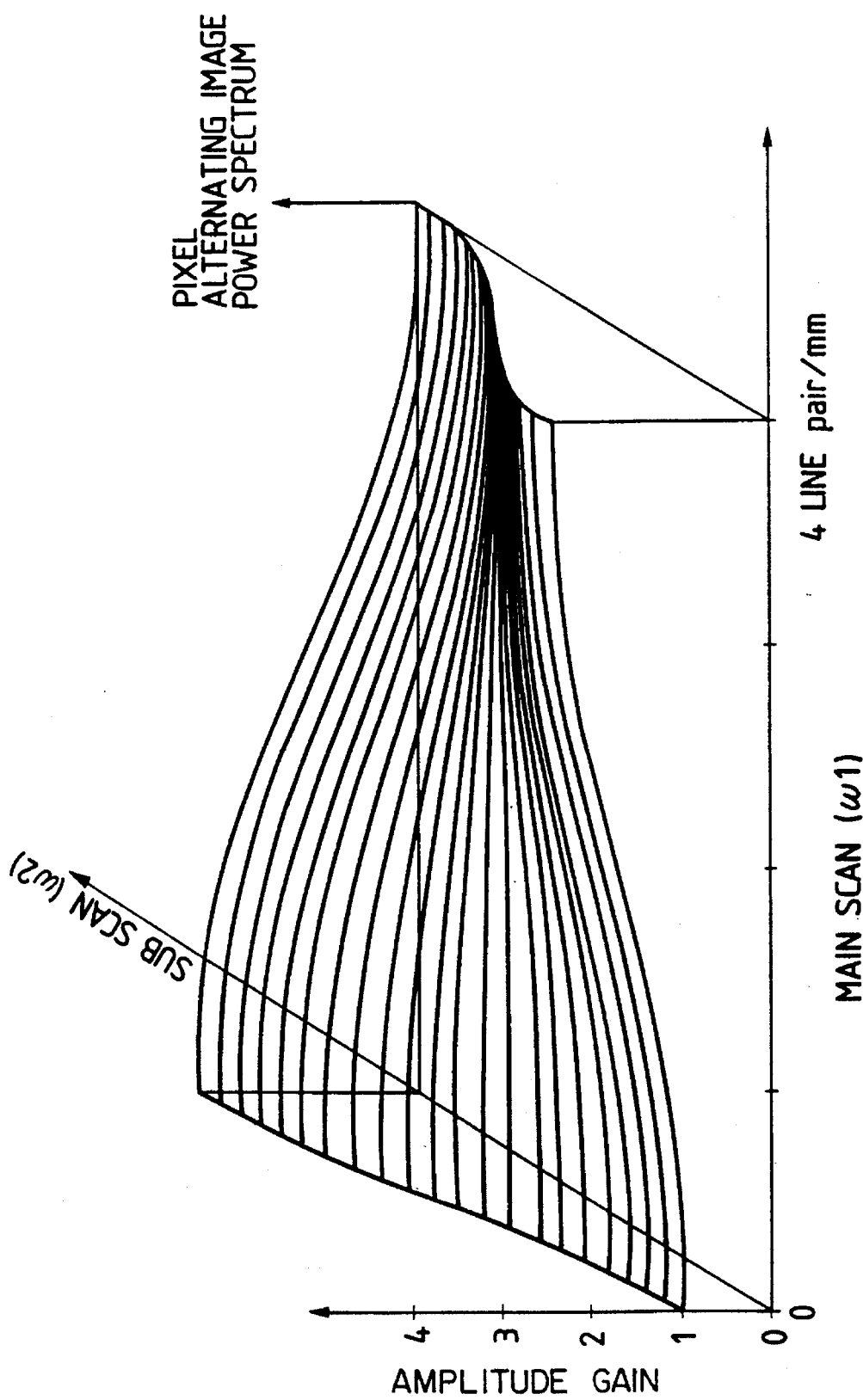
FIG. 38 is a diagram showing the spatial frequency/amplitude characteristics of the edge-emphasizing pre-filter of FIG. 35.

FIG. 38 shows the spatial frequency/amplitude characteristics of the pre-filter 402 which occur under conditions where the coefficients "A" and "B" are set to ⅛ and ¼ respectively. According to the filter characteristics shown in FIG. 38, the amplitude of the value of the data of a pixel which adjoins the pixel of interest in an inclined direction is minimized.

The apparatus of FIG. 35 will now be further described. As described previously, the pre-filter 402 attenuates high-frequency components of the input image signal which correspond to inclined directions from the pixel of interest, but amplifies high-frequency components of the input image signal which correspond to the main scanning direction and the sub scanning direction from the pixel of interest. Thus, the pre-filter 402 emphasizes an image composed of edge line alternating patterns extending in the main and sub scanning directions. In addition, the pre-filter 402 smooths a screen dot image having a pixel alternating pattern.

The subtracter 403 subtracts the corrective signal from the true halftone image signal, the corrective signal being outputted from the calculator 409 and the true halftone image signal being outputted from the pre-filter 402. The comparator 405 binarizes the output signal of the subtracter 403 by comparing the output signal of the subtracter 403 and the threshold value signal. The 1-bit binary image signal (the pseudo halftone image signal having a sequence of bi-level pixel components) outputted from the comparator 405 is transmitted to an external device (not shown) via the output terminal 406. The 1-bit binary image signal is also fed to the subtracter 407.

The subtracter 407 includes an encoder which converts the 1-bit binary signal into multi-bit data (for example, 6-bit data) representing a white level or a black level. The multi-bit data has a format equal to the format of the output signal of the subtracter 403. Specifically, the encoder in the subtracter 407 converts the 1-bit binary signal being "1" into multi-bit data "3F" (in hexadecimal notation) representing the white level. In addition, the encoder in the subtracter 407 converts the 1-bit binary signal being "0" into multi-bit data "00" (in hexadecimal notation) representing the black level. The subtracter 407 subtracts the multi-bit data from the output signal of the subtracter 403, thereby generating and outputting error data.

The error data memory 408 stores the error data outputted from the subtracter 407. The error data memory 408 includes a 1-line memory 440, and 1-pixel shift registers 441, 442, and 443. The 1-pixel shift register 443 delays the error data outputted from the subtracter 407 by a time corresponding to one pixel. The error data outputted from the subtracter 407 is stored into a storage segment of the 1-line memory 440 which is designated by an address corresponding to the pixel of interest. The 1-line-preceding error data is read out from a storage segment of the 1-line memory 440 which is designated by an address equal to the sum of the address of the pixel of interest and "1". The 1-pixel shift register 442 delays the error data outputted from the 1-line memory 440 by a time corresponding to one pixel. The 1-pixel shift register 441 delays the error data outputted from the 1-pixel shift register 442 by a time corresponding to one pixel. The output signal of the 1-pixel shift register 443 represents the error data of the pixel immediately precedes the pixel of interest. The output signal of the 1-line memory 440 represents the error data of the pixel which precedes the pixel of interest by a 1-line interval. The output signal of the 1-pixel shift register 442 represents the error data of the pixel which immediately precedes the pixel related to the output signal of the 1-line memory 440. The output signal of the 1-pixel shift register 441 represents the error data of the pixel which immediately precedes the pixel related to the output signal of the 1-pixel shift register 442. The output signals of the 1-line memory 440 and the 1-pixel shift registers 441, 442, and 443 are fed to the calculator 409.

The calculator (the error filter) 409 includes multipliers 444, 445, 446, and 447, and adders 448, 449, and 450. The multiplier 444 multiplies the output signal of the 1-pixel shift register 441 by a weight coefficient "L". The multiplier 445 multiplies the output signal of the 1-pixel shift register 442 by a weight coefficient "M". The multiplier 446 multiplies the output signal of the 1-line memory 440 by a weight coefficient "N". The multiplier 447 multiplies the output signal of the 1-pixel shift register 443 by a weight coefficient "K". It should be noted that the sum of the weight coefficients "K", "L", "M", and "N" is equal to 1. The adder 448 adds the output signals of the multipliers 444 and 445. The adder 450 adds the output signals of the multipliers 446 and 447. The adder 449 adds the output signals of the adders 448 and 449. The output signal of the adder 449 is fed to the subtracter 403 as the corrective signal.

Figure 39:
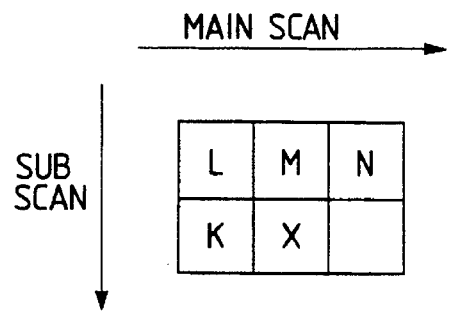
FIG. 39 is a diagram showing weight coefficients and pixels adjoining a pixel of interest.

FIG. 39 shows the relation between the pixel "x" of interest and the allotment of the weight coefficients "K", "L", "M", and "N" to the pixels near the pixel "x" of interest which occurs in the case of the collection of the error data from the pixels near the pixel "x" of interest.

DESCRIPTION OF THE SEVENTEENTH PREFERRED EMBODIMENT

Figure 41:
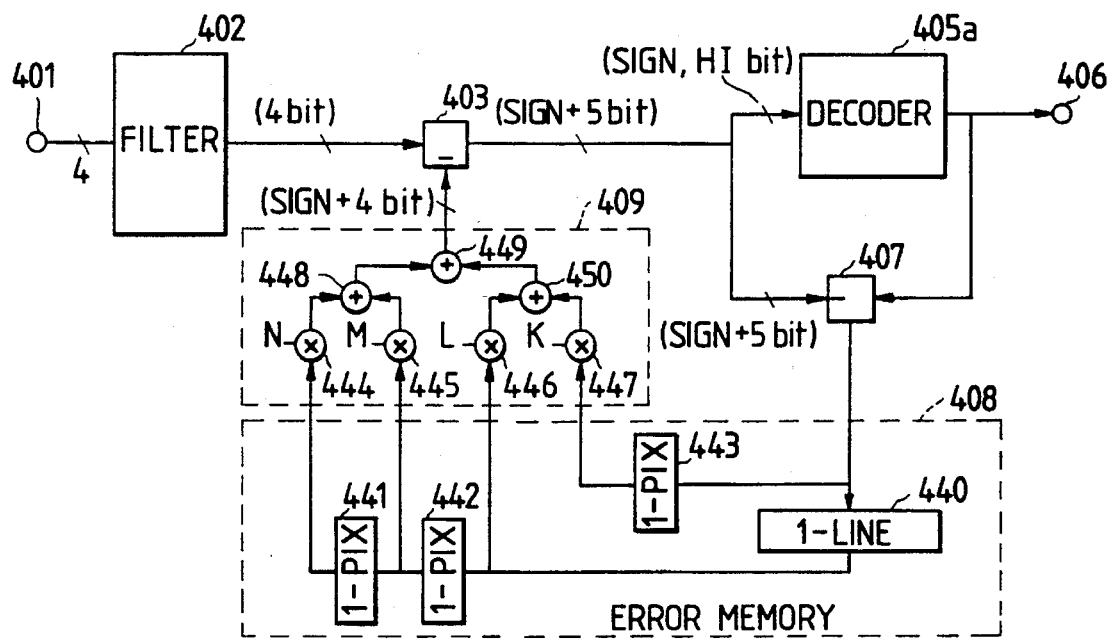
FIG. 41 is a block diagram of an image signal processing apparatus according to a seventeenth embodiment of this invention.

FIG. 41 shows a seventeenth embodiment of this invention which is similar to the embodiment of FIG. 35 except that a decoder 405a is used instead of the comparator 405 (see FIG. 35).

In the embodiment of FIG. 41, an input image signal fed to a pre-filter 402 has four bits (16 tone levels). The output signal of the pre-filter 402 has also four bits. The output signal of a calculator 409 has five bits composed of one sign bit and four data bits. The output signal of an subtracter 403 has six bits composed of one sign bit and five data bits. The number of bits of the output signal of the subtracter 403 is chosen in consideration of the fact that the subtraction (or the addition) between two 4-bit data may cause a carry.

Figures 42, 43:
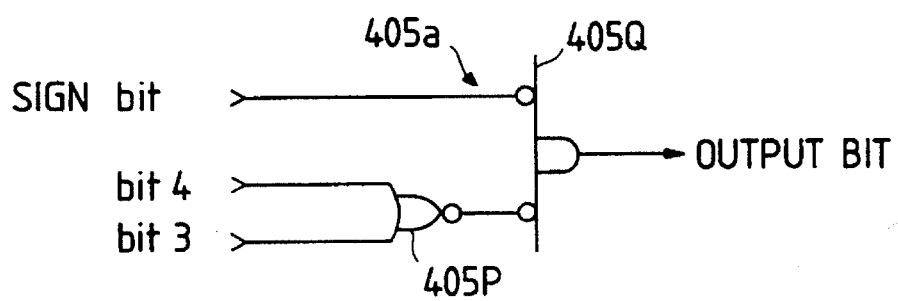
FIG. 42 is a diagram showing the relation between the states of bits of signals inputted into and outputted from the decoder of FIG. 41.
FIG. 43 is a block diagram of the decoder of FIG. 41.

The decoder 405a converts the sign bit and the two higher bits of the output signal of the subtracter 403 into a 1-bit signal (a pseudo halftone image signal). FIG. 42 shows the relation between the states of the bits of the signals inputted into and outputted from the decoder 405a. In FIG. 42, "bit 4" denotes the highest bit of the output signal of the subtracter 403, and "bit 3" denotes the second highest bit of the output signal of the subtracter 403.

As shown in FIG. 43, the decoder 405a includes 2-input NOR gates 405P and 405Q. The "bit 4" of the output signal of the subtracter 403 is fed to a first input terminal of the NOR gate 405P. The "bit 3" of the output signal of the subtracter 403 is fed to a second input terminal of the NOR gate 405P. The output signal of the NOR gate 405P is fed to a first input terminal of the NOR gate 405Q. The sign bit of the output signal of the subtracter 403 is fed to a second input terminal of the NOR gate 405Q. The output signal of the NOR gate 405Q is used as the 1-bit output signal of the decoder 405a.

DESCRIPTION OF THE EIGHTEENTH PREFERRED EMBODIMENT

Figure 44:
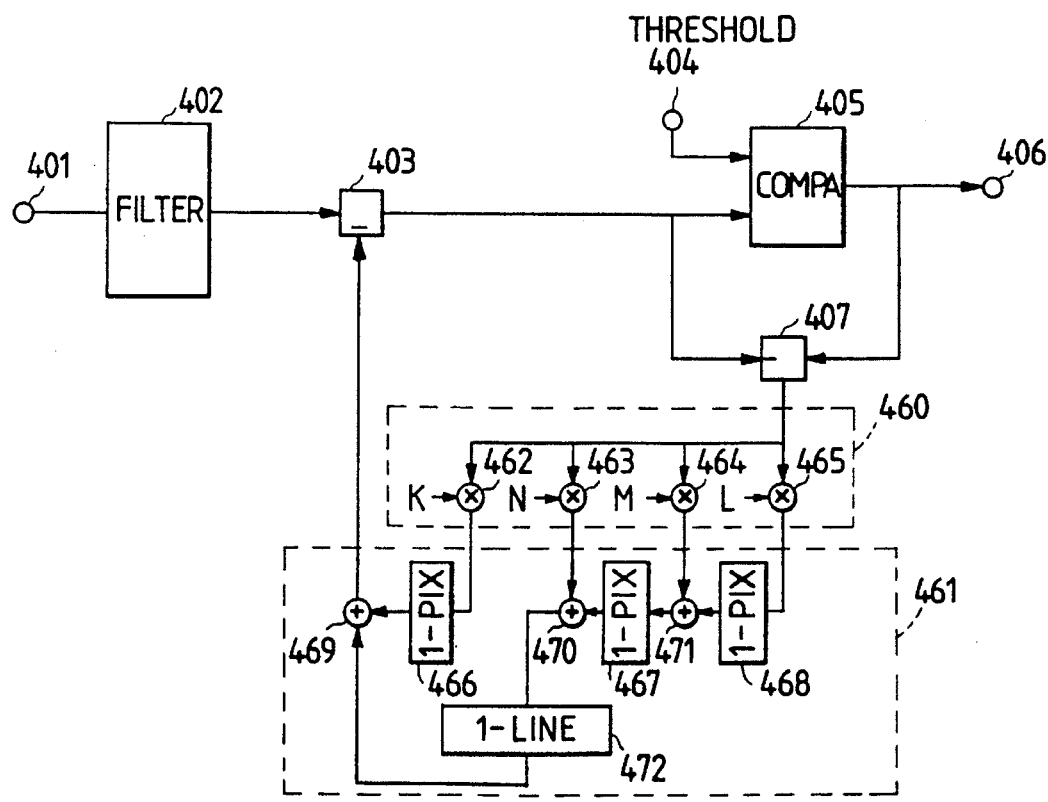
FIG. 44 is a block diagram of an image signal processing apparatus according to an eighteenth embodiment of this invention.

FIG. 44 shows an eighteenth embodiment of this invention which is similar to the embodiment of FIG. 35 except for design changes described hereinafter. The embodiment of FIG. 44 uses a combination of a weighting circuit 460 and an adding circuit 461 instead of the combination of the error data memory 408 and the calculator 409 (see FIG. 35). The combination of the weighting circuit 460 and the adding circuit 461 is connected between a subtracter 407 and an subtracter 403.

As shown in FIG. 44, the weighting circuit 460 includes multipliers 462, 463, 464, and 465. The multiplier 462 multiplies the error data outputted from the subtracter 407 by a weight coefficient "K". The multiplier 463 multiplies the error data outputted from the subtracter 407 by a weight coefficient "N". The multiplier 464 multiplies the error data outputted from the subtracter 407 by a weight coefficient "M". The multiplier 465 multiplies the error data outputted from the subtracter 407 by a weight coefficient "L".

The adding circuit 461 includes 1-pixel shift registers 466, 467, and 468, adders 469, 470, and 471, and a 1-line memory 472. The 1-pixel shift register 468 delays the output signal of the multiplier 465 by a time corresponding to one pixel. The adder 471 adds the output signals of the multiplier 464 and the 1-pixel shift register 468. The 1-pixel shift register 467 delays the output signal of the adder 471 by a time corresponding to one pixel. The adder 470 adds the output signals of the multiplier 463 and the 1-pixel shift register 467. The output signal of the adder 470 is written into a storage segment of the 1-line memory 472 which is designated by an address corresponding to the pixel of interest. The 1-line-preceding data is read out from a storage segment of the 1-line memory 472 which is designated by an address equal to the sum of the address of the pixel of interest and "1 ". The 1-pixel shift register 466 delays the output signal of the multiplier 462 by a time corresponding to one pixel. The adder 469 adds the output signals of the 1-line memory 472 and the 1-pixel shift register 466. The output signal of the adder 469 is fed to the subtracter 403 as the corrective signal.

Figure 40:
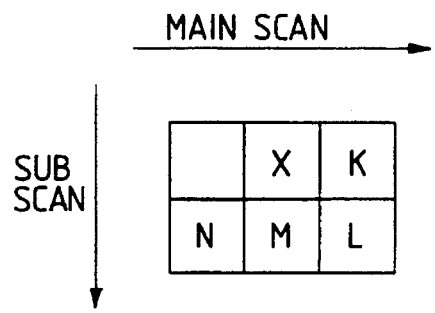
FIG. 40 is a diagram showing weight coefficients and pixels adjoining a pixel of interest.

FIG. 40 shows the relation between the pixel "x" of interest and the allotment of the weight coefficients "K", "L", "M", and "N" to the pixels near the pixel "x" of interest which occurs in the case of the distribution of the error data to the pixels near the pixel "x" of interest.

DESCRIPTION OF THE NINETEENTH PREFERRED EMBODIMENT

Figure 45:
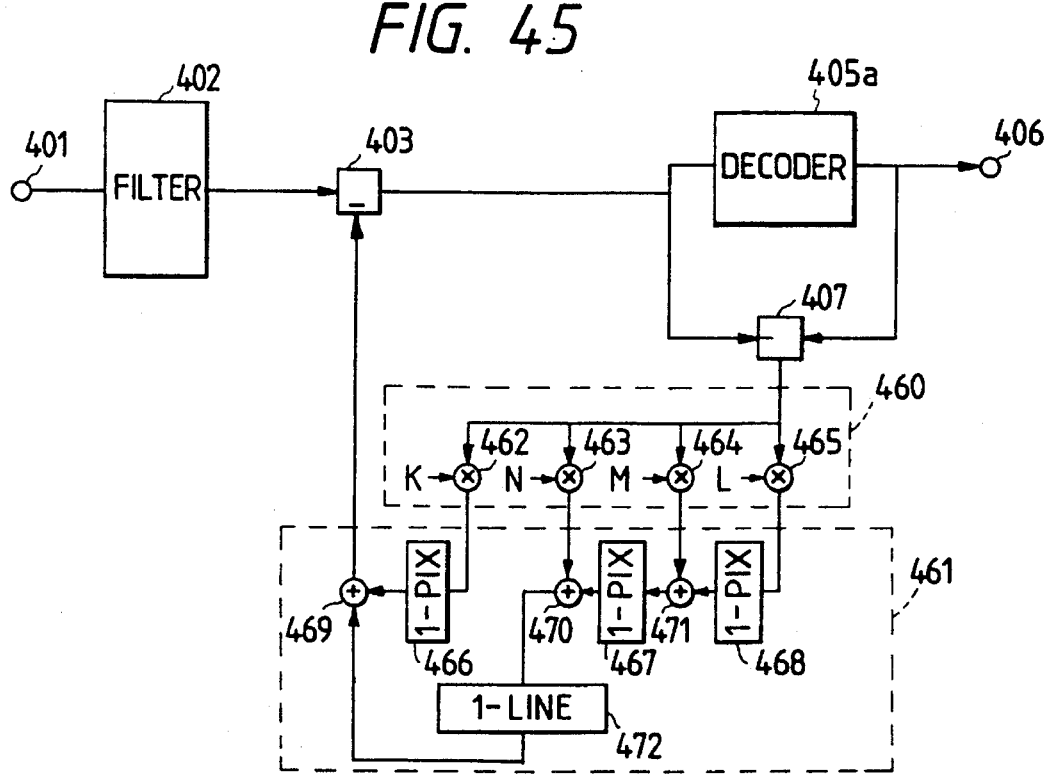
FIG. 45 is a block diagram of an image signal processing apparatus according to a nineteenth embodiment of this invention.

FIG. 45 shows a nineteenth embodiment of this invention which is similar to the embodiment of FIG. 44 except that a decoder 405a is used instead of a comparator 405 (see FIG. 44). The decoder 405a in this embodiment is similar to that in the embodiment of FIGS. 41–43.

DESCRIPTION OF THE TWENTIETH PREFERRED EMBODIMENT

Figure 46:
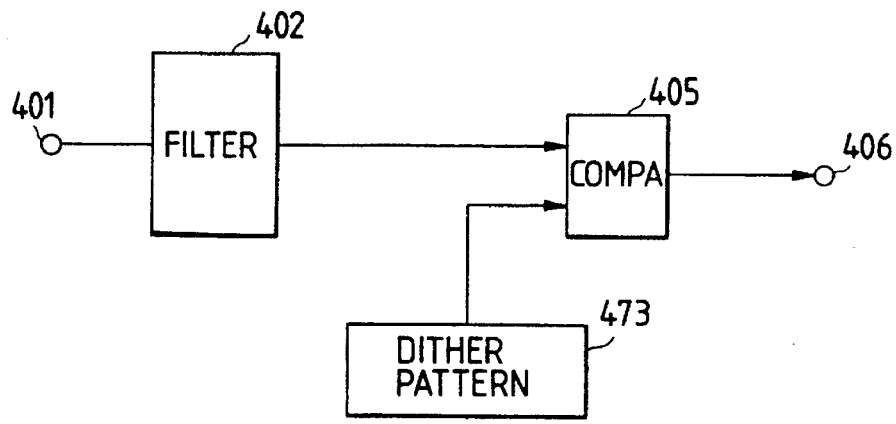
FIG. 46 is a block diagram of an image signal processing apparatus according to a twentieth embodiment of this invention.

With reference to FIG. 46, an image signal processing apparatus includes an input terminal 401 via which a true halftone input image signal is fed to a pre-filter 402. The input image signal is generated by a suitable device such as an image scanner. The input image signal has time segments corresponding to pixels respectively. The input image signal is processed in a pixel-by-pixel manner by the pre-filter 402 and later stages.

The pre-filter 402 includes an edge-emphasizing filter of the saddle type. The pre-filter 402 processes the true halftone input image signal into a second true halftone image signal. The pre-filter 402 is similar to that in the embodiment of FIG. 35. The second true halftone image signal is fed from the pre-filter 402 to a comparator 405.

A signal generator 473 produces a signal representative of a dither pattern in synchronism with the output signal of the pre-filter 402. The signal generator 473 outputs the dither pattern signal to the comparator 405.

The comparator 405 compares the output signal of the pre-filter 402 with the dither pattern signal, thereby converting the output signal (the second true halftone image signal) of the pre-filter 402 into a corresponding 1-bit binary image signal (a pseudo halftone image signal having a sequence of bi-level pixel components). The comparator 405 outputs the pseudo halftone image signal which is transmitted to an external device (not shown) via an output terminal 406.

DESCRIPTION OF THE TWENTY-FIRST PREFERRED EMBODIMENT

Figure 47:
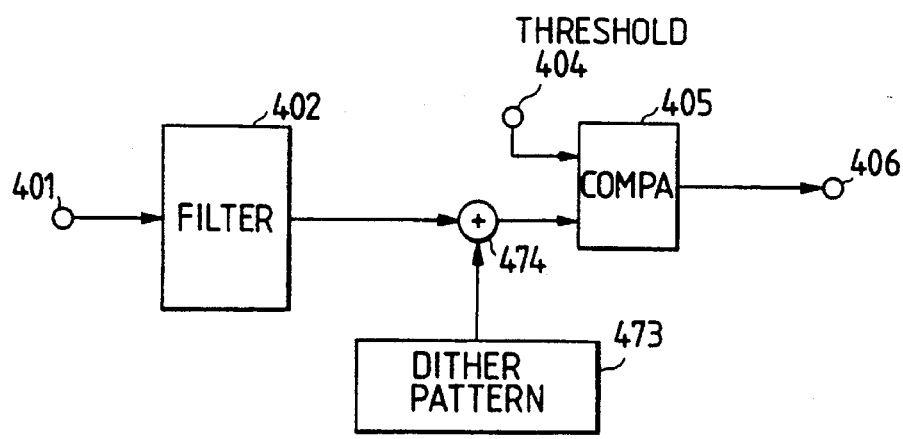
FIG. 47 is a block diagram of an image signal processing apparatus according to a twenty-first embodiment of this invention.

With reference to FIG. 47, an image signal processing apparatus includes an input terminal 401 via which a true halftone input image signal is fed to a pre-filter 402. The input image signal is generated by a suitable device such as an image scanner. The input image signal has time segments corresponding to pixels respectively. The input image signal is processed in a pixel-by-pixel manner by the pre-filter 402 and later stages.

The pre-filter 402 includes an edge-emphasizing filter of the saddle type. The pre-filter 402 processes the true halftone input image signal into a second true halftone image signal. The pre-filter 402 is similar to that in the embodiment of FIG. 35. The second true halftone image signal is fed from the pre-filter 402 to an adder 474.

A signal generator 473 produces a signal representative of a dither pattern in synchronism with the output signal of the pre-filter 402. The signal generator 473 outputs the dither pattern signal to the adder 474.

The adder 474 adds the output signals of the pre-filter 402 and the signal generator 473. The output signal of the adder 474 is fed to a comparator 405.

A signal 404 representative of a predetermined threshold value (a predetermined slicing level) is fed to the comparator 405. The comparator 405 compares the output signal of the adder 474 with the threshold value signal, thereby converting the output signal of the adder 474 into a corresponding 1-bit binary image signal (a pseudo halftone image signal having a sequence of bi-level pixel components). The comparator 405 outputs the pseudo halftone image signal which is transmitted to an external device (not shown) via an output terminal 406.

DESCRIPTION OF THE TWENTY-SECOND PREFERRED EMBODIMENT

Figure 48:
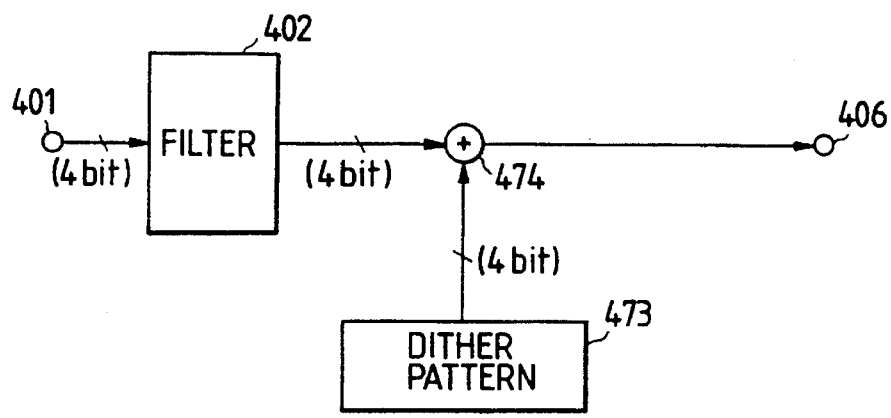
FIG. 48 is a block diagram of an image signal processing apparatus according to a twenty-second embodiment of this invention.

FIG. 48 shows a twenty-second embodiment of this invention which is similar to the embodiment of FIG. 47 except for design changes described hereinafter. The embodiment of FIG. 48 uses an adder 474a with a carry bit instead of the adder 474 (see FIG. 47). In the embodiment of FIG. 48, the comparator 405 (see FIG. 47) is omitted, and the output signal of the adder 474a is transmitted to an external device (not shown) via an output terminal 406.

DESCRIPTION OF THE TWENTY-THIRD PREFERRED EMBODIMENT

Figure 49:
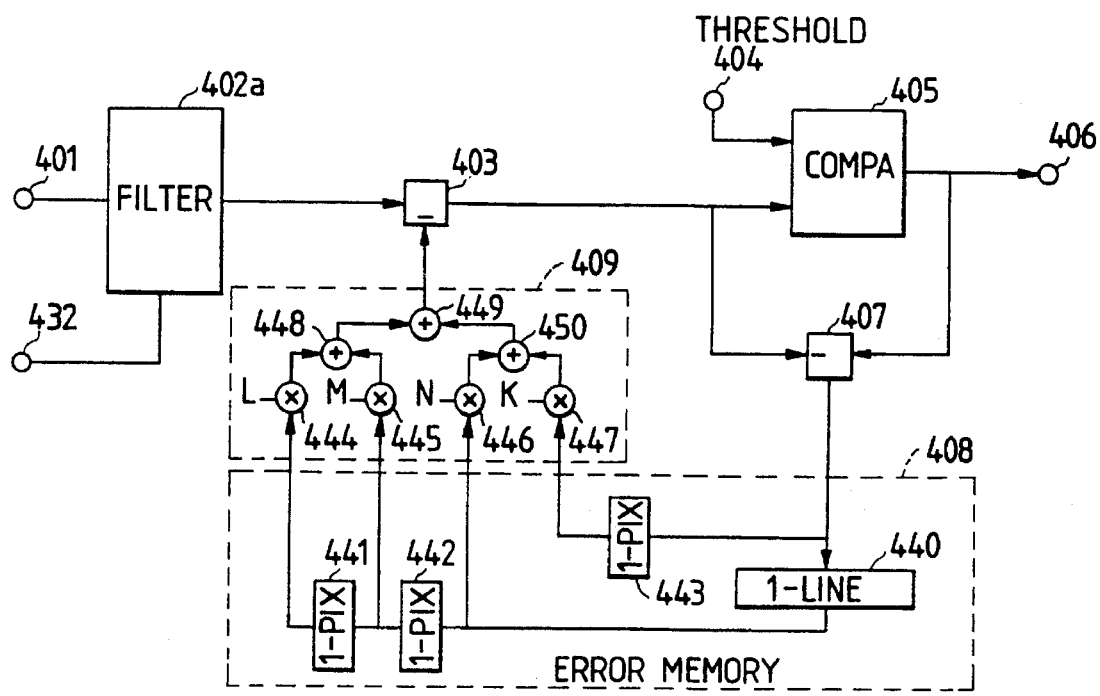
FIG. 49 is a block diagram of an image signal processing apparatus according to a twenty-third embodiment of this invention.

FIG. 49 shows a twenty-third embodiment of this invention which is similar to the embodiment of FIG. 35 except that a pre-filter 402a is used instead of the pre-filter 402 (see FIG. 35). A signal representative of an emphasis coefficient "K" is fed to the pre-filter 402a via a terminal 432.

The pre-filter 402a includes an edge-emphasizing filter of the saddle type. The pre-filter 402a processes a true halftone input image signal into a second true halftone image signal. Specifically, the pre-filter 402a attenuates high-frequency components of the input image signal which correspond to inclined directions from the pixel of interest, but amplifies high-frequency components of the input image signal which correspond to a main scanning direction and a sub scanning direction from the pixel of interest. Coefficients used in this filtering process can be set by the emphasis coefficient signal fed via the terminal 432. In the pre-filter 402a, coefficients which correspond to the coefficients "A" and "B" in the pre-filter 402 of FIG. 35 are set to "⅛" and "K" respectively.

Figure 50:
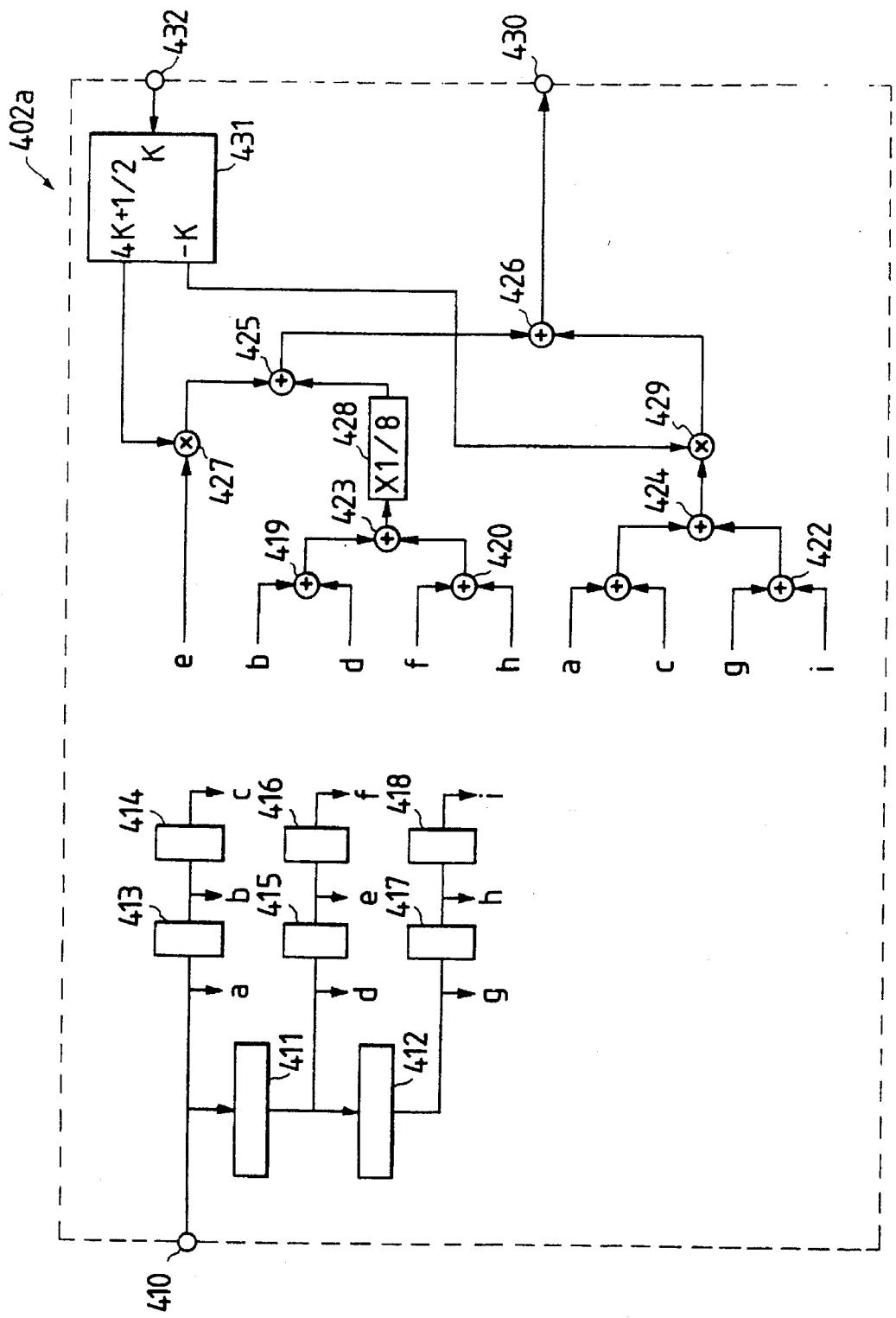
FIG. 50 is a block diagram of the edge-emphasizing pre-filter of FIG. 49.

As shown in FIG. 50, the pre-filter 402a includes 1-line buffer memories 411 and 412, 1-pixel shift registers 413, 414, 415, 416, 417, and 418, adders 419, 420, 421, 422, 423, 424, 425, and 426, multipliers 427, 428, and 429, and a coefficient converter 431.

The pre-filter 402a operates as follows. The input image signal is fed to the 1-line buffer memory 411 and the 1-pixel shift register 413 via a terminal 410. The input image signal is used as data corresponding to the pixel "a" of FIG. 36. The 1-pixel shift register 413 delays the input image signal by a time corresponding to one pixel. The output signal of the 1-pixel shift register 413 is used as data corresponding to the pixel "b" of FIG. 36. The output signal of the 1-pixel shift register 413 is applied to the 1-pixel shift register 414. The 1-pixel shift register 414 delays the output signal of the 1-pixel shift register 413 by a time corresponding to one pixel. The output signal of the 1-pixel shift register 414 is used as data corresponding to the pixel "c" of FIG. 36.

A time portion of the input image signal which corresponds to one line in the main scanning direction is stored into the 1-line buffer memory 411. Each time data processing for a line is completed, the 1-line portion of the input image signal is transferred from the 1-line buffer memory 411 to the 1-line buffer memory 412.

The signal is read out from the 1-line buffer memory 411, and the readout signal is fed to the 1-pixel shift register 415. The signal read out from the 1-line buffer memory 411 is used as data corresponding to the pixel "d" of FIG. 36. The 1-pixel shift register 415 delays the output signal of the 1-line buffer memory 411 by a time corresponding to one pixel. The output signal of the 1-pixel shift register 415 is used as data corresponding to the pixel "e" of FIG. 36. The output signal of the 1-pixel shift register 415 is applied to the 1-pixel shift register 416. The 1-pixel shift register 416 delays the output signal of the 1-pixel shift register 415 by a time corresponding to one pixel. The output signal of the 1-pixel shift register 416 is used as data corresponding to the pixel "f" of FIG. 36.

The signal is read out from the 1-line buffer memory 412, and the readout signal is fed to the 1-pixel shift register 417. The signal read out from the 1-line buffer memory 412 is used as data corresponding to the pixel "g" of FIG. 36. The 1-pixel shift register 417 delays the output signal of the 1-line buffer memory 412 by a time corresponding to one pixel. The output signal of the 1-pixel shift register 417 is used as data corresponding to the pixel "h" of FIG. 36. The output signal of the 1-pixel shift register 417 is applied to the 1-pixel shift register 418. The 1-pixel shift register 418 delays the output signal of the 1-pixel shift register 415 by a time corresponding to one pixel. The output signal of the 1-pixel shift register 418 is used as data corresponding to the pixel "i" of FIG. 36.

The coefficient converter 431 receives the emphasis coefficient signal via the terminal 432. The emphasis coefficient signal represents the coefficient "K". The coefficient converter 431 converts the emphasis coefficient signal into first and second signals representing coefficients "4K+½" and "−K" respectively. The coefficient converter 431 outputs the signal representative of the coefficient "4K+½" to the multiplier 427. In addition, the coefficient converter 431 outputs the signal representative of the coefficient "−K" to the multiplier 429. The multiplier 427 multiplies the data of the pixel "e" by the coefficient "4K+½". The output signal of the multiplier 427 is applied to the adder 425. The adder 419 adds the data of the pixel "b" and the data of the pixel "d". The output signal of the adder 419 is applied to the adder 423. The adder 420 adds the data of the pixel "f" and the data of the pixel "h". The output signal of the adder 420 is applied to the adder 423. The adder 423 adds the output signals of the adders 419 and 420. The output signal of the adder 423 is applied to the multiplier 428. The multiplier 428 multiplies the output signal of the adder 423 by a coefficient "⅛". The output signal of the multiplier 428 is applied to the adder 425. The adder 425 adds the output signals of the multipliers 427 and 428. The output signal of the adder 425 is applied to the adder 426. The adder 421 adds the data of the pixel "a" and the data of the pixel "c". The output signal of the adder 421 is applied to the adder 424. The adder 422 adds the data of the pixel "g" and the data of the pixel T. The output signal of the adder 422 is applied to the adder 424. The adder 424 adds the output signals of the adders 421 and 422. The output signal of the adder 424 is applied to the multiplier 429. The multiplier 429 multiplies the output signal of the adder 424 by the coefficient "–K". The output signal of the multiplier 429 is applied to the adder 426. The adder 426 adds the output signals of the adders 425 and the multiplier 429. The output signal of the adder 26 is transmitted via a terminal 430 to the subtracter 403 (see FIG. 35).

Figure 51:
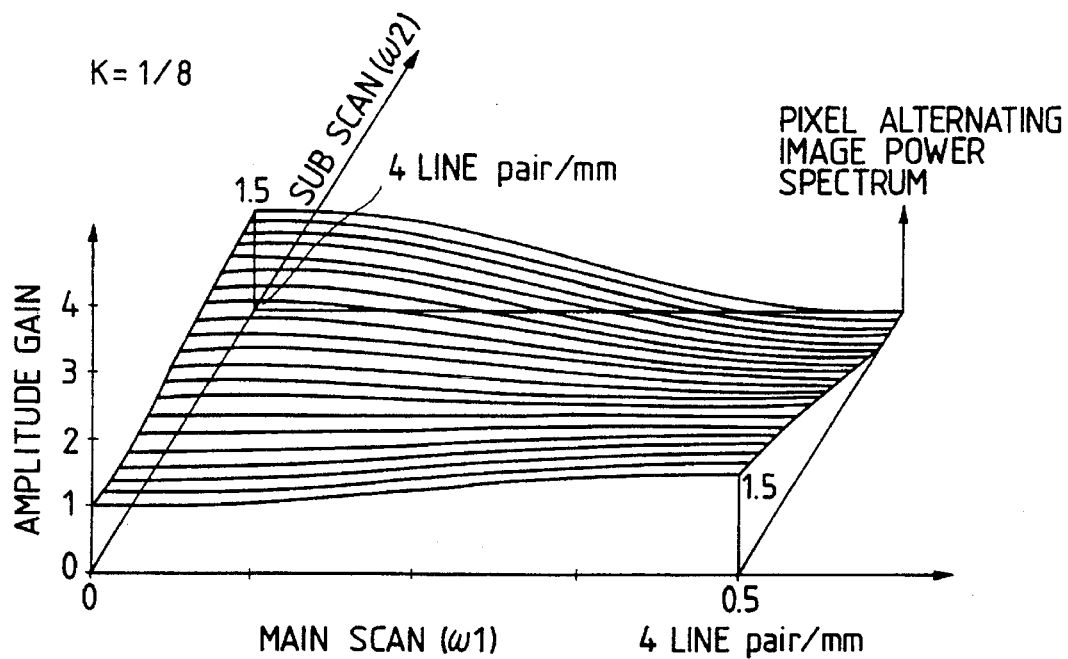
FIG. 51 is a diagram showing the spatial frequency/amplitude characteristics of the edge-emphasizing pre-filter of FIG. 49 which occur at a coefficient "K" of ⅛.
Figure 52:
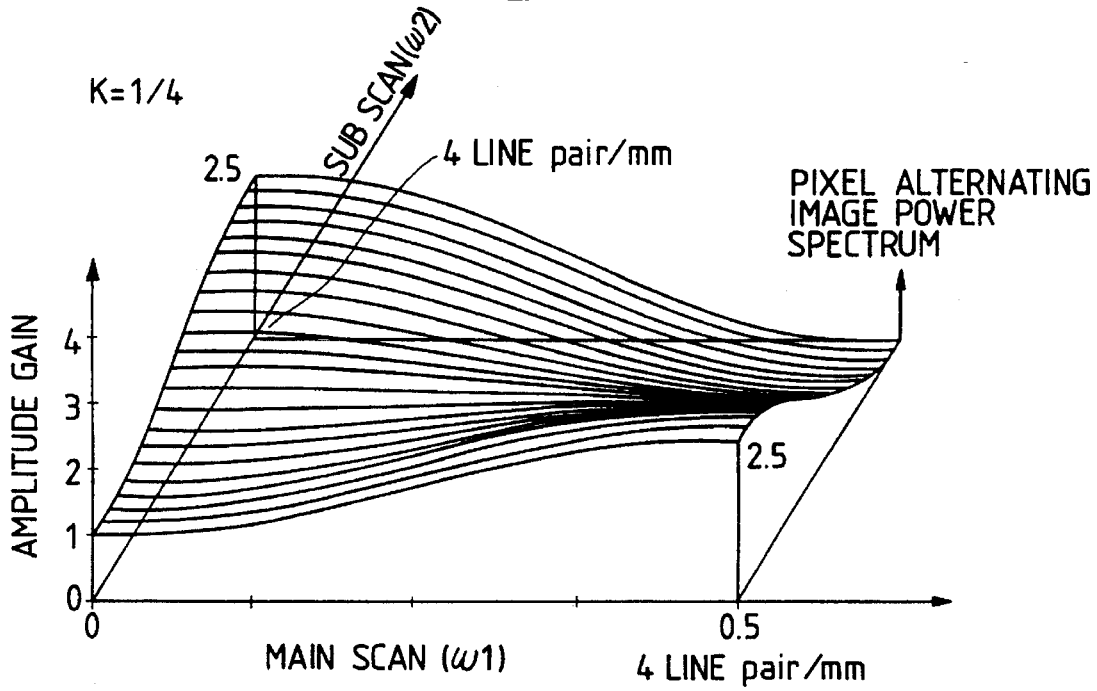
FIG. 52 is a diagram showing the spatial frequency/amplitude characteristics of the edge-emphasizing pre-filter of FIG. 49 which occur at a coefficient "K" of ¼.
Figure 53:
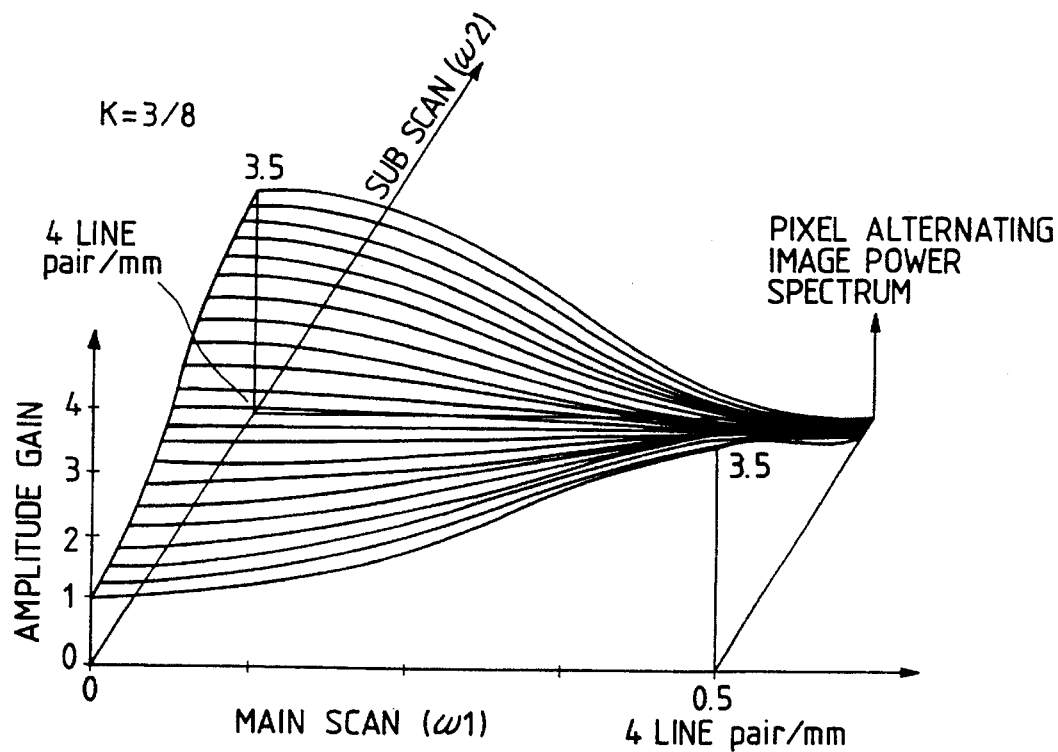
FIG. 53 is a diagram showing the spatial frequency/amplitude characteristics of the edge-emphasizing pre-filter of FIG. 49 which occur at a coefficient "K" of ⅜.

FIG. 51 shows the spatial frequency/amplitude characteristics of the pre-filter 402a which occur under conditions where the coefficient "K" is set to ⅛. FIG. 52 shows the spatial frequency/amplitude characteristics of the pre-filter 402a which occur under conditions where the coefficient "K" is set to ¼. FIG. 53 shows the spatial frequency/amplitude characteristics of the pre-filter 402a which occur under conditions where the coefficient "K" is set to ⅜. According to the filter characteristics shown in FIG. 51–53, the amplitude of the value of the data of a pixel which adjoins the pixel of interest in an inclined direction is minimized. It is understood from FIGS. 51–53 that the amplitude gain of high-frequency signal components corresponding to the main and sub scanning directions from the pixel of interest is increased as the coefficient "K" increases.

The frequency response of the pre-filter 402a is given as a Fourier transform of a spatial filter coefficient $h(k_1, k_2)$. Specifically, the frequency response is expressed as follows.

$$H(e^{j\omega_1} \cdot e^{j\omega_2}) = \sum_{k_1=-\infty}^{\infty} \sum_{k_2=-\infty}^{\infty} h(k_1, k_2) e^{-j\omega_1 k_1} e^{-j\omega_2 k_2} =$$

$$4 \cdot K + 1/2 + 1/4 \cdot K \cdot \cos(\omega_1) + 1/4 \cdot \cos(\omega_2) -$$

$$4 \cdot K \cdot \cos(\omega_1) \cdot \cos(\omega_2)$$

$h(-1,-1) = -K$   $h(0,-1) = 1/8$   $h(1,-1) = -K$
$h(-1,0) = 1/8$   $h(0,0) = 4 \cdot K + 1/2$   $h(1,0) = 1/8$
$h(-1,1) = -K$   $h(0,1) = 1/8$   $h(1,1) = -K$

DESCRIPTION OF THE TWENTY-FOURTH PREFERRED EMBODIMENT

Figure 54:
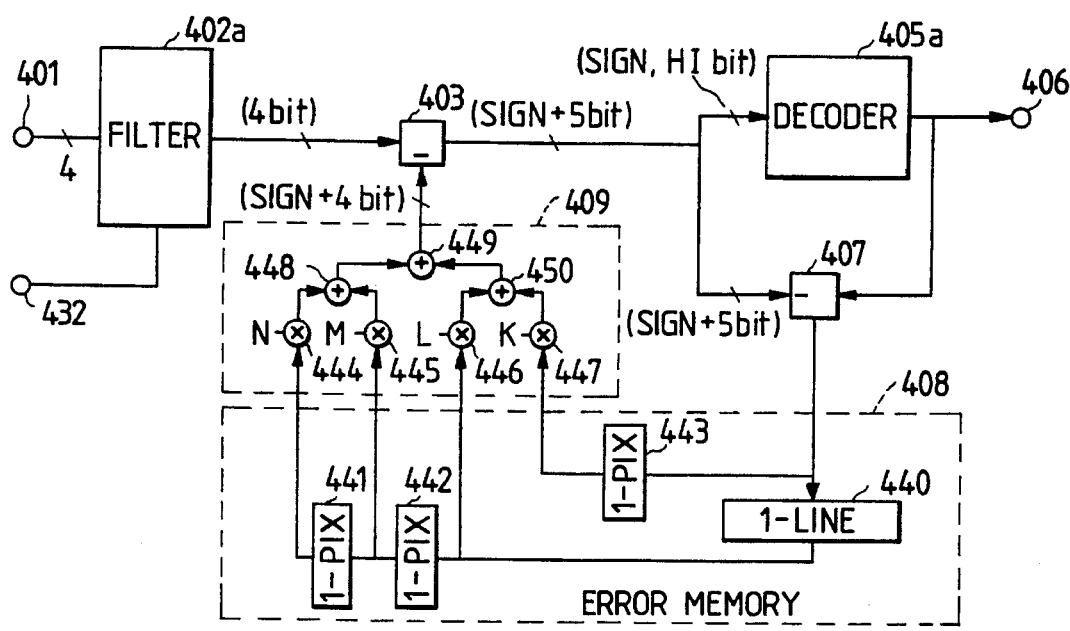
FIG. 54 is a block diagram of an image signal processing apparatus according to a twenty-fourth embodiment of this invention.

FIG. 54 shows a twenty-fourth embodiment of this invention which is similar to the embodiment of FIG. 41 except that a pre-filter 402a is used instead of a pre-filter 402 (see FIG. 41 ). The pre-filter 402a is similar to that in the embodiment of FIGS. 49–53.

DESCRIPTION OF THE TWENTY-FIFTH PREFERRED EMBODIMENT

Figure 55:
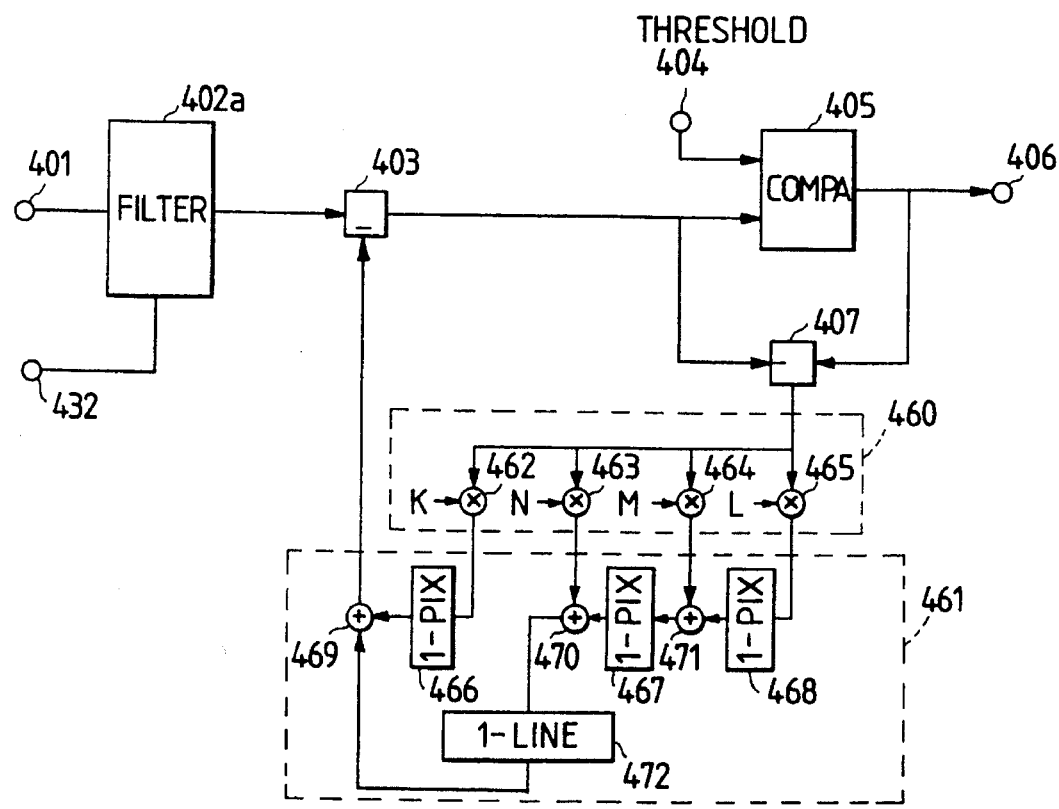
FIG. 55 is a block diagram of an image signal processing apparatus according to a twenty-fifth embodiment of this invention.

FIG. 55 shows a twenty-fifth embodiment of this invention which is similar to the embodiment of FIG. 44 except that a pre-filter 402a is used instead of a pre-filter 402 (see FIG. 44). The pre-filter 402a is similar to that in the embodiment of FIGS. 49–53.

DESCRIPTION OF THE TWENTY-SIXTH PREFERRED EMBODIMENT

Figure 56:
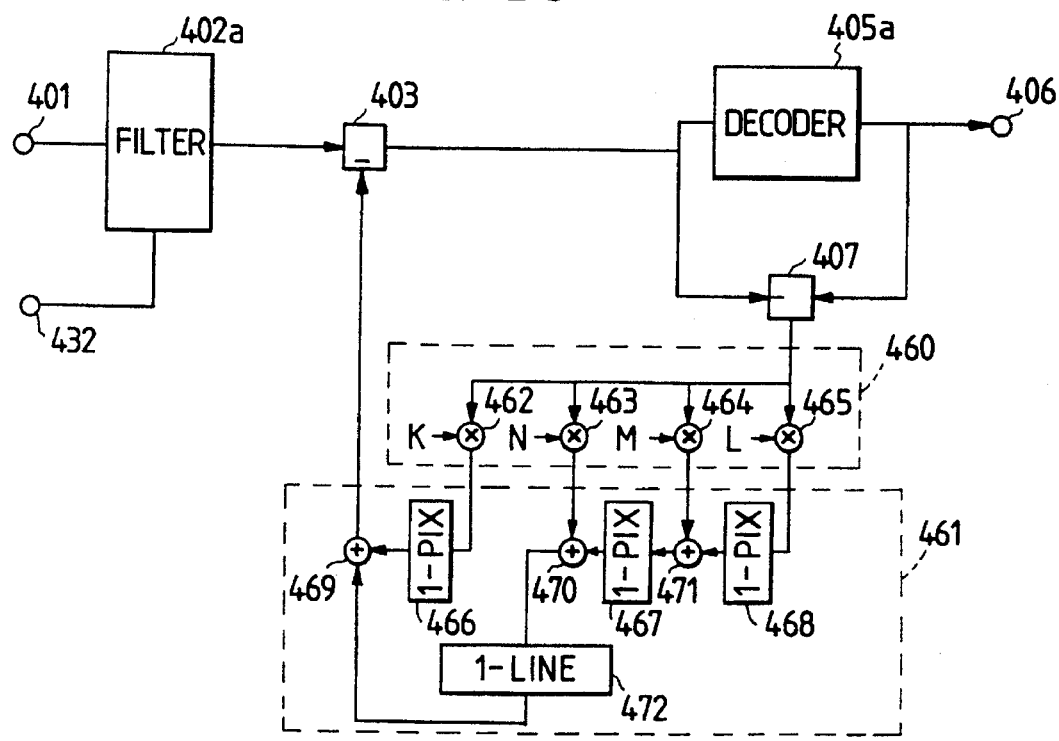
FIG. 56 is a block diagram of an image signal processing apparatus according to a twenty-sixth embodiment of this invention.

FIG. 56 shows a twenty-sixth embodiment of this invention which is similar to the embodiment of FIG. 45 except that a pre-filter 402a is used instead of a pre-filter 402 (see FIG. 45). The pre-filter 402a is similar to that in the embodiment of FIGS. 49–53.

DESCRIPTION OF THE TWENTY-SEVENTH PREFERRED EMBODIMENT

Figure 57:
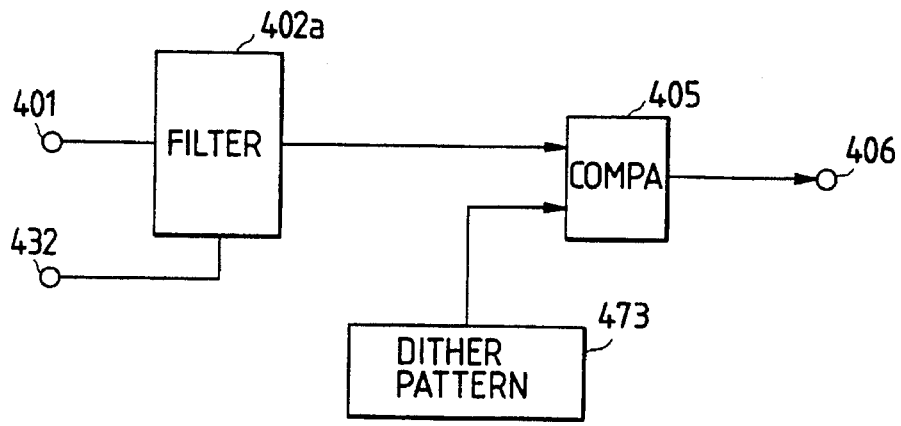
FIG. 57 is a block diagram of an image signal processing apparatus according to a twenty-seventh embodiment of this invention.

FIG. 57 shows a twenty-seventh embodiment of this invention which is similar to the embodiment of FIG. 46 except that a pre-filter 402a is used instead of a pre-filter 402 (see FIG. 46). The pre-filter 402a is similar to that in the embodiment of FIGS. 49–53.

DESCRIPTION OF THE TWENTY-EIGHTH PREFERRED EMBODIMENT

Figure 58:
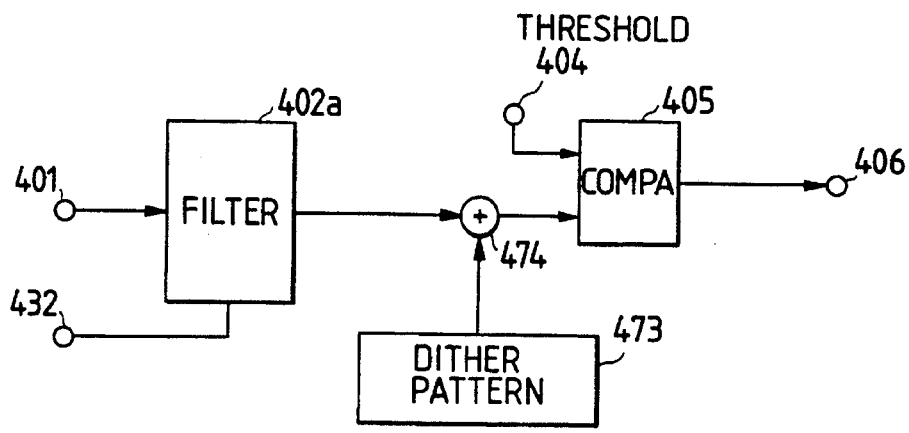
FIG. 58 is a block diagram of an image signal processing apparatus according to a twenty-eighth embodiment of this invention.

FIG. 58 shows a twenty-eighth embodiment of this invention which is similar to the embodiment of FIG. 47 except that a pre-filter 402a is used instead of a pre-filter 402 (see FIG. 47). The pre-filter 402a is similar to that in the embodiment of FIGS. 49–53.

DESCRIPTION OF THE TWENTY-NINTH PREFERRED EMBODIMENT

Figure 59:
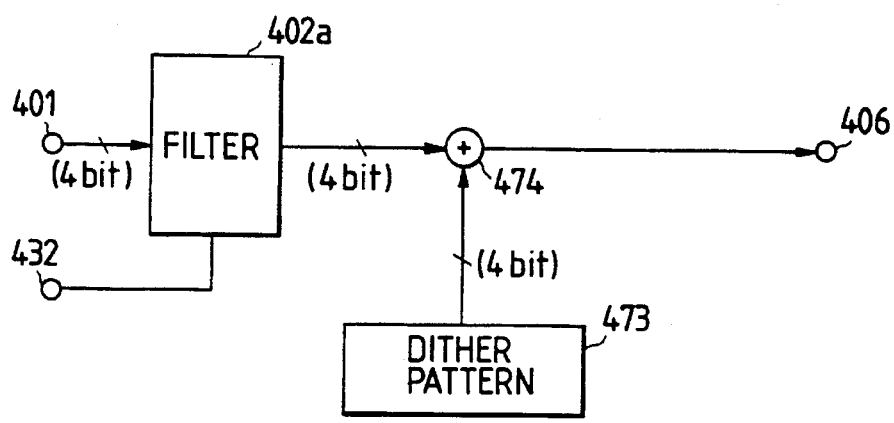
FIG. 59 is a block diagram of an image signal processing apparatus according to a twenty-ninth embodiment of this invention.

FIG. 59 shows a twenty-ninth embodiment of this invention which is similar to the embodiment of FIG. 48 except that a pre-filter 402a is used instead of a pre-filter 402 (see FIG. 48). The pre-filter 402a is similar to that in the embodiment of FIGS. 49–53.

What is claimed is:

1. An image signal processing apparatus comprising:

correcting means for correcting a multi-level image signal of a pixel of interest in accordance with corrective data;

binarizing means for binarizing an output signal of the correcting means;

logic means receiving an output signal of the binarizing means;

feedback means for feeding an output signal of the logic means, which corresponds to at least two feedback pixels immediately preceding the pixel of interest in a scanning direction, back to an input side of the logic means;

calculating means for derived a difference between an output signal of the logic means and the output signal of the correcting means, and generating the corrective data on the basis of the derive difference; and output means for outputting an output signal of the logic means as a pseudo halftone image signal;

wherein the logic means comprises:

means for outputting a black-level signal as a signal of the pixel of interest when the output signal of the logic means which corresponds to the feedback pixel closest to the pixel of interest is black and the output signal of the logic means which corresponds to the other feedback pixel is white, for outputting a signal equal to the output signal of the binarizing means as a signal of the pixel of interest in other cases; and means for outputting a white-level signal as a signal of the pixel of interest when the output signal of the logic means which corresponds to the feedback pixel closest to the pixel of interest is white and the output signal of the logic means which corresponds to the other feedback pixel is black, and for outputting a signal equal to the output signal of the binarizing means as a signal of the pixel of interest in other cases.

2. An image signal processing apparatus comprising:

binarizing means for binarizing a multi-level input pixel signal;

converting means for converting an output signal of the binarizing means, which corresponds to a pixel of interest, into one of a signal of at least two successive black dots and a signal of at least two successive white dots;

calculating means for deriving a difference between an output signal of the converting means and the input pixel signal, and for generating corrective data on the basis of the derived difference; and correcting means for correcting the input pixel signal, which corresponds to pixels near a pixel of interest, in accordance with the corrective data.

3. In an image signal processing apparatus outputting a plurality of black and white dots to represent a multi-level input pixel signal, the improvement comprising:

binarizing means for binarizing the multi-level input pixel signal; and converting means for converting an output signal of the binarizing means, which corresponds to a pixel of interest, into one of a signal of at least two successive black dots and a signal of at least two successive white dots in a main scanning direction in accordance with states of pixels preceding the pixel of interest by two pixels or more.

4. In an image signal processing apparatus outputting a plurality of black and white dots to represent a multi-level input pixel signal, the improvement comprising:

binarizing means of binarizing the multi-level input pixel signal; and converting means for converting an output signal of the binarizing means, which corresponds to a pixel of interest, into one of a signal of at least two successive black dots and a signal of at least two successive white dots in a sub scanning direction by referring to states of pixels preceding the pixel of interest by two pixels or more.

5. In an image signal processing apparatus outputting a plurality of black and white dots to represent a multi-level input pixel signal, the improvement comprising:

binarizing means of binarizing the multi-level input pixel signal; and converting means for converting an output signal of the binarizing means, which corresponds to a pixel of interest into one of a signal of at lest two successive black dots and a signal of at least two successive white dots in one of a main scanning direction and a sub scanning direction by referring to states of pixels preceding the pixel of interest by two pixels or more.

6. An image signal processing apparatus comprising:

correcting means for correcting a multi-level input pixel signal in accordance with corrective data;

binarizing means for binarizing an output signal of the correcting means into a corresponding binary pixel signal;

reducing means for thinning out pixels in the binary pixel signal and thereby reducing the binary pixel signal; and calculating means for deriving a difference between the binary pixel signal and the output signal of the correcting means, and for generating the corrective data on the basis of the derived difference;

wherein the calculating means comprises means for excluding the pixels, which are thinned out by the reducing means, from generating the corrective data to enable the correcting by the correcting means to be done only on pixels which are not thinned out by the reducing means.

7. An image signal processing apparatus comprising:

correcting means for correcting a multi-level input pixel signal in accordance with corrective data;

binarizing means for binarizing an output signal of the correcting means into a corresponding binary pixel signal;

reducing means for thinning out pixels in the binary pixel signal and thereby reducing the binary pixel signal; and calculating means for deriving a difference between the binary pixel signal and the output signal of the correcting means to generate error data;

processing means for multiplying the error data of pixels near a pixel of interest by predetermined weight coefficients to generate weighted error data respectively, and for generating the corrective data on the basis of the weighted error data;

wherein the processing means comprises means for excluding the pixels, which are thinned out by the reducing means, from generating the corrective data to enable the correcting by the correcting means to be done only on pixels which are not thinned out by the reducing means.

8. An image signal processing apparatus comprising:

correcting means for correcting input image data in accordance with first corrective data;

binarizing means for binarizing an output signal of the correcting means;

subtracting means for calculating a difference between an output signal of the binarizing means and the output signal of the corrective means;

memory means for memorizing binary values of already-processed pixels, which are represented by the output signal of the binarizing means, near a currently-processed pixel;

first corrective-quantity determining means for determining second corrective data on the basis of the binary values of the already-processed pixels which are memorized by the memory means, the second corrective data depending on a difference between a theoretical dot size and an actual dot size in a recording system;

second corrective-quantity determining means for adding an output signal of the first corrective-quantity determining means and an output signal of the subtracting means to generate the first corrective data;

receiving means for receiving a signal representing whether or not the input image signal is effective; and feeding means for feeding an output signal of the second corrective-quantity determining means to the correcting means as the first corrective data when the signal received by the receiving means represents that the input image signal is effective.

9. The image signal processing apparatus of claim 8, further comprising means for outputting data of zero to the correcting means as the first corrective data.

10. The image signal processing apparatus of claim 8, further comprising means for changing the second corrective data.

11. The image signal processing apparatus of claim 8, wherein the second corrective-quantity determining means comprises means for storing data of two sets of coefficients, means for generating a signal of a random number, means for selecting one of the two coefficient sets in accordance with the random number signal, and means for generating the first corrective data on the basis of the selected coefficient set, and wherein the random number signal generating means comprises first sub random number signal generators, a second sub random number signal generator different from the first sub random number signal generators, and means for selecting one of output signals of the first sub random number signal generator in response to an output signal of the second sub random number signal generator, and for outputting the selected output signal as the random number signal.

12. The image signal processing apparatus of claim 11, further comprising means for synchronizing an operation clock signal of the first sub random number signal generators with a clock signal of the input image signal.

13. The image signal processing apparatus of claim 11, further comprising means for synchronizing an operation clock signal of the second sub random number signal generator with a main scanning line component of the input image signal.

14. An image signal processing apparatus comprising:

an edge emphasizing filter for multiplying a pixel of interest and pixels adjoining the pixel of interest of an input multi-level image signal by first predetermined coefficients, and for calculating a filter correction value equal to a sum thereof;

correcting means for calculating and processing the filter correction value;

binarizing means for binarizing an output signal of the correcting means;

a subtraction circuit for calculating a subtraction value between an output signal of the binarizing means and the output signal of the correcting means; and correction value calculating means for multiplying subtraction values of pixels adjoining a pixel to be binarized which are already outputted from the subtraction circuit by second predetermined coefficients, and for outputting resultants to the correcting means.

15. The image signal processing apparatus of claim 14, wherein the first coefficients have values which are different between positions vertically and horizontally adjoining the pixel of interest and positions obliquely adjoining the pixel of interest.

16. The image signal processing apparatus of claim 14, wherein the first coefficients have values of ⅛ as coefficients of positions vertically and horizontally adjoining the pixel of interest, and the first coefficients have negative values as coefficients of positions obliquely adjoining the pixel of interest, and wherein a sum of the first coefficient of the pixel of interest and the first coefficients of the adjoining pixels is equal to 1.

17. The image signal processing apparatus of claim 14, wherein a sum of the first coefficients is equal to 1 in a position of the pixel of interest, positions vertically and horizontally adjoining the pixel of interest, and positions obliquely adjoining the pixel of interest.

18. The image signal processing apparatus of claim 14, wherein a sum of the second coefficients is equal to 1.

19. The image signal processing apparatus of claim 14, wherein the binarizing means comprises a binarizing comparator for comparing input data and a predetermined threshold value to calculate a binary level.

20. The image signal processing apparatus of claim 14, wherein the binarizing means comprises a binarizing decoder for calculating a binary level from a sign bit and higher bits of data outputted from the correcting means.

21. An image signal processing apparatus comprising:

an edge emphasizing filter for multiplying a pixel of interest and pixels adjoining the pixel of interest of an input multi-level image signal by predetermined coefficients, and for calculating a filter correction value equal to a sum thereof;

a dither pattern generating circuit for outputting a signal in synchronism with the input image signal; and a binarizing comparator for comparing a dither pattern outputted from the dither pattern generating circuit and the filter correction value to determine a binary level of the pixel of interest.

22. An image signal processing apparatus comprising:

an edge emphasizing filter for multiplying a pixel of interest and pixels adjoining the pixel of interest of an input multi-level image signal by predetermined coefficients, and for calculating a filter correction value equal to a sum thereof;

a dither pattern generating circuit for outputting a signal in synchronism with the input image signal;

an adder for adding a dither pattern outputted from the dither pattern generating circuit and the filter correction value; and binarizing means for binarizing an output signal of the adder.

23. An image signal processing apparatus comprising:

an edge emphasizing filter for multiplying a pixel of interest and pixels adjoining the pixel of interest of an input multi-level image signal by predetermined coefficients, and for calculating a filter correction value equal to a sum thereof;

a dither pattern generating circuit for outputting a signal in synchronism with the input image signal;

an adder for adding a dither pattern outputted from the dither pattern generating circuit and the filter correction value being an output signal of the edge emphasizing filter; and means for outputting information of whether a carry bit of the adder is present or absent as a binary value.

24. An image signal processing apparatus comprising:

an edge emphasizing filter including means for inputting a positive value "A" and a negative value "−B" as filter coefficients to emphasize edges in an image, means for using the input value "A" as filter coefficients of pixels adjoining a pixel of interest in main and sub scanning directions, means for using the input value "−B" as filter coefficients of pixels adjoining the pixel of interest in inclined directions, means for using a value "1+4B−4A" as a filter coefficient of the pixel of interest, means for multiplying the pixel of interest and the pixels adjoining the pixel of interest of an input multi-level image signal by the filter coefficients respectively, and means for outputting a sum thereof as a filter correction value;

correcting means for calculating and processing the filter correction value;

binarizing means for binarizing an output signal of the correcting means;

a subtraction circuit for calculating a subtraction value between an output signal of the binarizing means and the output signal of the correcting means; and correction value calculating means for multiplying subtraction values of pixels adjoining a pixel to be binarized which are already outputted from the subtraction circuit by predetermined coefficients, and for outputting resultants to the correcting means.

25. The image signal processing apparatus of claim 24, wherein the binarizing means comprises a binarizing decoder for calculating a binary level from a sign bit and higher bits of data outputted from the correcting means.

26. An image signal processing apparatus comprising:

an edge emphasizing filter including means for inputting a positive value "A" and a negative value "−B" as filter coefficients to emphasize edges in an image, means for using the input value "A" as filter coefficients of pixels adjoining a pixel of interest in main and sub scanning directions, means for using the input value "−B" as filter coefficients of pixels adjoining the pixel of interest in inclined directions, means for using a value "1+4B−4A" as a filter coefficient of the pixel of interest, means for multiplying the pixel of interest and the pixels adjoining the pixel of interest of an input multi-level image signal by the filter coefficients respectively, and means for outputting a sum thereof as a filter correction value;

a dither pattern generating circuit for outputting a signal in synchronism with the input image signal; and a binarizing comparator for comparing a dither pattern outputted from the dither pattern generating circuit and the filter correction value to determine a binary level of the pixel of interest.

27. An image signal processing apparatus comprising:

an edge emphasizing filter including means for inputting a positive value "A" and a negative value "−B" as filter coefficients to emphasize edges in an image, means for using the input value "A" as filter coefficients of pixels adjoining a pixel of interest in main and sub scanning directions, means for using the input value "−B" as filter coefficients of pixels adjoining the pixel of interest in inclined directions, means for using a value "1+4B−4A" as a filter coefficient of the pixel of interest, means for multiplying the pixel of interest and the pixels adjoining the pixel of interest of an input multi-level image signal by the filter coefficients respectively, and means for outputting a sum thereof as a filter correction value;

a dither pattern generating circuit for outputting a signal in synchronism with the input image signal;

an adder for adding a dither pattern outputted from the dither pattern generating circuit and the filter correction value; and binarizing means for binarizing an output signal of the adder.

28. An image signal processing apparatus comprising:

correcting means for correcting input image data in accordance with a corrective value;

binarizing means for binarizing an output signal of the correcting means;

subtracting means for calculating a difference value between an output signal of the binarizing means and the output signal of the correcting means;

memory means for memorizing difference values outputted from the subtracting means as error values corresponding to a pixel of interest and pixels adjoining the pixel of interest; and calculating means for reading out the error values corresponding to the pixels adjoining the pixel of interest from the memory means, for multiplying the readout error values by predetermined coefficients respectively, and for calculating a sum thereof and outputting an error correction value to the correcting means, the error correction value being equal to the sum.

29. An image signal processing apparatus comprising:

correcting means for correcting input image data in accordance with a corrective value;

binarizing means for binarizing an output sign of the correcting means;

subtracting means for calculating a difference value between an output signal of the binarizing means and the output signal of the correcting means;

error distributing means for making difference values outputted from the subtracting means into correspondence with a pixel of interest and pixels adjoining the pixel of interest, for multiplying the difference values by predetermined coefficients to generate errors respectively, and for outputting the errors for the respective pixels adjoining the pixel of interest; and calculating means for sequentially correcting and adding an output signal of the error distributing means in correspondence with the respective pixels adjoining the pixel of interest to generate an error correction value, and for outputting the error correction value to the correcting means.

* * * * *